US009382349B2

(12) United States Patent
Harrington et al.

(10) Patent No.: US 9,382,349 B2
(45) Date of Patent: *Jul. 5, 2016

(54) POLYALPHAOLEFINS PREPARED USING MODIFIED SALAN CATALYST COMPOUNDS

(71) Applicants: ExxonMobil Chemical Patents Inc., Baytown, TX (US); Ramot at Tel-Aviv University Ltd., Tel Aviv (IL)

(72) Inventors: Bruce A. Harrington, Houston, TX (US); Garth R. Giesbrecht, The Woodlands, TX (US); Matthew W. Holtcamp, Huffman, TX (US); Moshe Kol, Ramat Gan (IL); Konstantin Press, Rishon LeZion (IL); Gregory S. Day, Pasadena, TX (US)

(73) Assignees: ExxonMobil Chemical Patents Inc., Baytown, TX (US); Ramot at Tel-Aviv University Ltd., Tel Aviv (IL)

(*) Notice: Subject to any disclaimer, the term of this patent is extended or adjusted under 35 U.S.C. 154(b) by 0 days.

This patent is subject to a terminal disclaimer.

(21) Appl. No.: 14/406,414

(22) PCT Filed: Aug. 2, 2013

(86) PCT No.: PCT/US2013/053363
§ 371 (c)(1),
(2) Date: Dec. 8, 2014

(87) PCT Pub. No.: WO2014/022746
PCT Pub. Date: Feb. 6, 2014

(65) Prior Publication Data
US 2015/0158958 A1  Jun. 11, 2015

Related U.S. Application Data

(63) Continuation-in-part of application No. 13/921,923, filed on Jun. 19, 2013, and a continuation-in-part of application No. PCT/US2013/046615, filed on Jun. 19, 2013.

(60) Provisional application No. 61/679,640, filed on Aug. 3, 2012.

(51) Int. Cl.
| | |
|---|---|
| *C08F 4/76* | (2006.01) |
| *C08F 10/00* | (2006.01) |
| *C08F 4/64* | (2006.01) |
| *C10M 107/10* | (2006.01) |
| *C10G 50/00* | (2006.01) |
| *C08F 210/14* | (2006.01) |
| *C08F 110/14* | (2006.01) |

(52) U.S. Cl.
CPC .............. *C08F 10/00* (2013.01); *C08F 4/64189* (2013.01); *C08F 110/14* (2013.01); *C08F 210/14* (2013.01); *C10G 50/00* (2013.01); *C10M 107/10* (2013.01)

(58) Field of Classification Search
CPC ........ C08F 4/60189; C08F 4/76; C08F 10/14; C08F 210/14
USPC ............................ 526/172, 161, 348.2, 348.3
See application file for complete search history.

(56) References Cited

U.S. PATENT DOCUMENTS

| | | | |
|---|---|---|---|
| 4,066,715 A | 1/1978 | Isa et al. | |
| 5,153,157 A | 10/1992 | Hlatky et al. | |
| 5,942,459 A | 8/1999 | Sugano et al. | |
| 5,955,557 A * | 9/1999 | Machida | C08F 8/04 526/346 |
| 6,309,997 B1 | 10/2001 | Fujita et al. | |
| 6,399,724 B1 | 6/2002 | Matsui et al. | |
| 6,444,773 B1 * | 9/2002 | Markel | C08F 2/08 526/348 |
| 6,462,136 B1 | 10/2002 | Saito | |
| 6,531,555 B2 | 3/2003 | Whiteker | |
| 6,548,723 B2 | 4/2003 | Bagheri et al. | |
| 6,632,899 B2 | 10/2003 | Kol et al. | |
| 6,686,490 B1 | 2/2004 | Kol et al. | |
| 6,699,824 B1 * | 3/2004 | Dawson | A61K 8/347 510/130 |
| 6,869,917 B2 * | 3/2005 | Deckman | C10M 107/10 208/142 |
| 7,105,703 B1 | 9/2006 | Atwood | |
| 7,144,839 B2 | 12/2006 | Gibson et al. | |
| 7,241,714 B2 | 7/2007 | Boussie et al. | |
| 7,271,221 B2 * | 9/2007 | Stevens | C08F 10/00 525/240 |
| 7,300,903 B2 | 11/2007 | Fujita et al. | |
| 7,300,983 B2 * | 11/2007 | Degroot | C05F 10/00 525/236 |
| 7,385,015 B2 | 6/2008 | Holtcamp | |
| 7,531,602 B2 | 5/2009 | Hoang et al. | |
| 7,544,749 B2 | 6/2009 | Jones et al. | |

(Continued)

FOREIGN PATENT DOCUMENTS

| | | |
|---|---|---|
| CN | 101080399 | 11/2007 |
| CN | 101437827 | 5/2009 |

(Continued)

OTHER PUBLICATIONS

Busico et al. "Living Ziegler-Natta Polymerization: True or False?", Macromolecules Symposium, 226: 1-16, 2005.
Busico et al. "Reactivity of Secondary Metal-Alkyls in Catalytic Propene Polymerization: How Dormant Are 'Dormant Chains'?", Journal of the American Chemical Society, 127(6): 1608-1609, 2005.
Ciancaleone et al. "Activation of A Bis(Phenoxy-Amine) Precatalyst for Olefin Polymerization: First Evidence for an Outer Sphere Ion Pair With the Methylborate Counterion", Dalton Transactions, p. 8824-8827, 2009.
Ciancaleone et al. "Stucture-Activity Relationship in Olefin Polymerization Catalysis: Is Entropy the Key?", Journal of the American Chemical Society, JACS, 132: 13651-13653, 2010.

(Continued)

*Primary Examiner* — Rip A Lee
(74) *Attorney, Agent, or Firm* — Daniel N. Lundeen; Lundeen & Lundeen PLLC

(57) ABSTRACT

Polyalphaolefins and Salan catalysts, catalyst systems, and processes to produce the polyalphaolefins. Also disclosed are high-viscosity index polyalphaolefins and processes for producing them.

30 Claims, 1 Drawing Sheet

(56) References Cited

U.S. PATENT DOCUMENTS

| | | | |
|---|---|---|---|
| 7,547,811 B2* | 6/2009 | Kramer | C10G 50/02 585/510 |
| 7,550,640 B2* | 6/2009 | Surana | C07C 2/22 585/520 |
| 7,592,497 B2* | 9/2009 | Yang | C10G 50/02 585/520 |
| 7,696,123 B2 | 4/2010 | Schneider et al. | |
| 7,812,184 B2 | 10/2010 | Kondo et al. | |
| 7,880,047 B2* | 2/2011 | Knowles | B01J 8/20 585/502 |
| 7,989,565 B2 | 8/2011 | Gibson et al. | |
| 7,989,670 B2* | 8/2011 | Wu et al. | 585/523 |
| 8,058,373 B2 | 11/2011 | Stevens et al. | |
| 8,101,696 B2 | 1/2012 | Konze et al. | |
| 8,202,953 B2 | 6/2012 | Konze et al. | |
| 8,222,358 B2 | 7/2012 | Rodriguez et al. | |
| 8,227,392 B2* | 7/2012 | Wu et al. | 508/591 |
| 8,283,428 B2* | 10/2012 | Brant | C08F 10/00 526/160 |
| 8,299,189 B2 | 10/2012 | Boone et al. | |
| 8,329,835 B2* | 12/2012 | Goode | B01J 31/2295 526/160 |
| 8,399,724 B2* | 3/2013 | Crowther | C08F 210/14 585/10 |
| 8,399,725 B2* | 3/2013 | Brant | C08F 210/06 525/340 |
| 8,420,760 B2* | 4/2013 | Hughes | C08F 10/00 526/348 |
| 8,426,659 B2* | 4/2013 | Holtcamp | C08F 10/14 508/591 |
| 8,450,438 B2 | 5/2013 | Aboelella et al. | |
| 8,530,712 B2* | 9/2013 | Wu | C08F 10/00 508/591 |
| 8,623,974 B2* | 1/2014 | Jiang | C08F 210/06 526/134 |
| 8,742,049 B2* | 6/2014 | Lee | C08F 4/76 526/134 |
| 8,748,361 B2* | 6/2014 | Wu | C07C 5/05 508/591 |
| 8,921,291 B2* | 12/2014 | Wu | C10M 107/10 508/591 |
| 9,023,967 B2* | 5/2015 | Yu | C08F 110/02 526/194 |
| 9,156,929 B2* | 10/2015 | Al-Shammari | C08F 210/16 |
| 2002/0173604 A1 | 11/2002 | Kol et al. | |
| 2003/0027955 A1* | 2/2003 | Ishii | C08F 8/00 526/127 |
| 2003/0105250 A1 | 6/2003 | Whiteker | |
| 2004/0167016 A1 | 8/2004 | Holtcamp et al. | |
| 2005/0075242 A1 | 4/2005 | Holtcamp et al. | |
| 2005/0227860 A1 | 10/2005 | Green et al. | |
| 2006/0100092 A1 | 5/2006 | Jones et al. | |
| 2007/0021561 A1 | 1/2007 | Tse et al. | |
| 2007/0208148 A1 | 9/2007 | Rodriguez et al. | |
| 2008/0108499 A1 | 5/2008 | Coates et al. | |
| 2009/0005279 A1* | 1/2009 | Wu | C07C 5/05 508/591 |
| 2009/0036725 A1* | 2/2009 | Wu | C08F 10/00 585/521 |
| 2009/0043100 A1 | 2/2009 | Kondo et al. | |
| 2009/0099381 A1 | 4/2009 | Katsuki et al. | |
| 2009/0186995 A1 | 7/2009 | Canich et al. | |
| 2009/0318640 A1 | 12/2009 | Brant et al. | |
| 2009/0318644 A1 | 12/2009 | Brant et al. | |
| 2010/0081808 A1 | 4/2010 | Kondo et al. | |
| 2010/0298510 A1 | 11/2010 | Crowther et al. | |
| 2011/0124831 A1 | 5/2011 | Luo | |
| 2011/0152497 A1 | 6/2011 | Allen et al. | |
| 2011/0306740 A1 | 12/2011 | Nagy et al. | |
| 2011/0319578 A1 | 12/2011 | Hanaoka et al. | |
| 2012/0184676 A1 | 7/2012 | Gahleitner et al. | |
| 2012/0245312 A1 | 9/2012 | Holtcamp | |
| 2012/0316302 A1 | 12/2012 | Stewart | |
| 2013/0030135 A1 | 1/2013 | Hagadorn et al. | |
| 2013/0096271 A1 | 4/2013 | Kol et al. | |
| 2013/0253244 A1 | 9/2013 | Emett et al. | |
| 2013/0310529 A1* | 11/2013 | Kol et al. | 526/172 |
| 2014/0039137 A1 | 2/2014 | Giesbrecht et al. | |
| 2014/0039138 A1 | 2/2014 | Giesbrecht et al. | |
| 2014/0039139 A1 | 2/2014 | Giesbrecht et al. | |
| 2014/0039140 A1 | 2/2014 | Giesbrecht et al. | |
| 2014/0039141 A1 | 2/2014 | Giesbrecht et al. | |

FOREIGN PATENT DOCUMENTS

| | | | |
|---|---|---|---|
| EP | 1849775 | 10/2007 | |
| EP | 1849778 | 10/2007 | |
| EP | 2003135 | 12/2008 | |
| EP | 2532687 | 12/2012 | |
| JP | 2007284438 | 11/2007 | |
| WO | 9806727 | 2/1998 | |
| WO | 0236638 | 5/2002 | |
| WO | WO 02/088205 A2 * | 11/2002 | C08F 210/14 |
| WO | 03091292 | 11/2003 | |
| WO | 2004069881 | 8/2004 | |
| WO | 2007007893 | 1/2007 | |
| WO | 2009027516 | 3/2009 | |
| WO | 2011019474 | 2/2011 | |
| WO | 2011158241 | 12/2011 | |
| WO | 2012004680 | 1/2012 | |
| WO | 2012098521 | 1/2012 | |
| WO | 2013043796 | 3/2013 | |

OTHER PUBLICATIONS

Tshuva et al. "Single-Step Synthesis of Salans and Substituted Salans by Mannich Condensation", Tetrahedron Letters, 42: 6405-6407, 2001.
Official Action Dated Sep. 6, 2013 From the US Patent and Trademark Office Re. U.S. Appl. No. 13/805,011.
Restriction Official Action Dated May 13, 2013 From the US Patent and Trademark Office Re. U.S. Appl. No. 13/805,011.
Notice of Allowance Dated Jul. 1, 2014 From the US Patent and Trademark Office Re. U.S. Appl. No. 13/805,011.
Communication Pursuant to Article 94(3) EPC Dated Mar. 14, 2014 From the European Patent Office Re. Application No. 11736169.1.
Communication Relating to the Results of the Partial International Search Dated Apr. 19, 2012 From the International Searching Authority Re. Application No. PCT/IB2012/050267.
Corrected International Search Report and the Written Opinion Dated Sep. 25, 2012 From the International Searching Authority Re. Application No. PCT/IB2012/050267.
International Search Report and the Written Opinion Dated Jun. 19, 2012 From the International Searching Authority Re. Application No. PCT/IB2012/050267.
Office Action Dated Jul. 28, 2014 From the State Intellectual Property Office of the People's Republic of China Re. Application No. 201180039237.5.
Search Report Dated Jul. 28, 2014 From the State Intellectual Property Office of the People's Republic of China Re. Application No. 201180039237.5.
International Preliminary Report and the Written Opinion on Patentability Dated Jan. 3, 2013 From the International Bureau of WIPO Re. Application No. PCT/IL2011/000482.
International Search Report Dated Dec. 5, 2011 From the International Searching Authority Re. Application No. PCT/IL2011/000482.
International Preliminary Report and Written Opinion on Patentability Dated Jul. 23, 2013 From the International Bureau of WIPO Re. Application No. PCT/IB2012/050267.
Office Action Dated Jul. 28, 2014 From the State Intellectual Property Office of the People's Republic of China Re. Application No. 201180039237.5 Translation Into English.
PCT/IL2011/000482 International Search Report and Written Opinion, Jan. 13, 2013.
Berkessel, Albrecht et al., Ligands: Highly Enantioselective Titanium In Situ Catalysts for Asymmetric Epoxidation with Aqueous Hydrogen Peroxide, Adv. Synth Catal, 2007, vol. 349, pp. 2385-2391.

(56) References Cited

OTHER PUBLICATIONS

Whitelaw, Emma L. et al., Group 4 Salalen Complexes and Their Application for the Ring-Opening Polymerization of rac-Lactide, Inorg. Chem., 2010, vol. 49, pp. 7176-7181.
PCT/US2013/69419 International Search Report and Written Opinion, Mar. 7, 2014.
PCT/US2013/46569 International Search Report and Written Opinion, Jun. 13, 2014.
PCT/US2014/041362—ISR and WO, Oct. 1, 2014.
PCT/US2014/039786—ISR and WO, Sep. 29, 2014.
PCT/US2014/39766—ISR and WO, Oct. 31, 2014.
Immel et al., Cytotoxic dinuclear titanium-salan complexes: Structural and biological characterization, Journal of Inorganic Biochemistry, 2012, vol. 106, pp. 68-75.
PCT/US2013/046615 International Search Report and Written Opinion, Nov. 13, 2013.
PCT/US2013/053363 International Search Report and Written Opinion, Dec. 20, 2013.
Arredondo, Yolanda et al., Non-Catalyzed C-Alkylation of Phenols with Cyclic Secondary Alkyl Bromies, Synthetic Communications, 1996, vol. 26, No. 21, pp. 3885-3895.
Bryliakov, K. et al, Titanium-Salan-Catalyzed Asymmetric Oxidation of Sulfides and Kinetic Resolution of Sulfoxides with H2O2 as the Oxidant, Eur. J. Org. Chem., 2008, pp. 3369-3376.
Busico, Vincenzo et al, New Evidence on the Nature of the Active Sites in Heterogeneous Ziegler-Natta Catalysts for Propene Polymerization, 1997, Macromolecules, vol. 30, pp. 4786-4790.
Busico, Vincenzo et al., Mimicking Ziegler-Natta Catalysts in Homogeneous Phase, 1 C2-Symmetric Octahedral Zr (IV) Complexes with Tetradentate [ONNO]-Type Ligands, Macromol. Rapid Commun. 2001, vol. 22, No. 17, pp. 1405-1409.
Busico, Vincenzo et al., The first Molecularly Characterized Isotactic Polypropylene-block-polyethylene Obtained via "Quasi-Living" Insertion Polymerization, Macromolecules, 2003, vol. 36, No. 11, pp. 3806-3808.
Busico, Vincenzo et al., Block Copolymers of Highly Isotactic Polypropylene via Controlled Ziegler-Natta Polymerization, Macromolecules, 2004, vol. 37, No. 22, pp. 8201-8203.
Busico, Vincenzo et al., Design of stereoselective Ziegler-Natta propene polymerization catalysts, PNAS, 2006, vol. 103, No. 42, pp. 15321-15326.
Ciancaleoni, Gianluca et al., Structure/Properties Relationship for Bis{phenoxyamine}Zr(IV)-Based Olefin Polymerization Catalysts: A Simple OFT Model to Predict Catalytic Activity, Macromolecules, 2012, vol. 45, pp. 4046-4053.
Cipullo, Roberta et al., Improving the Behavior of Bis(phenoxyamine) Group 4 Metal Catalysts for Controlled Alkene Polymerization, 2009, Macromolecules, vol. 42, pp. 3869-3872.
Clarkson, Guy et al., Group 4 catalysts for ethene polymerization containing tetradentate salicylaldiminato ligands, 2006, Dalton Trans., pp. 5484-5491.
Cohen, AD et al., Construction of C1-symmetric zirconium complexes by the design of new Salan ligands. Coordination chemistry and preliminary polymerisation catalysis studies, Chem. Commun, 2008, pp. 2149-2151.
Cohen, AD et al., Cl-Symmetric Zirconium Complexes of [ONNO#]-Type Salan Ligands: Accurate Control of Catalyst Activity, Isospecificity, and Molecular Weight in 1-Hexene Polymerization, Organometallics, 2009, vol. 28, No. 5, pp. 1391-1405.
Cohen, AD et al., Same Ligand, Different Metals: Diiodo-Salan Complexes of the Group 4 Triad in Isospecific Polymerization of 1-Hexene and Propylene, Macromolecules, 2010, vol. 43, No. 4, pp. 1689-1691.
Corradini, Paolo et al., Do New Century Catalysts Unravel the Mechanism of Stereocontrol of Old Ziegler—Natta Catalysts?, Accounts of Chemical Research, 2004, vol. 37, No. 4, pp. 231-241.
Demetgul, Cahit et al., Synthesis and characterization of a Schiff base derived from 2-aminobenzylamine and its Cu(II) complex: electropolymerization of the complex on a platinum electrode, Journal of Coordination Chemistry, 2010, vol. 63, No. 12, pp. 2181-2191.

Egami, Hiromichi et al., Fe(salan)-Catalyzed Asymmetric Oxidation of Sulfides with Hydrogen Peroxide in Water, 2007, J. Am. Chem. Soc., vol. 129, pp. 8940-8941.
Egami, Hiromichi et al., Nb(salan)-Catalyzed Asymmetric Epoxidation of Allylic Alcohols with Hydrogen Peroxide, 2008, J. Am. Chem. Soc., vol. 47, pp. 5171-5174.
Egami, Hiromichi et al., Oxidation Catalysis of Nb(Salan) Complexes: Asymmetric Epoxidation of Allylic Alcohols Using Aqueous Hydrogen Peroxide as an Oxidant, 2010, J. Am. Chem. Soc., vol. 132, pp. 5886-5895.
Egami, Hiromichi et al., Enantioenriched Synthesis of C1-Symmetric BINOLs: Iron-Catalyzed Cross-Coupling of 2-Naphthols and Some Mechanistic Insight, 2010, J. Am. Chem. Soc., vol. 132, pp. 13633-13635.
Gendler, Shimrit, et al., Titanium and Zirconium Complexes of Robust Salophan Ligands. Coordination Chemistry and Olefin Polymerization Catalysis, J. Am. Chem. Soc., 2008, vol. 130, pp. 2144-2145.
Groysman, Stanislav et al., Salophan Complexes of Group IV Metals, Eur. J. Inorg. Chem. 2005, pp. 2480-2485.
Kondo, Shoichi et al., A μ-Oxo-μ-η2 :η2-Peroxo Titanium Complex as a Reservoir of Active Species in Asymmetric Epoxidation Using Hydrogen Peroxide, 2008, Agnew. Chem. Int. Ed., vol. 47, pp. 10195-10198.
Lamberti, Marina et al., Mechanism of stereospecific polymerization of α-olefins by late-transition metal and octahedral group 4 metal catalysts, Coord. Chem. Rev. vol. 253, 2009, pp. 2082-2097.
Leflon, P. et al., Determination of aluminum in bone in haemodialyzed patients, using inductively coupled argon plasma emission spectrometry, Clinica Chimica Acta, 1990, vol. 191, issues 1-2, pp. 31-38.
Manna, Cesar M. et al., Markedly different cytotoxicity of the two enantiomers of C2-symmetrical Ti(IV) phenolato complexes; mechanistic implications, 2010, Dalton Trans., vol. 39, pp. 1182-1184.
Matsumoto, Kazuhiro et al., Asymmetric catalysis of metal complexes with non-planar ONNO ligands: salen, salalen and salan, Chem. Commun., 2007, pp. 3619-3627.
Matsumoto, Kazuhiro et al., Asymmetric epoxidation of olefins catalyzed by Ti(salan) complexes using aqueous hydrogen peroxide as the oxidant, 2008, Pure and Applied Chemistry, vol. 80, pp. 1071-1077.
Matsumoto, Kazuhiro et al., Highly Enantioselective Epoxidation of Styrenes Catalyzed by Proline-Derived C1-Symmetric Titanium(Salan) Complexes, Angew. Chem. Int. Ed. 2009, vol. 48, pp. 7432-7435.
Meker, Sigalit. et al., Major impact of N-methylation on cytotoxicity and hydrolysis of salan Ti(IV) complexes: sterics and electronics are intertwined, 2011, Dalton Trans., vol. 40, pp. 9802-9809.
Nakano, Koji et al., Alternating Copolymerization of Cyclohexene Oxide with Carbon Dioxide Catalyzed by (salalen) CrCl Complexes, Macromelecules, 2009, vol. 42, pp. 6972-6980.
Press, Konstantin et al., Salalen Titanium Complexes in the Highly Isospecific Polymerization of 1-Hexene and Propylene, Angew. Chem., Int. Ed., 2011, vol. 50, pp. 3529-3532.
Press, Konstantin et al., Zirconium and hafnium Salalen complexes in isospecific polymerisation of propylene, Dalton Trans., 2013, vol. 42, pp. 9096-9103.
Sawada, Yuji, et al., Titanium-Salan-Catalyzed Asymmetric Epoxidation with Aqueous Hydrogen Peroxide as the Oxidant, Agnew. Chem. Int. Ed., 2006, vol. 45, pp. 3478-3480.
Segal, Sharon et al., Isospecific Polymerization of Vinylcyclohexane by Zirconium Complexes of Salan Ligands, Macromolecules, 2008, vol. 41, No. 5, pp. 1612-1617.
Segal, Sharon et al., Zirconium and Titanium Diamine Bis(phenolate) Catalysts for α-Olefin Polymerization: From Atactic Oligo(1-hexene) to Ultrahigh-Molecular-Weight Isotactic Poly(1-hexene), Organomellics, 2005, vol. 24, No. 2, pp. 200-202.
Sergeeva, Ekaterina et al., Salan ligands assembled around chiral bipyrrolidine: predetermination of chirality around octahedral Ti and Zr centres, Chem. Commun, 2009, pp. 3053-3055.

(56) References Cited

OTHER PUBLICATIONS

Sergeeva, Ekaterina et al., 2,2'-Bipyrrolidine versus 1,2-Diaminocyclohexane as Chiral Cores for Helically Wrapping Diamine—Diolate Ligands, Inorganic Chemistry, 2009, vol. 48, No. 17, pp. 8075-8077.
Seyforth, Dietmar, Alkyl and Aryl Derivatives of the Alkali Metals: Strong Bases and Reactive Nucleophiles. 2. Wilhelm Schlenk's Organoalkali-Metal Chemistry. The Metal Displacement and the Transmetalation Reactions. Metalation of Weakly Acidic Hydrocarbons. Superbases, Organometallics, 2009, vol. 28, pp. 2-33.
Stopper, Ayellet et al., Ring-Opening Polymerization of Lactide with Zr Complexes of {ONSO} Ligands: From Heterotactically Inclined to Isotactically Inclined Poly(lactic acid), Macromelecules, 2012, vol. 45, pp. 698-704.
Strianese M., et al., A Comparative Study on the Polymerization of α-Olefins Catalyzed by Salen and Salan Zirconium ComplexesMacromol. Chem. Phys. 2008, vol. 209, pp. 585-592.
Talarico, Giovanni et al., Origin of the Regiochemistry of Propene Insertion at Octahedral Column 4 Polymerization Catalysts: Design or Serendipity?, J. Am. Chem. Soc., 2003, vol. 125, pp. 7172-7173.
Tshuva, Edit Y. et al., Isospecific Living Polymerization of 1-Hexene by a Readily Available Nonmetallocene C2-Symmetrical Zirconium Catalyst, J. Am. Chem. Soc., 2000, vol. 122, pp. 10706-10707.

Yeori et al., Salalen: a hybrid Salan/Salen tetradentate [ONNO]-type ligand and its coordination behavior with group IV metals, Inorg. Chem. Commun., vol. 7, 2004, pp. 280-282.
Yeori, Adi et al., Diastereoisomerically Selective Enantiomerically Pure Titanium Complexes of Salan Ligands: Synthesis, Structure, and Preliminary Activity Studies, Inorganic Chemistry, 2005, vol. 44, No. 13, pp. 4466-4468.
Yeori, Adi et al., Diastereomerically-Specific Zirconium Complexes of Chiral Salan Ligands: Isospecific Polymerization of 1-Hexene and 4-Methyl-1-pentene and Cyclopolymerization of 1,5-Hexadiene, J. Am. Chem. Soc, 2006, vol. 128, pp. 13062-13063.
Yeori, Adi et al., Cyclopolymerization of 1,5-Hexadiene by Enantiomerically-Pure Zirconium Salan Complexes. Polymer Optical Activity Reveals α-Olefin Face Preference, Macromolecules, 2007, vol. 40, No. 24, pp. 8521-8523.
Zucchini, U. et al., Synthesis and Properties of Some Titanium and Zirconium Benzyl Derivatives, J. Organomet. Chem., 1971, vol. 26, pp. 357-372.
PCT/US2013/046538 International Search Report and Written Opinion, Nov. 8, 2013.
PCT/US2013/046582 International Search Report and Written Opinion, Nov. 5, 2013.
PCT/US2013/046601 International Search Report and Written Opinion, Nov. 13, 2013.

* cited by examiner

POLYALPHAOLEFINS PREPARED USING MODIFIED SALAN CATALYST COMPOUNDS

RELATED APPLICATIONS

This application is a national stage entry of international application PCT/US2013/053363, filed Aug. 2, 2013, and a continuation-in-part of copending application PCT/US2013/04665, filed Jun. 19, 2013, and a continuation-in-part of copending application U.S. Ser. No. 13/921,923, filed Jun. 19, 2013, and claims priority to and the benefit of provisional application US 61/679,640, filed Aug. 3, 2012.

FIELD OF THE INVENTION

This invention relates to polyalphaolefin polymers made with novel catalyst compounds comprising Salan ligands.

BACKGROUND OF THE INVENTION

Polyalpha-olefins (PAOs) comprise a class of hydrocarbons typically manufactured by the catalytic oligomerization (polymerization to low-molecular-weight products) of linear alpha-olefin (LAO) monomers. These typically range from 1-octene to 1-dodecene, with 1-decene being a suitable material, although oligomeric copolymers of lower olefins such as ethylene and propylene may also be used, including copolymers of ethylene with higher olefins. PAO products have achieved importance in the lubricating oil market. Typically there are two classes of synthetic hydrocarbon fluids (SHF) produced from linear alpha-olefins, the two classes of SHF being denoted as PAO and HVI-PAO (high viscosity index PAOs). PAOs and HVI-PAOs of different viscosity grades are typically produced using promoted $BF_3$ or $AlCl_3$ catalysts. Subsequent to polymerization, the PAO lubricant range products are typically hydrogenated in order to reduce the residual unsaturation, generally to a level of greater than 90%.

Synthetic PAOs have found wide acceptability and commercial success in the lubricant field for their superiority to mineral based lubricants. In terms of lubricant property improvement, industrial research efforts on synthetic lubricants have led to PAO fluids exhibiting useful viscosities over a wide range of temperature, i.e., improved viscosity index, while also showing lubricity, thermal and oxidative stability and pour point equal to or better than mineral oil. These relatively new synthetic lubricants lower mechanical friction, enhancing mechanical efficiency over the full spectrum of mechanical loads and do so over a wider range of operating conditions than mineral oil lubricants. Polyalpha-olefins of different viscosity grades are known to be useful in synthetic and semi-synthetic lubricants and grease formulations. See, for instance, Chapters 19 to 27 in Rudnick et al., "Synthetic Lubricants and High-Performance Functional Fluids", 2nd Ed. Marcel Dekker, Inc., N.Y. (1999). Compared to the conventional mineral oil-based products, these PAO-based products have excellent viscometrics, high and low temperature performance. They usually provide energy efficiency and extended service life.

HVI-PAOs are characterized by having a high viscosity index (VI) of about 130 and above, more preferably 150 and above, still more preferably 160 and above, yet still more preferably 200 and above, and one or more of the following characteristics: a branch ratio of less than 0.19, a weight average molecular weight of between 300 and 45,000, a number average molecular weight of between 300 and 18,000, a molecular weight distribution of between 1 and 5, and pour point below −15° C. Measured in carbon number, these molecules range from $C_{30}$ to $C_{1300}$. Viscosities of the HVI-PAO oligomers measured at 100° C. range from 3 centistokes ("cSt") to 15,000 cSt. These HVI-PAOs have been used as basestocks in engine and industrial lubricant formulations.

In the production of PAOs and HVI-PAOs, the feed is usually limited to one specific alpha-olefins, usually 1-decene. Occasionally, when 1-decene is not available in large enough quantity, small to moderate amounts of 1-octene or 1-dodecene is added to make up the quantity. It is generally thought that 1-decene is the most preferred feed (see reference "Wide-Temperature Range Synthetic Hydrocarbon Fluids" by J. A. Brennen, Ind. Eng. Chem. Prod. Res. Dev., 19, 2-6 (1980). When mixtures of feed are used, the products tend to be blocky copolymers rather than random copolymers and/or products produced at the beginning of the process are different than that produced at the end of the process, and the inhomogeneous polymer product will be characterized by poor viscosity indices (VI) and poor low temperature properties are produced. Thus, in the past, PAOs and HVI-PAOs have generally been made using pure $C_{10}$ feeds.

Efforts have been made to prepare various PAOs using metallocene catalyst systems where PAOs are produced from meso-forms of certain metallocene catalysts under high hydrogen pressure. The use of rac-ethyl-bis(indenyl) zirconium dichloride or rac-dimethylsilyl-bis(2-methyl-indenyl) zirconium dichloride in combination with MAO at 40° C. (at 200 psi hydrogen or 1 mole of hydrogen) to produce isotactic polydecene have also been reported. Others have made various PAOs, such as polydecene, using various metallocene catalysts not typically known to produce polymers or oligomers with any specific tacticity.

To date however, PAOs made with metallocenes have not found wide applicability in the marketplace, particularly the lubricant marketplace, due to inefficient process, cost and property deficits. Accordingly, there exists a need in the art for providing PAOs and or HVI-PAOs and an improved process to produce them. There is a need in the art for new and improved catalysts and catalyst systems to obtain new and improved PAOs, polymerization processes, and the like. Accordingly, there is a need in the art for new and improved catalyst systems for the polymerization of olefins, in order to achieve specific properties.

SUMMARY OF THE INVENTION

The instant disclosure is directed to catalyst compounds, catalyst systems comprising such compounds, processes for the preparation of the catalyst compounds and systems, and processes for the polymerization of olefins using such catalyst compounds and systems, and the polymers produced thereby.

In an embodiment, a process comprises contacting one or more olefins with a catalyst system at a temperature, a pressure, and for a period of time sufficient to produce a polyalphaolefin comprising at least 50 mol % $C_5$ to $C_{24}$ olefin, wherein the catalyst system comprises Group 3, 4, 5 and/or 6 disubstituted compounds supported by a tetradentate di-anionic Salan ligand.

In an embodiment, a process comprises contacting one or more olefins with a catalyst system at a temperature, a pressure, and for a period of time sufficient to produce a polyalphaolefin comprising at least 50 mol % $C_5$ to $C_{24}$ olefin, wherein the catalyst system comprises Group 3, 4, 5 and/or 6 disubstituted compounds supported by a heteroaryl-substituted tetradentate di-anionic Salan ligand.

In an embodiment, a process comprises contacting one or more olefins with a catalyst system at a temperature, a pressure, and for a period of time sufficient to produce a polyalphaolefin comprising at least 50 mol % $C_5$ to $C_{24}$ olefin, wherein the catalyst system comprises Group 3, 4, 5 and/or 6 disubstituted compounds supported by a non-symmetrical heteroaryl-substituted tetradentate di-anionic Salan ligand.

In an embodiment, a process comprises contacting one or more olefins with a catalyst system at a temperature, a pressure, and for a period of time sufficient to produce a polyalphaolefin comprising at least 50 mol % $C_5$ to $C_{24}$ olefin, wherein the catalyst system comprises Group 3, 4, 5 and/or 6 disubstituted compounds supported by a carbazole-substituted tetradentate di-anionic Salan ligand.

In an embodiment, a process comprises contacting one or more olefins with a catalyst system at a temperature, a pressure, and for a period of time sufficient to produce a polyalphaolefin comprising at least 50 mol % $C_5$ to $C_{24}$ olefin, wherein the catalyst system comprises Group 3, 4, 5 and/or 6 disubstituted compounds supported by a halogenated tetradentate di-anionic Salan ligand.

In an embodiment, a process comprises contacting one or more olefins with a catalyst system at a temperature, a pressure, and for a period of time sufficient to produce a polyalphaolefin comprising at least 50 mol % $C_5$ to $C_{24}$ olefin; the catalyst system comprising an activator and a catalyst compound according to Formula I, Formula II, Formula III, or a combination thereof:

Formula I being represented by:

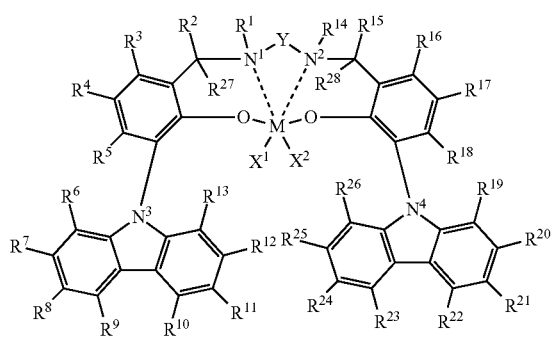

wherein M is a Group 3, 4, 5 or 6 transition metal;

each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is independently, a hydrogen, a $C_1$-$C_{40}$ hydrocarbyl radical, a functional group comprising elements from Groups 13-17 of the periodic table of the elements, or two or more of $R^1$ to $R^{28}$ may independently join together to form a $C_4$ to $C_{62}$ cyclic or polycyclic ring structure, or a combination thereof, or a combination thereof; and Y is a divalent $C_1$ to $C_{20}$ hydrocarbyl;

Formula II being represented by:

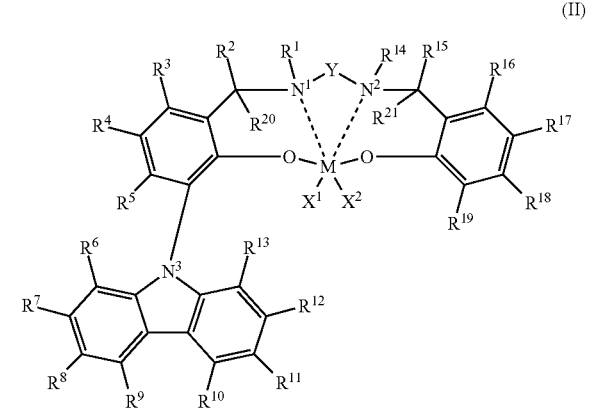

wherein M is a Group 3, 4, 5 or 6 transition metal;

each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is, independently, a hydrogen, a $C_1$-$C_{40}$ hydrocarbyl radical, a functional group comprising elements from Group 13-17 of the periodic table of the elements, or two or more of $R^1$ to $R^{21}$ may independently join together to form a $C_4$ to $C_{62}$ cyclic or polycyclic ring structure, or a combination thereof; subject to the proviso that $R^{19}$ is not a carbazole or a substituted carbazole radical, and Y is a divalent $C_1$ to $C_{20}$ hydrocarbyl radical;

Formula III being represented by:

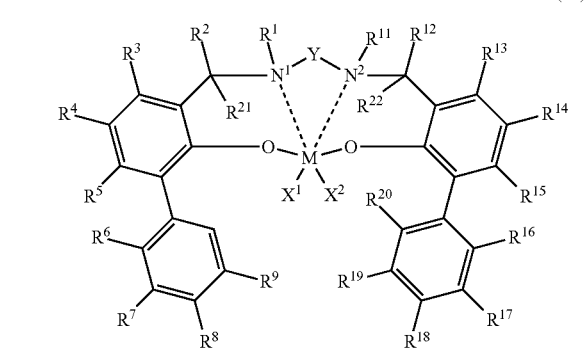

wherein M is a Group 3, 4, 5 or 6 transition metal;

each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ is, independently, a hydrogen, a $C_1$-$C_{40}$ hydrocarbyl radical, a functional group comprising elements from Group 13-17 of the periodic table of the elements, or two or more of $R^1$ to $R^{21}$ may independently join together to form a $C_4$ to $C_{62}$ cyclic or polycyclic ring structure, or a combination thereof;

at least one of $R^6$, $R^7$, $R^8$, $R^9$, $R^{10}$, $R^{16}$, $R^{17}$, $R^{18}$, $R^{19}$ or $R^{20}$ comprise fluorine; and Y is a divalent $C_1$ to $C_{20}$ hydrocarbyl radical.

In an embodiment, a polyalphaolefin comprises the polymer produced by any one of the foregoing processes. In an embodiment, a polyalphaolefin comprises at least 50 mol % $C_5$ to $C_{24}$ olefin, the polymer produced by a process comprising contacting one or more olefins with a catalyst system at a temperature, a pressure, and for a period of time sufficient to produce a polyalphaolefin, the catalyst system comprising an activator and a catalyst as described herein.

DETAILED DESCRIPTION

Figure 1:
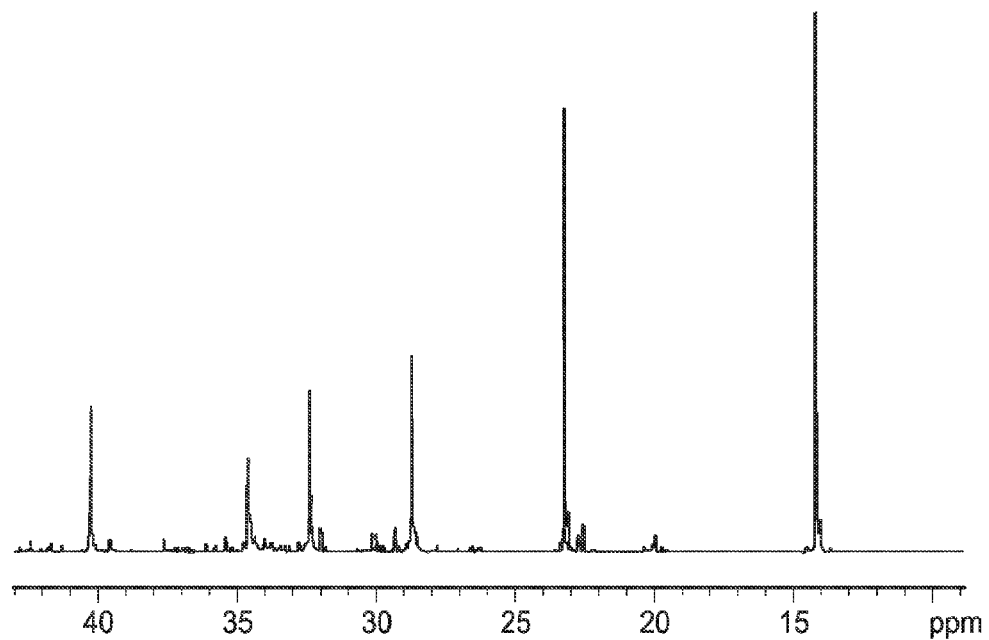
FIG. 1 is a $^{13}$C NMR image for poly-(1-hexene) made with Compound B/MAO according to an embodiment of the invention.

For the purposes of this invention and the claims thereto, the new numbering scheme for the Periodic Table Groups is used as in Chem. Eng. News, 1985, 63, 27. Therefore, a "Group 4 metal" is an element from Group 4 of the Periodic Table.

In the structures depicted throughout this specification and the claims, a solid line indicates a bond, an arrow indicates that the bond may be dative, and each dashed line represents a bond having varying degrees of covalency and a varying degree of coordination.

For the purposes herein the term "polyalphaolefin" or "PAO" includes homopolymers and copolymers of alpha-olefin monomers.

The terms "hydrocarbyl radical," "hydrocarbyl" and "hydrocarbyl group" are used interchangeably throughout this document unless otherwise specified. For purposes of this disclosure, a hydrocarbyl radical is defined to be $C_1$ to $C_{70}$ radicals, or $C_1$ to $C_{20}$ radicals, or $C_1$ to $C_{10}$ radicals, or $C_6$ to $C_{70}$ radicals, or $C_6$ to $C_{20}$ radicals, or $C_7$ to $C_{20}$ radicals that may be linear, branched, or cyclic where appropriate (aromatic or non-aromatic); and includes hydrocarbyl radicals substituted with other hydrocarbyl radicals and/or one or more functional groups comprising elements from Groups 13-17 of the periodic table of the elements. In addition two or more such hydrocarbyl radicals may together form a fused ring system, including partially or fully hydrogenated fused ring systems, which may include heterocyclic radicals.

For purposes herein, a carbazole or substituted carbazole radical is represented by the formula:

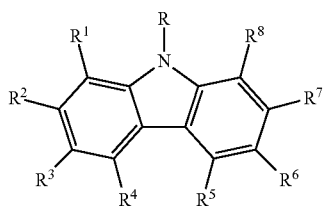

wherein each $R^1$ through $R^8$ is, independently, a hydrogen, a $C_1$-$C_{40}$ hydrocarbyl radical, a functional group comprising elements from Group 13-17 of the periodic table of the elements, or two or more of $R^1$ to $R^8$ may independently join together to form a $C_4$ to $C_{62}$ cyclic or polycyclic ring structure, or a combination thereof.

The term "substituted" means that a hydrogen atom and/or a carbon atom in the base structure has been replaced with a hydrocarbyl radical, and/or a functional group, and/or a heteroatom or a heteroatom containing group. Accordingly, the term hydrocarbyl radical includes heteroatom containing groups. For purposes herein, a heteroatom is defined as any atom other than carbon and hydrogen. For example, methyl cyclopentadiene (Cp) is a Cp group, which is the base structure, substituted with a methyl radical, which may also be referred to as a methyl functional group, ethyl alcohol is an ethyl group, which is the base structure, substituted with an —OH functional group, and pyridine is a phenyl group having a carbon in the base structure of the benzene ring substituted with a nitrogen atom.

For purposes herein, a hydrocarbyl radical may be independently selected from substituted or unsubstituted methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, cicosynyl, hencicosynyl, docosynyl, tricoscnyl, tetracosynyl, pentacosynyl, hexacosynyl, heptacosynyl, octacosynyl, nonacosynyl, and triacontynyl.

For purposes herein, hydrocarbyl radicals may also include isomers of saturated, partially unsaturated and aromatic cyclic structures wherein the radical may additionally be subjected to the types of substitutions described above. The term "aryl", "aryl radical", and/or "aryl group" refers to aromatic cyclic structures, which may be substituted with hydrocarbyl radicals and/or functional groups as defined herein. Examples of aryl radicals include: acenaphthenyl, acenaphthylenyl, acridinyl, anthracenyl, benzanthracenyls, benzimidazolyl, benzisoxazolyl, benzofluoranthenyls, benzofuranyl, benzoperylenyls, benzopyrenyls, benzothiazolyl, benzothiophenyls, benzoxazolyl, benzyl, carbazolyl, carbolinyl, chrysenyl, cinnolinyl, coronenyl, cyclohexyl, cyclohexenyl, methylcyclohexyl, dibenzoanthracenyls, fluoranthenyl, fluorenyl, furanyl, imidazolyl, indazolyl, in denopyrenyls, indolyl, indolinyl, isobenzofuranyl, isoindolyl, isoquinolinyl, isoxazolyl, methyl benzyl, methylphenyl, naphthyl, oxazolyl, phenanthrenyl, phenyl, purinyl, pyrazinyl, pyrazolyl, pyrenyl, pyridazinyl, pyridinyl, pyrimidinyl, pyrrolyl, quinazolinyl, quinolonyl, quinoxalinyl, thiazolyl, thiophenyl, and the like.

It is to be understood that for purposes herein, when a radical is listed, it indicates that the base structure of the radical (the radical type) and all other radicals formed when that radical is subjected to the substitutions defined above. Alkyl, alkenyl, and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and nevopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (and cyclobutenyls and cyclopropenyls). Cyclic compounds having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

Likewise the terms "functional group", "group" and "substituent" are also used interchangeably throughout this document unless otherwise specified. For purposes herein, a functional group includes both organic and inorganic radicals and moieties comprising elements from Groups 13, 14, 15, 16, and 17 of the periodic table of elements. Suitable functional groups may include hydrocarbyl radicals, e.g., alkyl radicals, alkene radicals, aryl radicals, and/or halogen (Cl, Br, I, F), O, S, Se, Te, $NR^*_x$, $OR^*$, $SeR^*$, $TeR^*$, $PR^*_x$, $AsR^*_x$, $SbR^*_x$, $SR^*$, $BR^*_x$, $SiR^*_x$, $GeR^*_x$, $SnR^*_x$, $PbR^*_x$, and/or the like, wherein R is a $C_1$ to $C_{20}$ hydrocarbyl as defined above and wherein x is the appropriate integer to provide an electron neutral moiety. Other examples of functional groups include those typically referred to as amines, imides, amides, ethers, alcohols (hydroxides), sulfides, sulfates, phosphides, halides, phosphonates, alkoxides, esters, carboxylates, aldehydes, and the like.

For purposes herein an "olefin," alternatively referred to as "alkene," is a linear, branched, or cyclic compound comprising carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

For purposes herein a "polymer" has two or more of the same or different "mer" units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically. Accordingly, the definition of copolymer, as used herein, includes terpolymers and the like. An oligomer is typically a polymer having a low molecular weight, such an Mn of less than 25,000 g/mol, or in an embodiment less than 2,500 g/mol, or a low number of mer units, such as 75 mer units or less. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

For the purposes of this disclosure, the term "α-olefin" includes $C_2$-$C_{22}$ olefins. Non-limiting examples of α-olefins include ethylene, propylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include cyclopropene, cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

The terms "catalyst", "catalyst compound", and "transition metal compound" are defined to mean a compound capable of initiating polymerization catalysis under the appropriate conditions. In the description herein, the catalyst may be described as a catalyst precursor, a pre-catalyst compound, or a transition metal compound, and these terms are used interchangeably. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor. A "catalyst system" is combination of at least one catalyst compound, at least one activator, which may include a co-activator, and/or a support material, where the system can polymerize monomers to polymer. For the purposes of this invention and the claims thereto, when catalyst systems are described as comprising neutral stable forms of the components it is well understood by one of ordinary skill in the art that the ionic form of the component is the form that reacts with the monomers to produce polymers.

For purposes herein the term "catalyst productivity" is a measure of how many grams of polymer (P) are produced using a polymerization catalyst comprising W g of catalyst (cat), over a period of time of T hours; and may be expressed by the following formula: P/(T×W) and expressed in units of $gPgcat^{-1}hr^{-1}$. Conversion is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used (kg P/mol cat).

An "anionic ligand" is a negatively charged ligand which donates one or more pairs of electrons to a metal ion. A "neutral donor ligand" is a neutrally charged ligand which donates one or more pairs of electrons to a metal ion.

A scavenger is a compound that is typically added to facilitate oligomerization or polymerization by scavenging impurities. Some scavengers may also act as activators and may be referred to as co-activators. A co-activator, that is not a scavenger, may also be used in conjunction with an activator in order to form an active catalyst. In an embodiment a co-activator can be pre-mixed with the catalyst compound to form an alkylated catalyst compound.

A propylene polymer is a polymer having at least 50 mol % of propylene. As used herein, for propylene polymers, Mn is number average molecular weight as determined by proton nuclear magnetic resonance spectroscopy ($^1$H NMR) unless stated otherwise, Mw is weight average molecular weight determined by gel permeation chromatography (GPC), and Mz is z average molecular weight determined by GPC, wt % is weight percent, and mol % is mole percent. For all other polyalpha-olefins, Mw and Mn are determined by gas chromatography (GC) for polymers having a kinematic viscosity at 100° C. as determined according to ASTM D445 (KV100) less than 10 cSt, and by GPC for KV100 of 10 cSt or higher. Molecular weight distribution (MWD) is defined to be Mw divided by Mn. Unless otherwise noted, all molecular weight units, e.g., Mw, Mn, Mz, are g/mol.

The following abbreviations may be used through this specification: Me is methyl, Ph is phenyl, Et is ethyl, Pr is propyl, iPr is isopropyl, n-Pr is normal propyl, Bu is butyl, iso-butyl is isobutyl, sec-butyl refers to secondary butyl, tert-butyl, refers to tertiary butyl, n-butyl is normal butyl, pMe is para-methyl, Bz is benzyl, THF is tetrahydrofuran, Mes is mesityl, also known as 1,3,5-trimethylbenzene, Tol is toluene, TMS is trimethylsilyl, TIBAL is triisobutylaluminum, TNOAL is triisobutyl n-octylaluminum, MAO is methylalumoxane, and MOMO is methoxymethoxy (also referred to as methoxymethyl ether).

For purposes herein, RT is room temperature, which is defined as 25° C. unless otherwise specified. All percentages are weight percent (wt %) unless otherwise specified.

In the description herein, the Salan catalyst may be described as a catalyst precursor, a pre-catalyst compound, Salan catalyst compound or a transition metal compound, and these terms are used interchangeably.

Catalyst Compounds

In an embodiment, the catalyst comprises Group 3, 4, 5 and/or 6 disubstituted compounds supported by a tetradentate di-anionic Salan ligand, useful to polymerize olefins and/or α-olefins to produce polyolefins and/or poly(α-olefins). In an embodiment the ligand is heteroaryl-substituted. In an embodiment the heteroaryl substituent comprises nitrogen, or comprises carbazole. In an embodiment, the heteroaryl-substituted ligand is non-symmetrical. In an additional or alternative embodiment, the ligand is halogenated.

In an embodiment, the catalyst compounds are represented by the following structure:

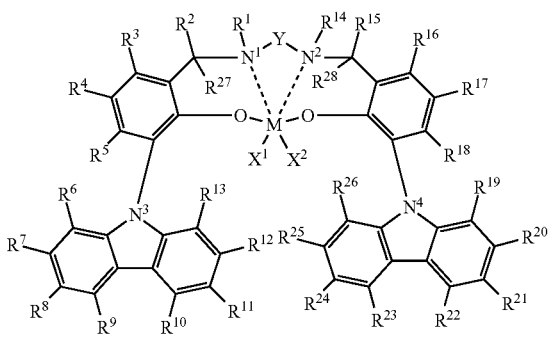

where each solid line represents a covalent bond and each dashed line represents a bond having varying degrees of covalency and a varying degree of coordination;

M is a Group 3, 4, 5 or 6 transition metal covalently bonded to each oxygen atom, and bonded with varying degrees of covalency and coordination to each of nitrogen atoms $N^1$ and $N^2$;

each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$ and $R^{28}$ is, independently, a hydrogen, a $C_1$-$C_{40}$ hydrocarbyl, a functional group comprising elements from Group 13-17 of the periodic table of the elements, or two or more of $R^1$ to $R^{28}$ may independently join together to form a $C_4$ to $C_{62}$ cyclic or polycyclic ring structure, or a combination thereof; and Y is a divalent hydrocarbyl radical covalently bonded to and bridging between both of the nitrogen atoms $N^1$ and $N^2$. In an embodiment, two or more of $R^1$ to $R^{28}$ may independently join together to form a $C_4$ to $C_{62}$ cyclic or polycyclic ring structure.

In an embodiment, the catalyst compound is represented by the formula:

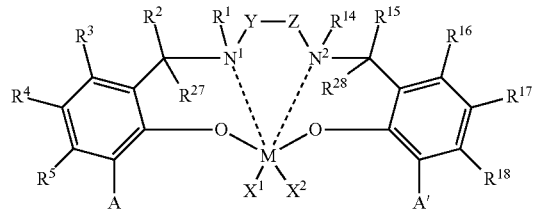

wherein: A is represented by the formula, attached to the nitrogen atom, labeled $N^3$ of the carbazole ring:

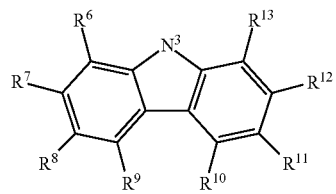

wherein A' is represented by the formula, attached to the nitrogen atom labeled $N^4$ of the carbazole ring:

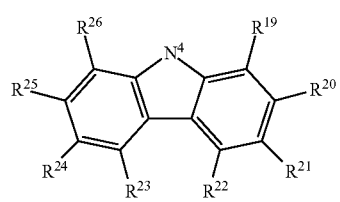

Wherein M is a Group 3, 4, 5 or 6 transition metal;

each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is independently, a hydrogen, a $C_1$-$C_{40}$ hydrocarbyl radical, a functional group comprising elements from Group 13-17 of the periodic table of the elements, or two or more of $R^1$ to $R^{28}$ may independently join together to form a $C_4$ to $C_{62}$ cyclic or polycyclic ring structure, or a combination thereof; and Y and Z form a divalent $C_1$ to $C_{20}$ hydrocarbyl radical. In an embodiment, Y and Z are identical. In an embodiment, Y and Z are different.

In an embodiment, M is a Group 4 metal, or M is Hf, Ti and/or Zr, or M is Hf or Zr. In an embodiment, each of $X^1$ and $X^2$ is independently selected from the group consisting of hydrocarbyl radicals having from 1 to 20 carbon atoms, hydrides, amides, alkoxides having from 1 to 20 carbon atoms, sulfides, phosphides, halides, amines, phosphines, ethers, and combinations thereof.

In an embodiment, $X^1$ and $X^2$ together form a part of a fused ring or a ring system having from 4 to 62 carbon atoms.

In an embodiment, each of $X^1$ and $X^2$ is independently selected from the group consisting of halides, alkyl radicals having from 1 to 7 carbon atoms, benzyl radicals, or a combination thereof.

In an embodiment, Y is a divalent $C_1$-$C_{40}$ hydrocarbyl radical comprising a portion that comprises a linker backbone comprising from 1 to 18 carbon atoms linking or bridging between nitrogen atoms $N^1$ and $N^2$. In an embodiment, Y is a $C_1$-$C_{40}$ hydrocarbyl radical comprising a portion that comprises a linker backbone comprising from 1 to 18 carbon atoms linking the nitrogen atoms $N^1$ and $N^2$ wherein the hydrocarbyl comprises O, S, S(O), S(O)$_2$, Si(R*)$_2$, P(R), N or N(R*), wherein each R* is independently a $C_1$-$C_{18}$ hydrocarbyl. In an embodiment, Y is selected from the group consisting of ethylene (—CH$_2$CH$_2$—) and 1,2-cyclohexylene, and/or —CH$_2$CH$_2$CH$_2$— derived from propylene. In an embodiment, Y is —CH$_2$CH$_2$CH$_2$— derived from propylene.

In an embodiment, each X is, independently, a halogen or a $C_1$ to $C_7$ hydrocarbyl radical.

In an embodiment, each X is a benzyl radical. In an embodiment, each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$ $R^{24}$, $R^{25}$, $R^{26}$, $R^{27}$, and $R^{28}$ is, independently, hydrogen, a halogen, or a $C_1$ to $C_{30}$ hydrocarbyl radical, or a $C_1$ to $C_{10}$ hydrocarbyl radical. In an embodiment, one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$ $R^{24}$, $R^{25}$, $R^{26}$, $R^{27}$, and $R^{28}$ is a methyl radical, a fluoride, or a combination thereof.

In an embodiment, M is Zr; $X^1$ and $X^2$ are benzyl radicals; $R^1$ and $R^{14}$ are methyl radicals; $R^2$ through $R^{13}$ and $R^{15}$ through $R^{28}$ are hydrogen; and Y is ethylene (—CH$_2$CH$_2$—).

In an embodiment, M is Zr; $X^1$ and $X^2$ are benzyl radicals; $R^1$, $R^4$, $R^{14}$ and $R^{17}$ are methyl radicals; $R^2$, $R^3$, $R^5$ through $R^{13}$, $R^{15}$, $R^{16}$ and $R^{18}$ through $R^{28}$ are hydrogen; and Y is ethylene (—CH$_2$CH$_2$—).

In an embodiment, M is Zr; $X^1$ and $X^2$ are benzyl radicals; $R^1$ and $R^{14}$ are methyl radicals; $R^4$ and $R^{17}$ are fluoro (F) functional groups; $R^2$, $R^3$, $R^5$ through $R^{13}$, $R^{15}$, $R^{16}$ and $R^{18}$ through $R^{28}$ are hydrogen; and Y is ethylene —CH$_2$CH$_2$—).

In an embodiment, M is Zr; $X^1$ and $X^2$ are benzyl radicals; $R^1$, $R^4$, $R^{14}$ and $R^{17}$ are methyl radicals; $R^8$, $R^{11}$, $R^{21}$ and $R^{24}$ are tert-butyl radicals; $R^2$, $R^3$, $R^5$, $R^6$, $R^7$, $R^9$, $R^{10}$, $R^{12}$, $R^{13}$, $R^{15}$, $R^{16}$, $R^{18}$, $R^{19}$, $R^{20}$, $R^{22}$, $R^{23}$, $R^{25}$, $R^{26}$, $R^{27}$, and $R^{28}$ are hydrogen; and
Y is ethylene (—CH$_2$CH$_2$—).

In an embodiment, M is Zr; $X^1$ and $X^2$ are benzyl radicals; $R^1$, $R^4$, $R^{14}$ and $R^{17}$ are methyl radicals; $R^8$, $R^{11}$, $R^{21}$ and $R^{24}$ are mesityl radicals; $R^2$, $R^3$, $R^5$, $R^6$, $R^7$, $R^9$, $R^{10}$, $R^{12}$, $R^{13}$, $R^{15}$, $R^{16}$, $R^{18}$, $R^{19}$, $R^{20}$, $R^{22}$, $R^{23}$, $R^{25}$, $R^{26}$, $R^{27}$, and $R^{28}$ are hydrogen; and
Y is ethylene (—CH$_2$CH$_2$—).

In an embodiment, the catalyst comprises Group 3, 4, 5 and/or 6 disubstituted compounds supported by a tetradentate di-anionic Salan ligand, useful to polymerize olefins and/or α-olefins to produce polyolefins and/or poly(α-olefins). In an embodiment, the catalyst compounds are represented by the following structure:

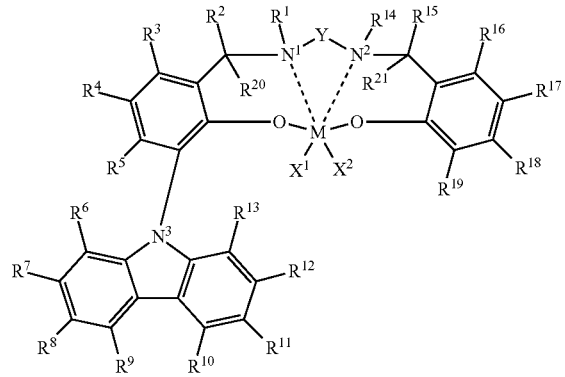

where each solid line represents a covalent bond and each dashed line represents a bond having varying degrees of covalency and a varying degree of coordination;

M is a Group 3, 4, 5 or 6 transition metal covalently bonded to each oxygen atom, and bonded with varying degrees of covalency and coordination to each of nitrogen atoms $N^1$ and $N^2$;

each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is independently, a hydrogen, a $C_1$-$C_{40}$ hydrocarbyl, a functional group comprising elements from Group 13-17 of the periodic table of the elements, or two or more of $R^1$ to $R^{21}$ may independently join together to form a $C_4$ to $C_{62}$ cyclic or polycyclic ring structure, or a combination thereof, subject to the proviso that $R^{19}$ is not a carbazole or a substituted carbazole radical; and Y is a divalent hydrocarbyl radical covalently bonded to and bridging between both of the nitrogen atoms $N^1$ and $N^2$. In an embodiment, two or more of $R^1$ to $R^{21}$ may independently join together to form a $C_4$ to $C_{62}$ cyclic or polycyclic ring structure. Accordingly, an embodiment of the instant disclosure is directed to non-symmetrical Salan catalysts. The Salan catalysts disclosed in an embodiment herein are devoid of a symmetry element, having a non-symmetric or non-palindromic structure. By non-symmetric, it is meant that the two phenol moieties of the Salan compound are substituted differently when comparing the substitutions of one phenol, which comprises a carbazole or substituted carbazole radical, and the other phenol which does not comprise a carbazole or a substituted carbazole radical at position $R^{19}$ (i.e., subject to the proviso that $R^{19}$ is not a carbazole or a substituted carbazole radical), as is shown in the above structure.

In an embodiment, the catalyst compounds are represented by the formula:

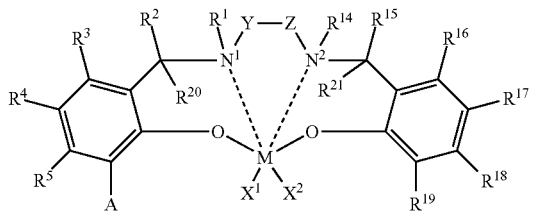

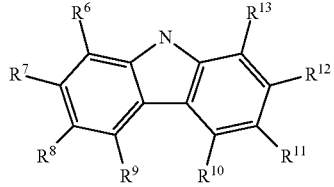

wherein A is a heteroaryl radical;

M is a Group 3, 4, 5 or 6 transition metal;

each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;

each $R^1$, $R^2$, $R^3$, $R^4$, $R^5$, $R^{14}$, $R^{15}$, $R^{16}$, $R^{17}$, $R^{18}$, $R^{19}$, $R^{20}$, and $R^{21}$ is independently, a hydrogen, a $C_1$-$C_{40}$ hydrocarbyl, a functional group comprising elements from Group 13-17 of the periodic table of the elements, or two or more of $R^1$ to $R^5$ and $R^{14}$ to $R^{21}$ may independently join together to form a $C_4$ to $C_{62}$ cyclic or polycyclic ring structure, or a combination thereof, subject to the proviso that $R^{19}$ is not identical to A; and Y and Z together form a divalent $C_1$ to $C_{20}$ hydrocarbyl radical.

In an embodiment, A comprises a heteroaryl radical comprising nitrogen. In an embodiment A comprises a carbazolyl radical. In an embodiment, $R^{19}$ is a carbazole that is substituted differently than $R^6$-$R^{13}$ of the carbazolyl radical A. E.g., if all of $R^6$ through $R^{13}$ of the carbazolyl radical A are hydrogen (unsubstituted), then in an embodiment, $R^{19}$ comprises a carbazole ring wherein one or more of the substituents of the $R^{19}$ carbazole ring are substituted. In an embodiment, if one or more of $R^6$ through $R^{13}$ of the carbazolyl radical A are substituted, then the corresponding substituents of an $R^{19}$ carbazole ring are unsubstituted, each have different substituents, or the substituents are located at different positions relative to the ring structure. In an embodiment, $R^{19}$ is not a nitrogen containing heteroaryl. In an embodiment, $R^{19}$ is a nitrogen containing heteroaryl other than carbazole. In an embodiment, $R^{19}$ comprises hydrogen or a $C_1$-$C_{40}$ hydrocarbyl.

In an embodiment, a catalyst compound is represented by the structure

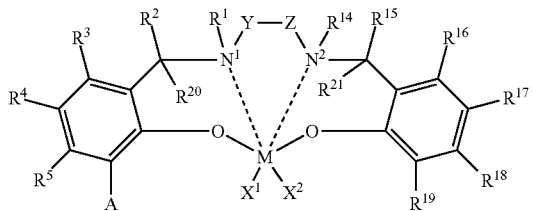

wherein A is represented by the structure attached at the carbazole nitrogen atom:

where each solid line represents a covalent bond and each dashed line represents a bond having varying degrees of covalency and a varying degree of coordination;

M is a Group 3, 4, 5 or 6 transition metal covalently bonded to each oxygen atom, and bonded with varying degrees of covalency and coordination to each of nitrogen atoms $N^1$ and $N^2$;

each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is independently, a hydrogen, a $C_1$-$C_{40}$ hydrocarbyl, a functional group comprising elements from Group 13-17 of the periodic table of the elements, or a combination thereof, subject to the proviso that $R^{19}$ is not identical to A; and Y and Z form a divalent hydrocarbyl radical covalently bonded to and bridging between both of the nitrogen atoms $N^1$ and $N^2$. In an embodiment, Y is identical to Z. In an embodiment, Y is different to Z. In an embodiment, two or more of $R^1$ to $R^{21}$ may independently join together to form a $C_4$ to $C_{62}$ cyclic or polycyclic ring structure.

In an embodiment, M is a Group 4 metal, or M is Hf, Ti and/or Zr, or M is Hf or Zr. In an embodiment, each of $X^1$ and $X^2$ is independently selected from the group consisting of hydrocarbyl radicals having from 1 to 20 carbon atoms, hydrides, amides, alkoxides having from 1 to 20 carbon atoms, sulfides, phosphides, halides, amines, phosphines, ethers, and combinations thereof.

In an embodiment, $X^1$ and $X^2$ together form a part of a fused ring or a ring system having from 4 to 62 carbon atoms.

In an embodiment, each of $X^1$ and $X^2$ is independently selected from the group consisting of halides, alkyl radicals having from 1 to 7 carbon atoms, benzyl radicals, or a combination thereof.

In an embodiment, Y is a divalent $C_1$-$C_{40}$ hydrocarbyl radical comprising a portion that comprises a linker backbone comprising from 1 to 18 carbon atoms linking or bridging between nitrogen atoms $N^1$ and $N^2$. In an embodiment, Y is a $C_1$-$C_{40}$ hydrocarbyl radical comprising a portion that comprises a linker backbone comprising from 1 to 18 carbon atoms linking the nitrogen atoms $N^1$ and $N^2$ wherein the hydrocarbyl comprises O, S, S(O), S(O)$_2$, Si(R*)$_2$, P(R*), N or N(R*), wherein each R* is independently a $C_1$-$C_{18}$ hydrocarbyl. In an embodiment, Y is selected from the group consisting of ethylene (—CH$_2$CH$_2$—) and 1,2-cyclohexylene, and/or —CH$_2$CH$_2$CH$_2$— derived from propylene. In an embodiment, Y is —CH$_2$CH$_2$CH$_2$— derived from propylene.

In an embodiment, each X is, independently, a halogen or a $C_1$ to $C_7$ hydrocarbyl radical.

In an embodiment, each X is a benzyl radical. In an embodiment, each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is, independently, hydrogen, a halogen, or a $C_1$ to $C_{30}$ hydrocarbyl radical, or a $C_1$ to $C_{10}$ hydrocarbyl radical, subject to the proviso that $R^{19}$ is not a carbazole or a substituted carbazole radical. In an embodiment, one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is a methyl radical, a bromine, an adamantyl radical, or a combination thereof.

In an embodiment, M is Zr; $X^1$ and $X^2$ are benzyl; $R^1$ and $R^{14}$ are methyl; $R^2$ through $R^{13}$, $R^{15}$, $R^{16}$, $R^{18}$, $R^{20}$ and $R^{21}$ are hydrogen; $R^{17}$ and $R^{19}$ are bromine; and Y is —CH$_2$CH$_2$—.

In an embodiment, M is Zr; $X^1$ and $X^2$ are benzyl; $R^1$, $R^{14}$ and $R^{17}$ are methyl; $R^2$ through $R^{13}$, $R^{15}$, $R^{16}$, $R^{18}$, $R^{20}$ and $R^{21}$ are hydrogen; $R^{19}$ is 1-adamantyl; and Y is —CH$_2$CH$_2$—.

In an embodiment, M is Hf; $X^1$ and $X^2$ are benzyl; $R^1$ and $R^{14}$ are methyl; $R^2$ through $R^{13}$, $R^{15}$, $R^{16}$, $R^{18}$, $R^{20}$ and $R^{21}$ are hydrogen; $R^{17}$ is methyl; $R^{19}$ is 1-adamantyl; and Y is —CH$_2$CH$_2$—.

In an embodiment, the catalyst comprises a compound represented by the formula:

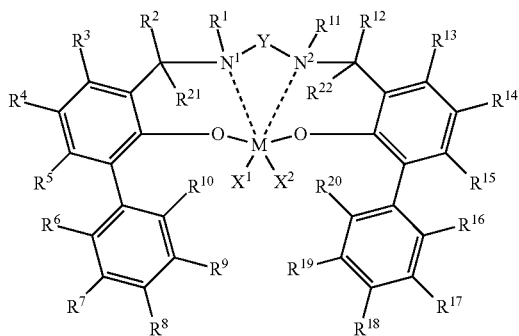

where each solid line represents a covalent bond and each dashed line represents a bond having varying degrees of covalency and a varying degree of coordination;
M is a Group 3, 4, 5 or 6 transition metal covalently bonded to each oxygen atom, and bonded with varying degrees of covalency and coordination to each of nitrogen atoms $N^1$ and $N^2$;
each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ is, independently, a hydrogen, a $C_1$-$C_{40}$ hydrocarbyl radical, a functional group comprising elements from Group 13-17 of the periodic table of the elements, or a combination thereof;
wherein at least one of $R^6$, $R^7$, $R^8$, $R^9$, $R^{10}$, $R^{16}$, $R^{17}$, $R^{18}$, $R^{19}$, or $R^{20}$ comprise fluorine; and
Y is a divalent hydrocarbyl radical covalently bonded to and bridging between both of the nitrogen atoms $N^1$ and $N^2$.

In an embodiment, two or more of $R^1$ to $R^{22}$ may independently join together to form a $C_4$ to $C_{62}$ cyclic or polycyclic ring structure. Accordingly, the instant disclosure is directed to non-symmetrical Salan catalysts. The Salan catalysts disclosed herein are at least partially fluorinated, and may include perfluorinated or partially perfluorinated aromatic ring systems as substituents.

In an embodiment, the catalyst compound is represented by the following formula:

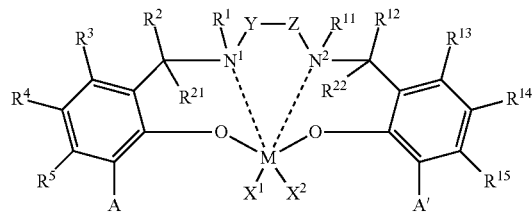

wherein substituent A is represented by the following formula, attached to the benzene ring:

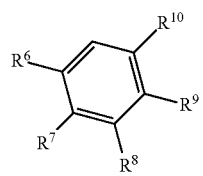

wherein substituent A' is represented by the following formula attached to the benzene ring:

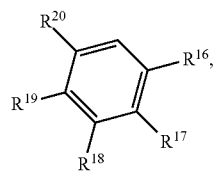

where each solid line represents a covalent bond and each dashed line represents a bond having varying degrees of covalency and a varying degree of coordination;
M is a Group 3, 4, 5 or 6 transition metal covalently bonded to each oxygen atom, and bonded with varying degrees of covalency and coordination to each of nitrogen atoms $N^1$ and $N^2$;
each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ is, independently, a hydrogen, a $C_1$-$C_{40}$ hydrocarbyl radical, a functional group comprising elements from Group 13-17 of the periodic table of the elements, or a combination thereof;
at least one of $R^6$, $R^7$, $R^8$, $R^9$, $R^{10}$, $R^{16}$, $R^{17}$, $R^{18}$, $R^{19}$, or $R^{20}$ comprise fluorine; and
Y and Z form divalent hydrocarbyl radical covalently bonded to and bridging between both of the nitrogen atoms $N^1$ and $N^2$. In an embodiment, two or more of $R^1$ to $R^{22}$ may independently join together to form a $C_4$ to $C_{62}$ cyclic or polycyclic ring structure. In an embodiment, Y is identical to Z. In an embodiment, Y is different than Z.

For purposes herein, a perfluorinated ring is defined as a ring system wherein each of the available hydrogen atoms are substituted with a fluorine atom, also referred to as a fluoride.

In an embodiment, M is a Group 4 metal, or M is Hf, Ti and/or Zr, or M is Ti or Zr. In an embodiment, each of $X^1$ and $X^2$ is independently selected from the group consisting of hydrocarbyl radicals having from 1 to 20 carbon atoms, hydrides, amides, alkoxides having from 1 to 20 carbon atoms, sulfides, phosphides, halides, amines, phosphines, ethers, and combinations thereof.

In an embodiment, $X^1$ and $X^2$ together form a part of a fused ring or a ring system having from 4 to 62 carbon atoms.

In an embodiment, each of $X^1$ and $X^2$ is independently selected from the group consisting of halides, alkyl radicals having from 1 to 7 carbon atoms, benzyl radicals, or a combination thereof.

In an embodiment, Y is a divalent $C_1$-$C_{40}$ hydrocarbyl radical comprising a portion that comprises a linker backbone comprising from 1 to 18 carbon atoms linking or bridging between nitrogen atoms $N^1$ and $N^2$. In an embodiment, Y is a $C_1$-$C_{40}$ hydrocarbyl radical comprising a portion that comprises a linker backbone comprising from 1 to 18 carbon atoms linking the nitrogen atoms $N^1$ and $N^2$ wherein the hydrocarbyl comprises O, S, S(O), S(O)$_2$, Si(R*)$_2$, P(R*), N or N(R*), wherein each R* is independently a $C_1$-$C_{18}$ hydrocarbyl. In an embodiment, Y is selected from the group consisting of ethylene (—CH$_2$CH$_2$—) and 1,2-cyclohexylene, and/or —CH$_2$CH$_2$CH$_2$— derived from propylene. In an embodiment, Y is —CH$_2$CH$_2$CH$_2$— derived from propylene.

In an embodiment, each X is, independently, a halogen or a $C_1$ to $C_7$ hydrocarbyl radical. In an embodiment, each X is a benzyl radical.

In an embodiment, each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ is independently, hydrogen, a halogen, or a $C_1$ to $C_{30}$ hydrocarbyl radical, or a $C_1$ to $C_{10}$ hydrocarbyl radical.

In an embodiment, one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ is a methyl radical, or a fluoride, which may also be referred to as a fluorine or a fluorine functional group.

In an embodiment, M is Ti; $X^1$ and $X^2$ are benzyl radicals; $R^1$ and $R^{11}$ are methyl radicals; $R^2$, $R^3$, $R^5$, $R^{12}$, $R^{13}$, $R^{15}$, $R^{21}$ and $R^{22}$ are hydrogen; $R^4$, $R^6$, $R^7$, $R^8$, $R^9$, $R^{10}$, $R^{14}$, $R^{16}$, $R^{17}$, $R^{18}$, $R^{19}$, and $R^{20}$ are fluorine; and Y is —CH$_2$CH$_2$—.

In an embodiment, M is Ti; $X^1$ and $X^2$ are benzyl radicals; $R^1$, $R^4$, $R^{11}$, and $R^{14}$ are methyl radicals; $R^2$, $R^3$, $R^5$, $R^{12}$, $R^{13}$, $R^{15}$, $R^{21}$ and $R^{22}$ are hydrogen; $R^6$, $R^7$, $R^8$, $R^9$, $R^{10}$, $R^{16}$, $R^{17}$, $R^{18}$, $R^{19}$, and $R^{20}$ are fluorine; and Y is —CH$_2$CH$_2$—.

In an embodiment, M is Zr; $X^1$ and $X^2$ are benzyl radicals; $R^1$ and $R^{11}$ are methyl radicals; $R^2$, $R^3$, $R^5$, $R^{12}$, $R^{13}$, $R^{15}$, $R^{21}$ and $R^{22}$ are hydrogen; $R^4$, $R^6$, $R^7$, $R^8$, $R^9$, $R^{10}$, $R^{14}$, $R^{16}$, $R^{17}$, $R^{18}$, $R^{19}$, and $R^{20}$ are fluorine; and Y is —CH$_2$CH$_2$—.

In an embodiment, M is Zr; $X^1$ and $X^2$ are benzyl radicals; $R^1$, $R^4$, $R^{11}$, and $R^{14}$ are methyl radicals; $R^2$, $R^3$, $R^5$, $R^{12}$, $R^{13}$, $R^{15}$, $R^{21}$ and $R^{22}$ are hydrogen; $R^6$, $R^7$, $R^8$, $R^9$, $R^{10}$, $R^{16}$, $R^{17}$, $R^{18}$, $R^{19}$, and $R^{20}$ are fluorine; and Y is —CH$_2$CH$_2$—.

In an embodiment, two or more different catalyst compounds are present in the catalyst system used herein. In an embodiment, two or more different catalyst compounds are present in the reaction zone where the process(es) described herein occur. When two transition metal compound based catalysts are used in one reactor as a mixed catalyst system, the two transition metal compounds are chosen such that the two are compatible. Compatible catalysts are those catalysts having similar kinetics of termination and insertion of monomer and comonomer(s) and/or do not detrimentally interact with each other. For purposes herein, the term "incompatible catalysts" refers to and means catalysts that satisfy one or more of the following:
1) those catalysts that when present together reduce the activity of at least one of the catalysts by greater than 50%;
2) those catalysts that under the same reactive conditions produce polymers such that one of the polymers has a molecular weight that is more than twice the molecular weight of the other polymer; and
3) those catalysts that differ in comonomer incorporation or reactivity ratio under the same conditions by more than about 30%. A simple screening method such as by $^1$H or $^{13}$C NMR, known to those of ordinary skill in the art, can be used to determine which transition metal compounds are compatible. In an embodiment, the catalyst systems use the same activator for the catalyst compounds. In an embodiment, two or more different activators, such as a non-coordinating anion activator and an alumoxane, can be used in combination. If one or more catalyst compounds contain an $X^1$ or $X^2$ ligand which is not a hydride, or a hydrocarbyl, then in an embodiment the alumoxane is contacted with the catalyst compounds prior to addition of the non-coordinating anion activator.

In an embodiment, when two transition metal compounds (pre-catalysts) are utilized, they may be used in any ratio. In an embodiment, a molar ratio of a first transition metal compound (A) to a second transition metal compound (B) will fall within the range of (A:B) 1:1000 to 1000:1, or 1:100 to 500:1, or 1:10 to 200:1, or 1:1 to 100:1, or 1:1 to 75:1, or 5:1 to 50:1. The particular ratio chosen will depend on the exact pre-catalysts chosen, the method of activation, and the end product desired. In an embodiment, when using two pre-catalysts, where both are activated with the same activator, useful mole percents, based upon the total moles of the pre-catalysts, are 10:90 to 0.1:99, or 25:75 to 99:1, or 50:50 to 99.5:0.5, or 50:50 to 99:1, or 75:25 to 99:1, or 90:10 to 99:1.

Methods to Prepare the Catalyst Compounds.

In embodiments the symmetric transition metal compounds may be prepared by two general synthetic routes. The parent salan ligands are prepared by a one-step Mannich reaction from the parent phenol (Reaction A) or by a two-step imine-condensation/alkylation procedure if the salicyl aldehyde is used (Reaction B). The ligand is then converted into the metal dibenzyl catalyst precursor by reaction with the metal tetra-aryl starting material, e.g., tetrabenzyl, to yield the finished complex (Reaction C).

Reaction A:

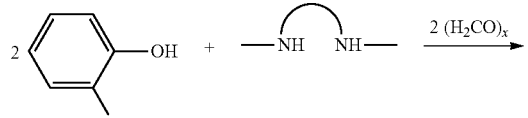

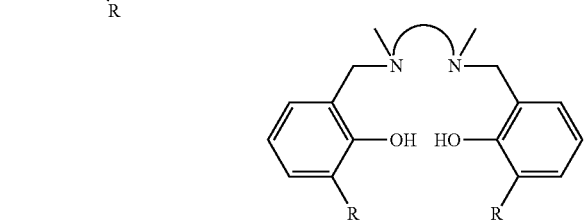

Reaction B:

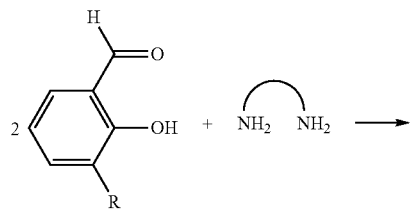

-continued

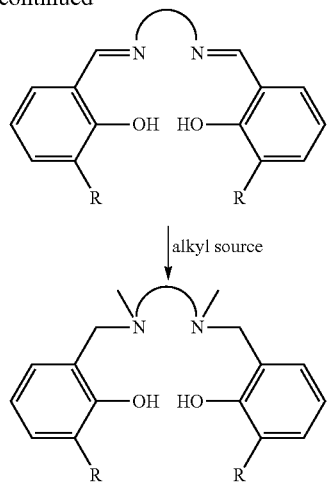

Reaction C:

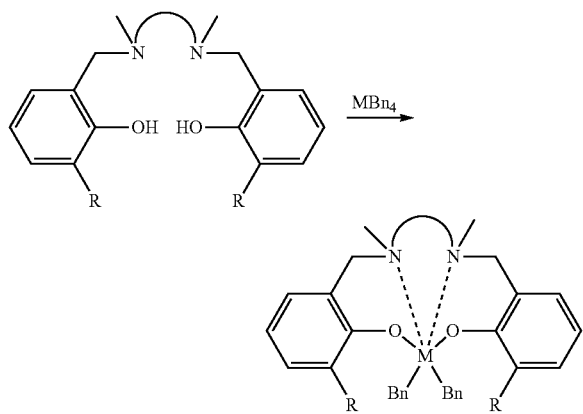

Activators

The terms "cocatalyst" and "activator" are used interchangeably to describe activators and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Activators may include alumoxane compounds, modified alumoxane compounds, and ionizing anion precursor compounds that abstract a reactive, σ-bound, metal ligand making the metal complex cationic and providing a charge-balancing noncoordinating or weakly coordinating anion.

In one embodiment, alumoxane activators are utilized as an activator in the catalyst composition. Alumoxanes are generally oligomeric compounds containing —Al($R^1$)—O— subunits, where $R^1$ is an alkyl radical. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the catalyst precursor compound comprises an abstractable ligand which is an alkyl, halide, alkoxide or amide. Mixtures of different alumoxanes and modified alumoxanes may also be used. In an embodiment, visually clear methylalumoxane may be used. A cloudy or gelled alumoxane can be filtered to produce a clear solution or clear alumoxane can be decanted from the cloudy solution. A useful alumoxane is a modified methyl alumoxane (MMAO) described in U.S. Pat. No. 5,041,584 and/or commercially available from Akzo Chemicals, Inc. under the trade designation Modified Methylalumoxane type 3A. Solid alumoxanes may also be used.

When the activator is an alumoxane (modified or unmodified), in an embodiment, the maximum amount of activator at a 5000-fold molar excess Al/M over the catalyst compound (per metal catalytic site). In an embodiment, the minimum activator-to-catalyst-compound, which is determined according to molar concentration of the transition metal M, in an embodiments is 1 mole aluminum or less to mole of transition metal M. In an embodiment, the activator comprises alumoxane and the alumoxane is present at a ratio of 1 mole aluminum or more to mole of catalyst compound. In an embodiment, the minimum activator-to-catalyst-compound molar ratio is a 1:1 molar ratio. Other embodiments of Al:M ranges include from 1:1 to 500:1, or from 1:1 to 200:1, or from 1:1 to 100:1, or from 1:1 to 50:1.

In an embodiment, little or no alumoxane (i.e., less than 0.001 wt %) is used in the polymerization processes described herein. In an embodiment, alumoxane is present at 0.00 mole %, or the alumoxane is present at a molar ratio of aluminum to catalyst compound transition metal less than 500:1, or less than 300:1, or less than 100:1, or less than 1:1.

The term "non-coordinating anion" (NCA) refers to an anion which either does not coordinate to a cation, or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible with the polymerization or catalyst system, stabilize the transition metal cation in the sense of balancing its ionic charge at +1, and yet are sufficiently labile to permit displacement during polymerization.

In an embodiment, an ionizing or stoichiometric activator may be used, which may be neutral or ionic, such as tri(n-butyl) ammonium boron metalloid precursor, polyhalogenated heteroborane anions (WO 98/43983), boric acid (U.S. Pat. No. 5,942,459), or a combination thereof. In an embodiment, neutral or ionic activators alone or in combination with alumoxane or modified alumoxane activators may be used.

Examples of neutral stoichiometric activators include tri-substituted boron, tellurium, aluminum, gallium, and indium, or mixtures thereof. The three substituent groups or radicals can be the same or different and in an embodiment are each independently selected from substituted or unsubstituted alkyls, alkenyls, alkynes, aryls, alkoxy, and halogens. In an embodiment, the three groups are independently selected from halogen, mono or multicyclic (including halosubstituted) aryls, alkyls, and alkenyl compounds, and mixtures thereof; or independently selected from alkenyl radicals having 1 to 20 carbon atoms, alkyl radicals having 1 to 20 carbon atoms, alkoxy radicals having 1 to 20 carbon atoms and aryl or substituted aryl radicals having 3 to 20 carbon atoms. In an embodiment, the three substituent groups are alkyl radicals having 1 to 20 carbon atoms, phenyl, naphthyl, or mixtures thereof. In an embodiment, the three groups are halogenated aryl groups, e.g., fluorinated aryl groups. In an embodiment the neutral stoichiometric activator is tris perfluorophenyl boron or tris perfluoronaphthyl boron.

In an embodiment, ionic stoichiometric activator compounds may include an active proton, or some other cation associated with, but not coordinated to, or only loosely coordinated to the remaining ion of the ionizing compound. Suitable examples include compounds and the like described in European publications EP 0 570 982 A; EP 0 520 732 A; EP 0 495 375 A; EP 0 500 944 B1; EP 0 277 003 A; EP 0 277 004 A; U.S. Pat. Nos. 5,153,157; 5,198,401; 5,066,741; 5,206,197; 5,241,025; 5,384,299; 5,502,124; and WO 1996/04319; all of which are herein fully incorporated by reference.

In an embodiment compounds useful as an activator comprise a cation, which is, for example, a Bronsted acid capable of donating a proton, and a compatible non-coordinating anion which anion is relatively large (bulky), capable of stabilizing the active catalyst species (the Group 4 cation, e.g.) which is formed when the two compounds are combined and said anion will be sufficiently labile to be displaced by olefinic, diolefinic or acetylenically unsaturated substrates or other neutral Lewis bases, such as ethers, amines, and the like. Two classes of useful compatible non-coordinating anions are disclosed in EP 0 277,003 A1, and EP 0 277,004 A1, which include anionic coordination complexes comprising a plurality of lipophilic radicals covalently coordinated to and shielding a central charge-bearing metal or metalloid core; and anions comprising a plurality of boron atoms such as carboranes, metallacarboranes, and boranes.

In an embodiment, the stoichiometric activators include a cation and an anion component, and may be represented by the following formula (1):

$$(Z)_d^+(A^{d-}) \quad (1)$$

wherein Z is (L-H) or a reducible Lewis Acid, L is a neutral Lewis base; H is hydrogen; (L-H)$^+$ is a Bronsted acid; $A^{d-}$ is a non-coordinating anion having the charge d–; and d is an integer from 1 to 3.

When Z is (L-H) such that the cation component is (L-H)$_d^+$, the cation component may include Bronsted acids such as protonated Lewis bases capable of protonating a moiety, such as an alkyl or aryl, from the catalyst precursor, resulting in a cationic transition metal species, or the activating cation (L-H)$_d^+$ is a Bronsted acid, capable of donating a proton to the catalyst precursor resulting in a transition metal cation, including ammoniums, oxoniums, phosphoniums, silyliums, and mixtures thereof, or ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid it may be represented by the formula: (Ar$_3$C$^+$), where Ar is aryl or aryl substituted with a heteroatom, or a C$_1$ to C$_{40}$ hydrocarbyl, the reducible Lewis acid may be represented by the formula: (Ph$_3$C$^+$), where Ph is phenyl or phenyl substituted with a heteroatom, and/or a C$_1$ to C$_{40}$ hydrocarbyl. In an embodiment, the reducible Lewis acid is triphenyl carbenium.

Embodiments of the anion component $A^{d-}$ include those having the formula [M$^{k+}$Q$_n$]$^{d-}$ wherein k is 1, 2, or 3; n is 1, 2, 3, 4, 5 or 6, or 3, 4, 5 or 6; n–k=d; M is an element selected from Group 13 of the Periodic Table of the Elements, or boron or aluminum, and Q is independently a hydride, bridged or unbridged dialkylamido, halide, alkoxide, aryloxide, hydrocarbyl radicals, said Q having up to 20 carbon atoms with the proviso that in not more than one occurrence is Q a halide, and two Q groups may form a ring structure. Each Q may be a fluorinated hydrocarbyl radical having 1 to 20 carbon atoms, or each Q is a fluorinated aryl radical, or each Q is a pentafluoryl aryl radical. Examples of suitable $A^{d-}$ components also include diboron compounds as disclosed in U.S. Pat. No. 5,447,895, which is fully incorporated herein by reference.

In an embodiment, this invention relates to a method to polymerize olefins comprising contacting olefins (e.g., ethylene) with a Salan catalyst compound, a chain transfer agent (CTA) and a boron containing NCA activator represented by the formula (1) where: Z is (L-H) or a reducible Lewis acid; L is an neutral Lewis base (as further described above); H is hydrogen; (L-H) is a Bronsted acid (as further described above); $A^{d-}$ is a boron containing non-coordinating anion having the charge d– (as further described above); d is 1, 2, or 3.

In an embodiment in any of the NCA's represented by Formula 1 described above, the anion component $A^{d-}$ is represented by the formula [M*$^{k*+}$Q*$_{n*}$]$^{d*-}$ wherein k* is 1, 2, or 3; n* is 1, 2, 3, 4, 5, or 6 (or 1, 2, 3, or 4); n*–k*=d*; M* is boron; and Q* is independently selected from hydride, bridged or unbridged dialkylamido, halogen, alkoxide, aryloxide, hydrocarbyl radicals, said Q* having up to 20 carbon atoms with the proviso that in not more than 1 occurrence is Q* a halogen.

This invention also relates to a method to polymerize olefins comprising contacting olefins (such as ethylene) with a Salan catalyst compound as described above, which may include a CTA and an NCA activator represented by the Formula (2):

$$R_nM^{**}(ArNHal)_{4-n} \quad (2)$$

where R is a monoanionic ligand; M** is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically the NCA comprising an anion of Formula 2 also comprises a suitable cation that is essentially non-interfering with the ionic catalyst complexes formed with the transition metal compounds, or the cation is Z$_d^+$ as described above.

In an embodiment in any of the NCA's comprising an anion represented by Formula 2 described above, R is selected from the group consisting of C$_1$ to C$_{30}$ hydrocarbyl radicals. In an embodiment, C$_1$ to C$_{30}$ hydrocarbyl radicals may be substituted with one or more C$_1$ to C$_{20}$ hydrocarbyl radicals, halide, hydrocarbyl substituted organometalloid, dialkylamido, alkoxy, aryloxy, alkysulfido, arylsulfido, alkylphosphido, arylphosphide, or other anionic substituent; fluoride; bulky alkoxides, where bulky means C$_4$ to C$_{20}$ hydrocarbyl radicals; —SR$^1$, —NR$^2_2$, and —PR$^3_2$, where each R$^1$, R$^2$, or R$^3$ is independently a C$_1$ to C$_{30}$ hydrocarbyl as defined above; or a C$_1$ to C$_{30}$ hydrocarbyl substituted organometalloid.

In an embodiment in any of the NCA's comprising an anion represented by Formula 2 described above, the NCA also comprises cation comprising a reducible Lewis acid represented by the formula: (Ar$_3$C$^+$), where Ar is aryl or aryl substituted with a heteroatom, and/or a C$_1$ to C$_{40}$ hydrocarbyl, or the reducible Lewis acid represented by the formula: (Ph$_3$C$^+$), where Ph is phenyl or phenyl substituted with one or more heteroatoms, and/or C$_1$ to C$_{40}$ hydrocarbyls.

In an embodiment in any of the NCA's comprising an anion represented by Formula 2 described above, the NCA may also comprise a cation represented by the formula, (L-H)$_d^+$, wherein L is an neutral Lewis base; H is hydrogen; (L-H) is a Bronsted acid; and d is 1, 2, or 3, or (L-H)$_d^+$ is a Bronsted acid selected from ammoniums, oxoniums, phosphoniums, silyliums, and mixtures thereof.

Further examples of useful activators include those disclosed in U.S. Pat. Nos. 7,297,653 and 7,799,879, which are fully incorporated by reference herein.

In an embodiment, an activator useful herein comprises a salt of a cationic oxidizing agent and a noncoordinating, compatible anion represented by the Formula (3):

$$(OX^{e+})_d(A^{d-})_e \qquad (3)$$

wherein $OX^{e+}$ is a cationic oxidizing agent having a charge of e+; e is 1, 2, or 3; d is 1, 2 or 3; and $A^{d-}$ is a non-coordinating anion having the charge of d− (as further described above). Examples of cationic oxidizing agents include: ferrocenium, hydrocarbyl-substituted ferrocenium, $Ag^+$, or $Pb^{+2}$. Suitable embodiments of $A^{d-}$ include tetrakis(pentafluorophenyl)borate.

In an embodiment, the Salan catalyst compounds, CTA's, and/or NCA's described herein can be used with bulky activators. A "bulky activator" as used herein refers to anionic activators represented by the formula:

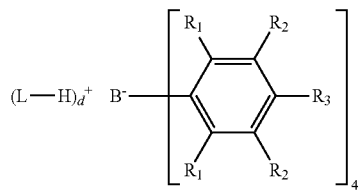

where each $R_1$ is, independently, a halide, or a fluoride;
each $R_2$ is, independently, a halide, a $C_6$ to $C_{20}$ substituted aromatic hydrocarbyl radical or a siloxy group of the formula —O—Si—$R_a$, where $R_a$ is a $C_1$ to $C_{20}$ hydrocarbyl or hydrocarbylsilyl radical (or $R_2$ is a fluoride or a perfluorinated phenyl radical);
each $R_3$ is a halide, $C_6$ to $C_{20}$ substituted aromatic hydrocarbyl radical or a siloxy group of the formula —O—Si—$R_a$, where $R_a$ is a $C_1$ to $C_{20}$ hydrocarbyl radical or hydrocarbylsilyl group (or $R_3$ is a fluoride or a $C_6$ perfluorinated aromatic hydrocarbyl radical); wherein $R_2$ and $R_3$ can form one or more saturated or unsaturated, substituted or unsubstituted rings (or $R_2$ and $R_3$ form a perfluorinated phenyl ring);
L is an neutral Lewis base; (L-H)$^+$ is a Bronsted acid; d is 1, 2, or 3;
wherein the anion has a molecular weight of greater than 1020 g/mol; and
wherein at least three of the substituents on the B atom each have a molecular volume of greater than 250 cubic Å, or greater than 300 cubic Å, or greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: MV=8.3$V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
| --- | --- |
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

Exemplary bulky substituents of activators suitable herein and their respective scaled volumes and molecular volumes are shown in the table below. The dashed bonds indicate binding to boron, as in the general formula above.

| Activator | Structure of boron substituents | Molecular Formula of each substituent | MV Per subst. (Å$^3$) | Total MV (Å$^3$) |
| --- | --- | --- | --- | --- |
| Dimethylanilinium tetrakis(perfluoronaphthyl)borate |  | $C_{10}F_7$ | 261 | 1044 |
| Dimethylanilinium tetrakis(perfluorobiphenyl)borate | | $C_{12}F_9$ | 349 | 1396 |

| Activator | Structure of boron substituents | Molecular Formula of each substituent | MV Per subst. (Å³) | Total MV (Å³) |
|---|---|---|---|---|
| [4-tButyl-PhNMe₂H] [(C₆F₃(C₆F₅)₂)₄B] | (perfluorinated terphenyl structure) | $C_{18}F_{13}$ | 515 | 2060 |

Exemplary bulky activators useful in catalyst systems herein include:
trimethylammonium tetrakis(perfluoronaphthyl)borate,
triethylammonium tetrakis(perfluoronaphthyl)borate,
tripropylammonium tetrakis(perfluoronaphthyl)borate,
tri(n-butyl)ammonium tetrakis(perfluoronaphthyl)borate,
tri(tert-butyl)ammonium tetrakis(perfluoronaphthyl)borate,
N,N-dimethylanilinium tetrakis(perfluoronaphthyl)borate,
N,N-diethylanilinium tetrakis(perfluoronaphthyl)borate,
N,N-dimethyl-(2,4,6-trimethylanilinium)tetrakis(perfluoronaphthyl)borate,
tropillium tetrakis(perfluoronaphthyl)borate,
triphenylcarbenium tetrakis(perfluoronaphthyl)borate,
triphenylphosphonium tetrakis(perfluoronaphthyl)borate,
triethylsilylium tetrakis(perfluoronaphthyl)borate,
benzene(diazonium)tetrakis(perfluoronaphthyl)borate,
trimethylammonium tetrakis(perfluorobiphenyl)borate,
triethylammonium tetrakis(perfluorobiphenyl)borate,
tripropylammonium tetrakis(perfluorobiphenyl)borate,
tri(n-butyl)ammonium tetrakis(perfluorobiphenyl)borate,
tri(tert-butyl)ammonium tetrakis(perfluorobiphenyl)borate,
N,N-dimethylanilinium tetrakis(perfluorobiphenyl)borate,
N,N-diethylanilinium tetrakis(perfluorobiphenyl)borate,
N,N-dimethyl-(2,4,6-trimethylanilinium)tetrakis(perfluorobiphenyl)borate,
tropillium tetrakis(perfluorobiphenyl)borate,
triphenylcarbenium tetrakis(perfluorobiphenyl)borate,
triphenylphosphonium tetrakis(perfluorobiphenyl)borate,
triethylsilylium tetrakis(perfluorobiphenyl)borate,
benzene(diazonium)tetrakis(perfluorobiphenyl)borate,
[4-tert-butyl-PhNMe₂H][(C₆F₃(C₆F₅)₂)₄B], and the types disclosed in U.S. Pat. No. 7,297,653, which is fully incorporated by reference herein.

Illustrative, but not limiting, examples of boron compounds which may be used as an activator in the processes according to the instant disclosure include:
trimethylammonium tetraphenylborate,
triethylammonium tetraphenylborate,
tripropylammonium tetraphenylborate,
tri(n-butyl)ammonium tetraphenylborate,
tri(tert-butyl)ammonium tetraphenylborate,
N,N-dimethylanilinium tetraphenylborate,
N,N-diethylanilinium tetraphenylborate,
N,N-dimethyl-(2,4,6-trimethylanilinium)tetraphenylborate,
tropillium tetraphenylborate,
triphenylcarbenium tetraphenylborate,
triphenylphosphonium tetraphenylborate,
triethylsilylium tetraphenylborate,
benzene(diazonium)tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl-(2,4,6-trimethylanilinium)tetrakis(pentafluorophenyl)borate,
tropillium tetrakis(pentafluorophenyl)borate,
triphenylcarbenium tetrakis(pentafluorophenyl)borate,
triphenylphosphonium tetrakis(pentafluorophenyl)borate,
triethylsilylium tetrakis(pentafluorophenyl)borate,
benzene(diazonium)tetrakis(pentafluorophenyl)borate,
trimethylammonium tetrakis-(2,3,4,6-tetrafluorophenyl)borate,
triethylammonium tetrakis-(2,3,4,6-tetrafluorophenyl)borate,
tripropyl ammonium tetrakis-(2,3,4,6-tetrafluorophenyl)borate,
tri(n-butyl)ammonium tetrakis-(2,3,4,6-tetrafluoro-phenyl)borate,
dimethyl(tert-butyl)ammonium tetrakis-(2,3,4,6-tetrafluorophenyl)borate,
N,N-dimethylanilinium tetrakis-(2,3,4,6-tetrafluorophenyl)borate,
N,N-diethylanilinium tetrakis-(2,3,4,6-tetrafluorophenyl)borate,
N,N-dimethyl-(2,4,6-trimethylanilinium)tetrakis-(2,3,4,6-tetrafluorophenyl)borate,
tropillium tetrakis-(2,3,4,6-tetrafluorophenyl)borate,
triphenylcarbenium tetrakis-(2,3,4,6-tetrafluorophenyl)borate,
triphenylphosphonium tetrakis-(2,3,4,6-tetrafluorophenyl)borate,
triethylsilylium tetrakis-(2,3,4,6-tetrafluorophenyl)borate, benzene(diazonium)tetrakis-(2,3,4,6-tetrafluorophenyl)borate,
trimethylammonium tetrakis(perfluoronaphthyl)borate,
triethylammonium tetrakis(perfluoronaphthyl)borate,
tripropylammonium tetrakis(perfluoronaphthyl)borate,
tri(n-butyl)ammonium tetrakis(perfluoronaphthyl)borate,
tri(tert-butyl)ammonium tetrakis(perfluoronaphthyl)borate,
N,N-dimethylanilinium tetrakis(perfluoronaphthyl)borate,
N,N-diethylanilinium tetrakis(perfluoronaphthyl)borate,
N,N-dimethyl-(2,4,6-trimethylanilinium)tetrakis(perfluoronaphthyl)borate,
tropillium tetrakis(perfluoronaphthyl)borate,
triphenylcarbenium tetrakis(perfluoronaphthyl)borate,
triphenylphosphonium tetrakis(perfluoronaphthyl)borate,
triethylsilylium tetrakis(perfluoronaphthyl)borate,
benzene(diazonium)tetrakis(perfluoronaphthyl)borate,
trimethylammonium tetrakis(perfluorobiphenyl)borate,
triethylammonium tetrakis(perfluorobiphenyl)borate,
tripropylammonium tetrakis(perfluorobiphenyl)borate,
tri(n-butyl)ammonium tetrakis(perfluorobiphenyl)borate,
tri(tert-butyl)ammonium tetrakis(perfluorobiphenyl)borate,
N,N-dimethylanilinium tetrakis(perfluorobiphenyl)borate,
N,N-diethylanilinium tetrakis(perfluorobiphenyl)borate,
N,N-dimethyl-(2,4,6-trimethylanilinium)tetrakis(perfluorobiphenyl)borate,
tropillium tetrakis(perfluorobiphenyl)borate,
triphenylcarbenium tetrakis(perfluorobiphenyl)borate,
triphenylphosphonium tetrakis(perfluorobiphenyl)borate,
triethylsilylium tetrakis(perfluorobiphenyl)borate,
benzene(diazonium)tetrakis(perfluorobiphenyl)borate,
trimethylammonium tetrakis(3,5-bis(trifluoromethyl)phenyl)borate,
triethylammonium tetrakis(3,5-bis(trifluoromethyl)phenyl)borate,
tripropylammonium tetrakis(3,5-bis(trifluoromethyl)phenyl)borate,
tri(n-butyl)ammonium tetrakis(3,5-bis(trifluoromethyl)phenyl)borate,
tri(tert-butyl)ammonium tetrakis(3,5-bis(trifluoromethyl)phenyl)borate,
N,N-dimethylanilinium tetrakis(3,5-bis(trifluoromethyl)phenyl)borate,
N,N-diethylanilinium tetrakis(3,5-bis(trifluoromethyl)phenyl)borate,
N,N-dimethyl-(2,4,6-trimethylanilinium)tetrakis(3,5-bis(trifluoromethyl)phenyl)borate,
tropillium tetrakis(3,5-bis(trifluoromethyl)phenyl)borate,
triphenylcarbenium tetrakis(3,5-bis(trifluoromethyl)phenyl)borate,
triphenylphosphonium tetrakis(3,5-bis(trifluoromethyl)phenyl)borate,
triethylsilylium tetrakis(3,5-bis(trifluoromethyl)phenyl)borate,
benzene(diazonium)tetrakis(3,5-bis(trifluoromethyl)phenyl)borate, and
dialkyl ammonium salts, such as:
di-(i-propyl)ammonium tetrakis(pentafluorophenyl)borate, and
dicyclohexylammonium tetrakis(pentafluorophenyl)borate; and additional tri-substituted phosphonium salts, such as tri(o-tolyl)phosphonium tetrakis(pentafluorophenyl)borate, and tri(2,6-dimethylphenyl)phosphonium tetrakis(pentafluorophenyl)borate.

Suitable activators include:
N,N-dimethylanilinium tetrakis(perfluoronaphthyl)borate,
N,N-dimethylanilinium tetrakis(perfluorobiphenyl)borate,
N,N-dimethylanilinium tetrakis(3,5-bis(trifluoromethyl)phenyl)borate,
triphenylcarbenium tetrakis(perfluoronaphthyl)borate,
triphenylcarbenium tetrakis(perfluorobiphenyl)borate,
triphenylcarbenium tetrakis(3,5-bis(trifluoromethyl)phenyl)borate,
triphenylcarbenium tetrakis(perfluorophenyl)borate,
$[Ph_3C^+][B(C_6F_5)_4^-]$, $[Me_3NH^+][B(C_6F_5)_4^-]$; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In an embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In an embodiment, the activator comprises one or more of trialkylammonium tetrakis(pentafluorophenyl)borate,
N,N-dialkylanilinium tetrakis(pentafluorophenyl)borate,
N,N-dimethyl-(2,4,6-trimethylanilinium)tetrakis(pentafluorophenyl)borate,
trialkylammonium tetrakis-(2,3,4,6-tetrafluorophenyl)borate,
N,N-dialkylanilinium tetrakis-(2,3,4,6-tetrafluorophenyl)borate,
trialkylammonium tetrakis(perfluoronaphthyl)borate,
N,N-dialkylanilinium tetrakis(perfluoronaphthyl)borate,
trialkylammonium tetrakis(perfluorobiphenyl)borate,
N,N-dialkylanilinium tetrakis(perfluorobiphenyl)borate,
trialkylammonium tetrakis(3,5-bis(trifluoromethyl)phenyl)borate,
N,N-dialkylanilinium tetrakis (3,5-bis(trifluoromethyl)phenyl)borate,
N,N-dialkyl-(2,4,6-trimethylanilinium)tetrakis(3,5-bis(trifluoromethyl)phenyl)borate,
di-(i-propyl)ammonium tetrakis(pentafluorophenyl)borate, (where alkyl is methyl, ethyl, propyl, n-butyl, sec-butyl, or tert-butyl).

In an embodiment, any of the activators described herein may be mixed together before or after combination with the catalyst compound and/or CTA and/or NCA, or before being mixed with the catalyst compound and/or CTA, and/or NCA.

In an embodiment two NCA activators may be used in the polymerization and the molar ratio of the first NCA activator to the second NCA activator can be any ratio. In an embodiment, the molar ratio of the first NCA activator to the second NCA activator is 0.01:1 to 10,000:1, or 0.1:1 to 1000:1, or 1:1 to 100:1.

In an embodiment, the NCA activator-to-catalyst ratio is a 1:1 molar ratio, or 0.1:1 to 100:1, or 0.5:1 to 200:1, or 1:1 to 500:1 or 1:1 to 1000:1. In an embodiment, the NCA activator-to-catalyst ratio is 0.5:1 to 10:1, or 1:1 to 5:1.

In an embodiment, the catalyst compounds can be combined with combinations of alumoxanes and NCA's (see for example, U.S. Pat. No. 5,153,157, U.S. Pat. No. 5,453,410, EP 0 573 120 B1, WO 94/07928, and WO 95/14044 which discuss the use of an alumoxane in combination with an ionizing activator, all of which are incorporated by reference herein).

Feed Pre-Treatment, Scavengers or Co-Activators

Generally, when using catalysts according the invention, in some embodiments it may be important to pre-treat the feed components to remove any impurities in olefins, solvents, or diluents or the inert gases (nitrogen or argon) used to blanket the reactor. The feed pre-treatment is usually conducted by passing the liquid or gaseous feed stream over at least one bed of activated molecular sieves, such as 13X, 5A, 4A, 3A molecular sieve. In some embodiments according to the invention, the molecular sieve is a spherical alumina-zeolite adsorbent having a mesh size of 5×8 (2.4-4 mm), 7×14 (1.4-2.8 mm) or the like, commercially available under the trade designation UOP AZ-300 adsorbent. Sometimes, two beds of the same or different molecular sieves are used. Sometimes, a special oxygenate removal catalyst bed is also employed. Such oxygenate removal catalysts include various reduced copper oxide catalyst or reduced copper chromite catalyst. After careful pre-treatment of feed olefins, solvents, diluents and after careful precaution to keep the catalyst component stream(s) and reactor free of any impurities, as would be recognized by one of ordinary skill in the art, the reaction should proceed well. In a preferred embodiment, particularly in the case where the catalyst is immobilized on a support, the complete catalyst system will additionally comprise one or more scavenging compounds. Here, the term scavenging compound means a compound that removes polar impurities from the reaction environment. These impurities may adversely affect catalyst activity and stability. Typically, purifying steps are used before introducing reaction components to a reaction vessel. But such steps will rarely allow polymerization or oligomerization without using some scavenging compounds. Normally, the polymerization process will still use at least small amounts of scavenging compounds.

Typically, the scavenging compound will be an organometallic compound such as the Group-13 organometallic compounds of U.S. Pat. Nos. 5,153,157, 5,241,025 and WO-A-91/09882, WO-A-94/03506, WO-A-93/14132, and that of WO 95/07941. Exemplary compounds include triethyl aluminum, triethyl borane, tri-iso-butyl aluminum, diisobutylaluminum hydride, methyl aluminoxane, iso-butyl aluminoxane, and tri-n-octyl aluminum. Those scavenging compounds having bulky or $C_6$-$C_{20}$ linear hydrocarbyl substituents connected to the metal or metalloid center usually minimize adverse interaction with the active catalyst. Examples include triethylaluminum, but more preferably, bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When aluminoxane is used as the activator, any excess over that needed for activation will scavenge impurities and additional scavenging compounds may be unnecessary. Aluminoxanes also may be added in scavenging quantities with other activators, e.g., methylaluminoxane, $[Me_2HNPh]^+[B(pfp)_4]^-$ or $B(pfp)_3$, where pfp is perfluorophenyl ($C_6F_5$) Me is methyl and Ph is phenyl.

In an embodiment the catalyst system may further include scavengers and/or co-activators. Suitable aluminum alkyl or organoaluminum compounds which may be utilized as scavengers or co-activators include, for example, trimethylaluminum, triethylaluminum, triisobutyl aluminum, tri-n-hexylaluminum, tri-n-octyl aluminum and the like. Other oxophilic species such as diethyl zinc may be used. In an embodiment, the scavengers and/or co-activators are present at less than 14 wt %, or from 0.1 to 10 wt %, or from 0.5 to 7 wt %, by weight of the catalyst system.

Catalyst Supports

In an embodiment, the catalyst system may comprise an inert support material. In an embodiment, the support material comprises a porous support material, for example, talc, and/or inorganic oxides. Other suitable support materials include zeolites, clays, organoclays, or any other organic or inorganic support material and the like, or mixtures thereof.

In an embodiment, the support material is an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, and/or alumina include magnesia, titania, zirconia, montmorillonite, phyllosilicate, and/or the like. Other suitable support materials include finely divided functionalized polyolefins, such as finely divided polyethylene.

In an embodiment, the support material may have a surface area in the range of from about 10 to about 700 $m^2/g$, pore volume in the range of from about 0.1 to about 4.0 cc/g and average particle size in the range of from about 5 to about 500 μm, or the surface area of the support material is in the range of from about 50 to about 500 $m^2/g$, pore volume of from about 0.5 to about 3.5 cc/g and average particle size of from about 10 to about 200 μm. In an embodiment, a majority portion of the surface area of the support material is in the range is from about 100 to about 400 $m^2/g$, pore volume from about 0.8 to about 3.0 cc/g and average particle size is from about 5 to about 100 μm. In an embodiment, the average pore size of the support material is in the range of from 10 to 1000 Å, or 50 to about 500 Å, or 75 to about 350 Å. In an embodiment, the support material is a high surface area, amorphous silica having a surface area greater than or equal to about 300 $m^2/g$, and/or a pore volume of 1.65 $cm^3/gm$. Suitable silicas are marketed under the tradenames of Davison 952 or Davison 955 by the Davison Chemical Division of W.R. Grace and Company. In an embodiment the support may comprise Davison 948.

In an embodiment, the support material should be essentially dry, that is, essentially free of absorbed water. Drying of the support material can be effected by heating or calcining at about 100° C. to about 1000° C., or at a temperature of at least about 400° C., or 500° C., or 600° C. When the support material is silica, it is heated to at least 200° C., or about 200° C. to about 850° C., or at least 600° C. for a time of about 1 minute to about 100 hours, or from about 12 hours to about 72 hours, or from about 24 hours to about 60 hours. In an embodiment, the calcined support material must have at least some reactive hydroxyl (OH) groups to produce supported catalyst systems according to the instant disclosure.

In an embodiment, the calcined support material is contacted with at least one polymerization catalyst comprising at least one catalyst compound and an activator. In an embodiment, the support material, having reactive surface groups, typically hydroxyl groups, is slurried in a non-polar solvent and the resulting slurry is contacted with a solution of a catalyst compound and an activator. In an embodiment, the slurry of the support material is first contacted with the activator for a period of time in the range of from about 0.5 hours to about 24 hours, or from about 2 hours to about 16 hours, or from about 4 hours to about 8 hours. The solution of the catalyst compound is then contacted with the isolated support/activator. In an embodiment, the supported catalyst system is generated in situ. In alternate embodiment, the slurry of the support material is first contacted with the catalyst compound for a period of time in the range of from about 0.5 hours to about 24 hours, or from about 2 hours to about 16 hours, or from about 4 hours to about 8 hours. The slurry of the supported catalyst compound is then contacted with the activator solution.

In an embodiment, the mixture of the catalyst, activator and support is heated to about 0° C. to about 70° C., or to about 23°

C. to about 60° C., or to room temperature. Contact times typically range from about 0.5 hours to about 24 hours, or from about 2 hours to about 16 hours, or from about 4 hours to about 8 hours.

Suitable non-polar solvents are materials in which all of the reactants used herein, i.e., the activator and the catalyst compound are at least partially soluble and which are liquid at reaction temperatures. Suitable non-polar solvents include alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

Polymerization Processes

Monomers useful herein include substituted or unsubstituted $C_2$ to $C_{40}$ alpha olefins, or $C_2$ to $C_{20}$ alpha olefins, or $C_2$ to $C_{12}$ alpha olefins, or ethylene, propylene, butene, pentene, hexene, heptene, octene, nonene, decene, undecene, dodecene and isomers thereof. In an embodiment of the invention, the polyalphaolefin prepared herein comprises more than 50 mole % of one or more $C_5$ to $C_{24}$ alpha-olefin monomers.

In an embodiment, $C_2$ to $C_{40}$ olefin monomers and comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, or hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, or norbornene, norbornadiene, and dicyclopentadiene.

In an embodiment, where butene is the comonomer, the butene source may be a mixed butene stream comprising various isomers of butene. The 1-butene monomers are expected to be preferentially consumed by the polymerization process. Use of such mixed butene streams will provide an economic benefit, as these mixed streams are often waste streams from refining processes, for example, $C_4$ raffinate streams, and can therefore be substantially less expensive than pure 1-butene.

In an embodiment, the monomers include $C_5$ to $C_{24}$ olefins, or $C_6$ to $C_{14}$ olefins, or $C_8$ to $C_{12}$ olefins. In an embodiment, monomers include linear, branched or cyclic alpha-olefins, or $C_6$ to $C_{20}$ alpha-olefins, or $C_6$ to $C_{14}$ alpha-olefins, and or $C_8$ to $C_{12}$ alpha-olefins.

In an embodiment olefin monomers include one or more of hexene, heptene, octene, nonene, decene, dodecene, 3-methyl-1-butene, and tetradecene.

In an embodiment, the process described herein may be used to produce PAO homopolymers or copolymers (for the purposes of this invention and the claims thereto, a co-polymer may comprise two, three, four, or more different monomer units). PAOs produced herein include homopolymers or copolymers of any of the above monomers. In an embodiment the PAO is a homopolymer of any $C_8$ to $C_{12}$ alpha-olefin. Or the PAO is a homopolymer of 1-hexene, 1-heptene, 1-octene, 1-nonene, 1-decene, 1-undecene, or 1-dodecene. Or the PAO a homopolymer of decene. In another embodiment the PAO is a copolymer comprising decene and one or more of any of the monomers listed above.

The alpha-olefins used to make PAOs include, but are not limited to, $C_5$ to $C_{24}$ alpha-olefins, with the $C_6$ to $C_{14}$ alpha-olefins, such as 1-hexene, 1-heptene, 1-octene, 1-nonene, 1-decene, 1-undecene, 1-dodecene, 1-tridecene and 1-tetradecene. In an embodiment, polyalpha-olefins include poly-1-hexene, poly-1-heptene, poly-1-octene, poly-1-nonene, poly-1-decene, poly-1-undencene, poly-1-dodecene, poly-1-tridecene, and poly-1-tetradecene, although dimers of higher olefins in the range of $C_{12}$ to $C_{18}$ can be present in the final products. Useful PAOs are dimers, trimers, tetramers, pentamers, and higher polymers with carbon numbers starting from $C_{20}$ and higher made from $C_4$ to $C_{18}$ alpha-olefins in one embodiment, and polymers with carbon number starting from $C_{20}$ and higher made from $C_6$ to $C_{14}$ alpha-olefins in another embodiment. Suitable olefins include 1-butene, 1-pentene, 1-hexene, 1-heptene, 1-octene, 1-nonene, 1-decene, 1-undodecene and 1-dodecene, 1-tridecene, 1-tetradecene. In one embodiment, the olefin is 1-decene, and the PAO is a mixture of dimers, trimers, tetramers and pentamers (and higher) of 1-decene. In another embodiment, the olefin is 1-dodecene, and the PAO is a mixture of trimers, tetramers and pentamers (and higher) of 1-dodecene. In another embodiment, the olefin is 1-octene, and the PAO is a mixture of trimers, tetramers and pentamers (and higher) of 1-octene. In another embodiment, the olefin is 1-hexene, and the PAO is a mixture of tetramers and pentamers (and higher) of 1-hexene. A particularly advantageous alpha-olefin feedstock from the standpoint of supply and availability is 1-hexene. There are many sources of 1-hexene. They are available from conventional linear alpha-olefin (LAO) processes, and have recently been produced intentionally in high yield and cheaply from ethylene. Pure 1-hexene is now available commercially from Fischer-Tropsch processes. Because of these diverse sources, there is advantage in using 1-hexene as one of the feeds. The presence of 1-hexene in the LAO feed from 0 to 95% is suitable. In a preferred embodiment, 1-hexene is present in the feed in the amount of about 1 wt % or 10 wt % to about 85 wt % or less, 80 wt % or less, 75 wt % or less, 67 wt % or less, 60 wt % or less, 50 wt % or less, 40 wt % or less, 33 wt % or less, 30 wt % or less, 20 wt % or less, or 15 wt % or less as preferred embodiments. The same is true for 1-octene, which can be produced selectively from 1-heptene isolated from Fischer-Tropsch synthesis, or from butadiene as described in WO 9210450. Other alpha-olefins such as propylene or 1-butene or combinations thereof are also very advantageous because propylene and 1-butene are readily available from refinery or from petrochemical plants. The source of propylene can be in pure form (as in chemical grade propylene or as in polymer grade propylene) or in PP stream (propane-propylene stream) or other appropriate forms. The source of 1-butene can be in pure form (as in chemical grade 1-butene or as in polymer grade 1-butene) or in "BB stream" (butane-butene stream, such as Raffinate-1 or Raffinate-2 stream, as discussed, for instance, in U.S. Pat. No. 5,859,159), or other appropriate form. 1-Pentene can also be used as one of the advantageous feeds in the mixed feed. This 1-pentene can be isolated from naphtha steam cracking unit, from other refinery sources, or from a Fischer-Tropsch synthesis process. Similar to 1-hexene, in embodiments the amount of propylene, 1-butene or 1-pentene can vary from 1 to 95% in the mixed feed, depending on the needs of the product properties.

The source of the LAO is advantageously from ethylene growth processes, as described in U.S. Pat. Nos. 2,889,385; 4,935,569 (and numerous references cited therein); U.S. Pat. No. 6,444,867; and in Chapter 3 of Lappin and Sauer, Alpha-olefins Applications Handbook, Marcel Dekker, Inc., NY 1989. The LAO made from this ethylene growth process contains only even-number olefins. LAO containing both even- and odd-number olefins can also be made from steam cracking or thermal cracking of wax, such as petroleum wax, Fischer-Tropsch wax, or any other readily available hydrocarbon wax. LAO can also be made in a Fischer-Tropsch synthesis process, as described in U.S. Pat. No. 5,185,378 or U.S. Pat. No. 6,673,845 and references therein. LAO made directly from syngas synthesis processes, which can produce significant amounts of $C_3$-$C_{15}$ alpha-olefins, containing both even- and odd-number olefins.

In an embodiment, the PAO comprises two or more monomers, or three or more monomers, or four or more monomers, or five or more monomers. For example, a $C_8$, $C_{10}$, $C_{12}$-linear alpha-olefin mixture, or a $C_6$, $C_7$, $C_8$, $C_9$, $C_{10}$, $C_{11}$, $C_{12}$, $C_{13}$, $C_{14}$-linear alpha-olefin mixture, or a $C_4$, $C_6$, $C_8$, $C_{10}$, $C_{12}$, $C_{14}$, $C_{16}$, $C_{18}$-linear alpha-olefin mixture can be used as a feed.

In an alternate embodiment, the PAO comprises less than 50 mole % of $C_2$, $C_3$ and $C_4$ monomers, or less than 40 mole %, or less than 30 mole %, or less than 20 mole %, or less than 10 mole %, or less than 5 mole %, or less than 3 mole %, or 0%. Specifically, in an alternate embodiment, the PAO comprises less than 50 mole % of ethylene, propylene and butene, or less than 40 mole %, or less than 30 mole %, or less than 20 mole %, or less than 10 mole %, or less than 5 mole %, or less than 3 mole %, or 0%. In another embodiment, the PAO comprises less than 40 mole % of ethylene. In another embodiment, the PAO comprises less than 40 mole % of propylene. In another embodiment, the PAO comprises less than 40 mole % of butene. In another embodiment, the PAO comprises less than 10 mole % of ethylene. In another embodiment, the PAO comprises less than 10 mole % of propylene. In another embodiment, the PAO comprises less than 10 mole % of butene. In another embodiment, the PAO comprises less than 1 mole % of ethylene. In another embodiment, the PAO comprises less than 1 mole % of propylene. In another embodiment, the PAO comprises less than 1 mole % of butene.

The alpha-olefins used herein can be produced directly from ethylene growth process as practiced by several commercial production processes, or they can be produced from Fischer-Tropsch hydrocarbon synthesis from CO/H2 syngas, or from metathesis of internal olefins with ethylene, or from cracking of petroleum or Fischer-Tropsch synthetic wax at high temperature, or any other alpha-olefin synthesis routes. In an embodiment, a feed for this invention is at least 80 weight % alpha-olefin (or linear alpha-left), or at least 90 weight % alpha-olefin (or linear alpha olefin), or 100% alpha-olefin (or linear alpha-olefin). However, alpha-olefin mixtures can also be used as feeds in this invention, especially if the other components are internal-olefins, branched olefins, paraffins, cyclic paraffins, aromatics (such as toluene and or xylenes). These components have diluent effects and are believed to not have a substantial detrimental effect on the polymerization of alpha-olefins.

In an embodiment, a polymerization processes includes contacting monomers (such as ethylene and propylene), which may include comonomers, with a catalyst system comprising an activator and at least one catalyst compound, as described above. In an embodiment, the catalyst compound and activator may be combined in any order, and may be combined prior to contacting with the monomer. In an embodiment, the catalyst compound and/or the activator are combined after contacting with the monomer.

Monomers useful herein include substituted or unsubstituted $C_2$ to $C_{40}$ alpha olefins, or $C_2$ to $C_{20}$ alpha olefins, or $C_2$ to $C_{12}$ alpha olefins, or ethylene, propylene, butene, pentene, hexene, heptene, octene, nonene, decene, undecene, dodecene and isomers thereof. In an embodiment of the invention, the monomer comprises propylene and comonomers comprising one or more ethylene or $C_4$ to $C_{40}$ olefins, or $C_4$ to $C_{20}$ olefins, or $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may include heteroatoms and/or one or more functional groups. In an embodiment, the monomer comprises ethylene or ethylene and a comonomer comprising one or more $C_3$ to $C_{40}$ olefins, or $C_4$ to $C_{20}$ olefins, or $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may include heteroatoms and/or one or more functional groups.

Exemplary $C_2$ to $C_{40}$ olefin monomers and comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, or hexene, heptene, octene, nonene, decene, dodecene, cyclooctene, 1,5-cyclooctadiene, 1-hydroxy-4-cyclooctene, 1-acetoxy-4-cyclooctene, 5-methyl cyclopentene, cyclopentene, dicyclopentadiene, norbornene, norbornadiene, and their respective homologs and derivatives, or norbornene, norbornadiene, and dicyclopentadiene.

In an embodiment one or more dienes are present in the polymer produced herein at up to 10 weight %, or at 0.00001 to 1.0 weight %, or 0.002 to 0.5 weight %, or 0.003 to 0.2 weight %, based upon the total weight of the composition. In an embodiment 500 ppm or less of diene is added to the polymerization, or 400 ppm or less, or 300 ppm or less. In an embodiment at least 50 ppm of diene is added to the polymerization, or 100 ppm or more, or 150 ppm or more.

Diolefin monomers useful in this invention include any hydrocarbon structure, or $C_4$ to $C_{30}$, having at least two unsaturated bonds, wherein at least two of the unsaturated bonds are readily incorporated into a polymer by either a stereospecific or a non-stereospecific catalyst(s). In an embodiment, the diolefin monomers may be selected from alpha, omega-diene monomers (i.e. di-vinyl monomers). Or, the diolefin monomers are linear di-vinyl monomers, most or those containing from 4 to 30 carbon atoms. Examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Cyclic dienes include cyclopentadiene, vinylnorbornene, norbornadiene, ethylidene norbornene, divinylbenzene, dicyclopentadiene or higher ring containing diolefins with or without substituents at various ring positions.

In an embodiment, where butene is the comonomer, the butene source may be a mixed butene stream comprising various isomers of butene. The 1-butene monomers are expected to be preferentially consumed by the polymerization process. Use of such mixed butene streams will provide an economic benefit, as these mixed streams are often waste streams from refining processes, for example, $C_4$ raffinate streams, and can therefore be substantially less expensive than pure 1-butene.

Polymerization processes according to the instant disclosure may be carried out in any manner known in the art. Any suspension, homogeneous, bulk, solution, slurry, or gas phase polymerization process known in the art can be used. Such processes can be run in a batch, semi-batch, or continuous mode. Homogeneous polymerization processes and slurry processes are suitable for use herein, wherein a homogeneous polymerization process is defined to be a process where at least 90 wt % of the product is soluble in the reaction media. A bulk homogeneous process is suitable for use herein, wherein a bulk process is defined to be a process where monomer concentration in all feeds to the reactor is 70 volume % or more. In an embodiment, no solvent or diluent is present or added in the reaction medium, (except for the small amounts used as the carrier for the catalyst system or other additives, or amounts typically found with the monomer such as propane in propylene). In an embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkyl substituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In an embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In an embodiment, the solvent is not aromatic, or aromatics are present in the solvent at less than 1 wt %, or less than 0.5 wt %, or less than 0.0 wt % based upon the weight of the solvents.

In an embodiment, the feed concentration of the monomers and comonomers for the polymerization is 60 vol % solvent or less, or 40 vol % or less, or 20 vol % or less, based on the total volume of the feedstream. Or the polymerization is run in a bulk process.

Polymerizations can be run at any temperature and/or pressure suitable to obtain the desired ethylene polymers. Suitable temperatures and/or pressures include a temperature in the range of from about 0° C. to about 300° C., or about 20° C. to about 200° C., or about 35° C. to about 150° C., or about 50° C. to about 150° C., or from about 40° C. to about 120° C., or from about 45° C. to about 80° C.; and at a pressure in the range of from about 0.35 MPa to about 10 MPa, or from about 0.45 MPa to about 6 MPa, or from about 0.5 MPa to about 4 MPa.

In an embodiment, the run time of the reaction is from about 0.1 minutes to about 24 hours, or up to 16 hours, or in the range of from about 5 to 250 minutes, or from about 10 to 120 minutes.

In an embodiment, hydrogen is present in the polymerization reactor at a partial pressure of 0.001 to 50 psig (0.007 to 345 kPa), or from 0.01 to 25 psig (0.07 to 172 kPa), or 0.1 to 10 psig (0.7 to 70 kPa).

In an embodiment, the activity of the catalyst is at least 50 g/mmol/hour, or 500 or more g/mmol/hour, or 5000 or more g/mmol/hr, or 50,000 or more g/mmol/hr. In an alternate embodiment, the conversion of olefin monomer is at least 10%, based upon polymer yield and the weight of the monomer entering the reaction zone, or 20% or more, or 30% or more, or 50% or more, or 80% or more.

In an embodiment, the polymerization conditions include one or more of the following: 1) temperatures of 0 to 300° C. (or 25 to 150° C., or 40 to 120° C., or 45 to 80° C.); 2) a pressure of atmospheric pressure to 10 MPa (or 0.35 to 10 MPa, or from 0.45 to 6 MPa, or from 0.5 to 4 MPa); 3) the presence of an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methyl cycloheptane, and mixtures thereof; or where aromatics are or present in the solvent at less than 1 wt %, or less than 0.5 wt %, or at 0 wt % based upon the weight of the solvents); 4) wherein the catalyst system used in the polymerization comprises less than 0.5 mol %, or 0 mol % alumoxane, or the alumoxane is present at a molar ratio of aluminum to transition metal less than 500:1, or less than 300:1, or less than 100:1, or less than 1:1; 5) the polymerization or occurs in one reaction zone; 6) the productivity of the catalyst compound is at least 80,000 g/mmol/hr (or at least 150,000 g/mmol/hr, or at least 200,000 g/mmol/hr, or at least 250,000 g/mmol/hr, or at least 300,000 g/mmol/hr); 7) scavengers (such as trialkyl aluminum compounds) are absent (present at zero mol %) or the scavenger is present at a molar ratio of scavenger to transition metal of less than 100:1, or less than 50:1, or less than 15:1, or less than 10:1; and/or 8). In an embodiment, hydrogen is present in the polymerization reactor at a partial pressure of 0.007 to 345 kPa (0.001 to 50 psig) (or from 0.07 to 172 kPa (0.01 to 25 psig), or 0.7 to 70 kPa (0.1 to 10 psig)).

In an embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In an embodiment, the polymerization occurs in one reaction zone.

When a solid supported catalyst is used for the conversion, a slurry polymerization/oligomerization process generally operates in the similar temperature, pressure and residence time range as described previously. In a slurry polymerization or oligomerization, a suspension of solid catalyst, promoters, monomer and comonomers are added. The suspension including diluent is intermittently or continuously removed from the reactor. The catalyst is then separated from the product by filtration, centrifugation, or settlement. The fluid is then distilled to remove solvent, any unreacted components, and light product. A portion or all of the solvent and unreacted component or light components can be recycled for reuse.

If the catalyst used is un-supported, solution catalyst, when the reaction is complete as in the batch mode, or when the product is withdrawn from the reactor as in a CSTR, the product may still contain soluble or suspended catalyst components. These components are preferably deactivated and/or removed. Any of the usual catalyst deactivation methods or aqueous wash methods can be used to remove the catalyst component. Typically, the reaction is deactivated by addition of stoichiometric amount or excess of air, moisture, alcohol, isopropanol, etc. The mixture may then be washed with dilute sodium hydroxide or with water to remove catalyst components. The residual organic layer according to some embodiments of the invention is then subjected to distillation to remove solvent, which can be recycled for reuse. The distillation can further remove any light reaction product from $C_{18}$ and less, or from $C_{24}$ and less. These light components can be used as diluent for further reaction. Or they can be used as olefinic raw material for other chemical synthesis, as these light olefin product have vinylene unsaturation, most suitable for further functionalization to convert in high performance fluids. Or these light olefin products can be hydrogenated to be used as high quality paraffinic solvents.

PAO Hydrogenation

In an embodiment according to the invention, the polyalpha-olefins recovered from the polymerization may optionally be hydrogenated. In particular the polyalpha-olefin product, particularly where it may contain any heteroatom catalyst components in an amount greater than 600 ppm, is preferably treated to reduce heteroatom catalyst components, preferably to less than 600 ppm, and then contacted with hydrogen and a hydrogenation catalyst to produce a polyalpha-olefin having a bromine number less than 1.8. Usually, the bromine number is below 1.8. Lower bromine number is more desirable, as it indicates an improved thermal/oxidative stability. In a preferred embodiment, the treated polyalpha-olefin comprises 100 ppm of heteroatom catalyst components or less, preferably 10 ppm of heteroatom catalyst components or less. Preferably the hydrogenation catalyst is selected from the group consisting of supported Group 7, 8, 9, and 10 metals, preferably the hydrogenation catalyst selected from the group consisting of one or more of Ni, Pd, Pt, Co, Rh, Fe, Ru, Os, Cr, Mo, and W, supported on silica, alumina, clay, titania, zirconia, or mixed metal oxide supports. A preferred hydrogenation catalyst is nickel supported on kieselguhr, or platinum or palladium supported on alumina, or cobalt-molybdenum supported on alumina. Usually, a high nickel content catalyst, such as 60% Ni on Kieselguhr catalyst is used, or a supported catalyst with high amount of Co—Mo loading.

In a preferred embodiment the polyalpha-olefin product is contacted with hydrogen and a hydrogenation catalyst at a temperature from 25 to 350° C., preferably 100 to 300° C. In another preferred embodiment the polyalpha-olefin is contacted with hydrogen and a hydrogenation catalyst for a time period from 5 minutes to 100 hours, preferably from 5 minutes to 24 hours. In another preferred embodiment the polyalpha-olefin is contacted with hydrogen and a hydrogenation catalyst at a hydrogen pressure of from 0.17 MPa to 17 MPa (25 psi to 2500 psi), preferably from 0.69 MPa to 14 MPa (100 to 2000 psi). In another preferred embodiment the hydrogenation process reduces the number of mm triad groups in a polyalpha-olefin by 1 to 80%. Hydrogenation of PAO's per se is well-known. See, for instance, U.S. Pat. No. 5,573,657 and "Lubricant Base Oil Hydrogen Refining Processes" (page 119 to 152) in Lubricant Base Oil and Wax Processing, by Avilino Sequeira, Jr., Marcel Dekker, Inc., NY, 1994.

The hydrogenation process can be accomplished in a slurry reactor in a batch operation or in a continuous stirred tank reactor (CSTR), where the catalyst concentration is 0.001 wt % to 20 wt % of the PAO (or HVI-PAO) product, or preferably 0.01 to 10 wt % of the product. Hydrogen and feed are added continuously to the reactor to allow for a certain residence time, usually 5 minutes to 10 hours, to allow complete hydrogenation of the unsaturated olefins and to allow proper conversion. The amount of catalyst added is usually in slight excess, to compensate for the catalyst deactivation. The catalyst and hydrogenated PAO and/or HVI-PAO are continuously withdrawn from the reactor. The product mixture was then filtered, centrifuged or settled to remove the solid hydrogenation catalyst. The catalyst can be regenerated and reused. The hydrogenated PAO can be used as is or further distilled or fractionated to the right component if necessary. In some cases, when the hydrogenation catalyst show no catalyst deactivation over long term operation, the stir tank hydrogenation process can be carried out in a manner where a fixed amount of catalyst is maintained in the reactor, usually 0.1 wt % to 10% of the total reactant, and only hydrogen and PAO feed are continuously added at certain feed rate and only hydrogenated PAO was withdrawn from the reactor.

The hydrogenation process can also be accomplished by a fixed bed process, in which the solid catalyst is packed inside a tubular reactor and heated to reactor temperature. Hydrogen and PAO and/or HVI-PAO feed can be fed through the reactor simultaneously from the top or bottom or countercurrently to maximize the contact between hydrogen, PAO/HVI-PAO and catalyst, and to allow best heat management. The feed rate of the PAO and hydrogen are adjusted to give proper residence to allow complete hydrogenation of the unsaturated olefins in the feed and to allow desirable conversion of mm triads in the process. The hydrogenated PAO fluid can be used as is or further distilled or fractionated to give the right component, if necessary.

PAO Products

In an embodiment, polyalphaolefins are produced by the methods described herein.

The polyalphaolefins produced herein, in an embodiment, are homopolymers of $C_4$ to $C_{40}$ alpha-olefins or copolymers of $C_2$ to $C_{40}$ alpha-olefins, where at least 50 mol % of the copolymer comprises $C_4$ or higher alpha-olefin, or a $C_5$ or higher alpha-olefin, or a $C_6$ or higher alpha-olefin.

In an embodiment, the process described herein produces PAOs comprising more than 50 mole % of one or more $C_5$ to $C_{24}$ alpha-olefin monomers (or $C_6$ to $C_{24}$ alpha-olefin monomers, or $C_8$ to $C_{24}$ alpha-olefin monomers), or 55 mole % or more, or 60 mole % or more, or 65 mole % or more, or 70 mole % or more, or 75 mole % or more, or 80 mole % or more, or 85 mole % or more, or 90 mole % or more, or 95 mole % or more, or 100 mole % based on the total moles of monomers present in the polyalpha-olefin, as measured by Carbon-13 NMR.

In an embodiment, any of the PAOs produced herein are hydrogenated. In embodiments, the PAO may have a Bromine number of 1.8 or less as measured by ASTM D 1159, or 1.7 or less, or 1.6 or less, or 1.5 or less, -15 -or 1.4 or less, or 1.3 or less, or 1.2 or less, or 1.1 or less, or 1.0 or less, or 0.5 or less, or 0.1 or less.

In an embodiment, the PAOs produced herein may have less than 300 ppm of a Group 3, 4, 5, and/or 6 metal, or Ti, Hf or Zr, or less than 200 ppm, or less than 100 ppm, or less than ppm, or less than 10 ppm, as measured by ASTM 5185.

In an embodiment, the polyalpha-olefins described herein have less than 300 ppm of Ti, or less than 200 ppm, or less than 100 ppm, or less than 50 ppm, or less than 10 ppm, as measured by ASTM 5185.

In an embodiment, any of the polyalpha-olefins described herein have less than 300 ppm of Hf, or less than 200 ppm, or less than 100 ppm, or less than 50 ppm, or less than 10 ppm, as measured by ASTM 5185.

In an embodiment, any of the polyalpha-olefins described herein have less than 300 ppm of Zr, or less than 200 ppm, or less than 100 ppm, or less than 50 ppm, or less than 10 ppm, as measured by ASTM 5185.

In an embodiment, any of the polyalpha-olefins described herein may have less than 100 ppm of Group 13 metals (or B or Al), or less than 50 ppm, or less than 10 ppm, as measured by ASTM 5185.

In an embodiment, any of the polyalpha-olefins described herein may have less than 100 ppm of boron, or less than 50 ppm, or less than 10 ppm, as measured by ASTM 5185.

In an embodiment, any of the polyalpha-olefins described herein may have less than 600 ppm of aluminum, or less than 500 ppm, or less than 400 ppm, or less than 300 ppm, or less than 200 ppm, or less than 100 ppm, or less than 50 ppm, or less than 10 ppm, as measured by ASTM 5185.

In an embodiment, any of the polyalpha-olefins described herein may have an Mw (weight average molecular weight) of 100,000 g/mol or less, or between 100 g/mol and 80,000 g/mol, or between 250 g/mol and 60,000 g/mol, or between 280 g/mol and 50,000 g/mol, or between 336 g/mol and 40,000 g/mol. In embodiments, Mw's include those from 224 g/mol to 55,100 g/mol, or from 392 g/mol to 30,000 g/mol, or 800 g/mol to 24,000 g/mol, or 2,000 g/mol to 17,000 g/mol, as determined by GPC for KV100≥10 and by GC for KV100<10. In further embodiments, Mw's include those from 224 g/mol to about 6790 g/mol or from 224 g/mol to about 2720 g/mol, as determined by GPC.

In an embodiment, any of the polyalpha-olefins described herein may have an Mn (number average molecular weight) of 50,000 g/mol or less, or between 200 g/mol and 40,000 g/mol, or between 250 g/mol and 30,000 g/mol, or between 500 g/mol and 20,000 g/mol., or from 280 g/mol to 10,000 g/mol, or from 280 g/mol to 4000 g/mol, or from 200 g/mol to 20,900 g/mol, or 280 g/mol, to 10,000 g/mol, or 200 g/mol to 7000 g/mol, or 200 g/mol to 2000 g/mol, or 280 g/mol to 2900 g/mol, or 500 g/mol to 1700 g/mol, as determined by GPC for KV100≥10 and by GC for KV100<10.

In an embodiment, any of the polyalpha-olefins described herein may have an Mw/Mn of greater than 1 and less than 5, or less than 4, or less than 3, or less than 2.5, or less than 2, or between 1 and 2.5, or between 1 and 3.5.

In another embodiment, any of the polyalpha-olefins described herein may have one or more or all of the following:

1. an $M_w$ (weight average molecular weight) of 100,000 or less, preferably between 200 and 80,000, more preferably between 250 and 60,000, more preferably between 280 and 50,000, and most preferably between 336 and 40,000 g/mol; Preferred $M_w$'s include those from 224 to 55,100, preferably from 392 to 30,000, more preferably 800 to 24,000, and most preferably 2,000 to 37,5000 g/mol, as determined by GPC for KV100≥10 and by GC for KV100<10. Alternately preferred $M_w$'s include 224 to about 6790, and preferably 224 to about 2720, as determined by GPC for KV100≥10 and by GC for KV100<10; or
2. preferably, a number average molecular weight ($M_n$) of 50,000 or less, more preferably between 200 and 40,000, more preferably between 250 and 30,000, or most preferably between 500 and 20,000 g/mol, as determined by GPC for KV 100≥10 and by GC for KV100<10; More preferred $M_n$ ranges include 280 to 10,000, 280 to 4,000, 200 to 20,900, 280 to 10,000, 200 to 7000, 200 to 2000, 280 to 2900, 280 to 1700, and 200 to 500, as determined by GPC for KV100≥10 and by GC for KV100<10; or
3. preferably an $M_w/M_n$ or molecular weight dispersity (MWD) of greater than 1 and less than 5, preferably less than 4, more preferably less than 3, more preferably less than 2.5, and most preferably less than 2.

This invention provides in some embodiments a liquid polyalpha-olefin composition which in embodiments may be characterized as comprising at least two types of branches with average branch length of at least 2.1, ranging from 2.1 to 12, or from 3 to 11, or from 4 to 10, or from 4.5 to 9.5, or from 5 to 9, or from 5.5 to 8.5, or from 6 to 8, or from 7 to 8. The product in some embodiments is a liquid. For the purposes of this invention, a "liquid" is defined to be a fluid that has no distinct melting point above 0° C., preferably no distinct melting point above −20° C., and has a kinematic viscosity at 100° C. as determined according to ASTM D445 (KV100) of 3000 cSt or less, preferably 1000 cSt or less and/or a kinematic viscosity at 40° C. as determined according to ASTM D445 (KV40) of 35,000 cSt or less, preferably 10,000 cSt or less.

In a preferred embodiment of this invention, any PAO described herein may have a pour point of less than 10° C. (as measured by ASTM D 97). Pour point of any fluid is usually a function of fluid viscosity. Within a class of fluids, usually high viscosity fluids have high pour points, and low viscosity fluids have low pour points. The pour point of the PAOs of this invention have pour points of less than 10° C., preferably less than 0° C., more preferably less than −10° C., more preferably less than −20° C., more preferably less than −25° C., more preferably less than −30° C., more preferably less than −35° C., more preferably less than −50° C., and most preferably less than −70° C. In an embodiment, any PAO described herein may have a pour point of less than 0° C. (as measured by ASTM D 97), or less than −10° C., or less than −20° C., or less than −25° C., or less than −30° C., or less than −35° C., or less than −50° C., or between −10 and −80° C., or between −15° C. and −70° C.

In an embodiment, any PAO described herein may have a KV40 from about 4 to about 50,000 cSt, or from about 5 to about 30,000 cSt, or from about 4 to about 100,000 cSt, or from about 6 to about 50,000 cSt, or from about 10 to about 30,000 cSt.

In an embodiment any polyalpha olefin described herein may have a KV 100 from about 1.5 to about 5,000 cSt, or from about 2 to about 3,000 cSt, or from about 3 to about 1,000 cSt, or from about 4 to about 1,000 cSt, or from about 8 to about 500 cSt.

In an embodiment any polyalpha-olefin described herein may have a flash point of 150° C. or more, or 200° C. or more, or 210° C. or more, or 220° C. or more (as measured by ASTM D 56).

In an embodiment any polyalphaolefin described herein may have a dielectric constant of 2.5 or less (1 kHz at 23 as determined by ASTM D 924).

In an embodiment any polyalphaolefin described herein may have a specific gravity of 0.75 to 0.96 g/cm$^3$, or 0.80 to 0.94 g/cm$^3$, or 0.855 to 0.92 g/cm$^3$, as determined according to ASTM D4052.

In an embodiment, the PAOs according to the instant disclosure may comprise dimers, trimers, tetramers, and/or higher oligomers of one or more $C_5$ to $C_{24}$ olefin monomers, or one or more $C_5$ to $C_{24}$ alpha-olefin monomers, or one or more $C_5$ to $C_{24}$ linear alpha-olefin monomers. In an embodiment, an alpha-olefin with alkyl substituent at least 2 carbons away from the olefinic double bond can also be used. In an embodiment, the PAOs according to the instant disclosure comprise a mixture of many different oligomers. In an embodiment, the smallest oligomers from these alpha-olefins may have carbon number ranging from $C_{10}$ to $C_{20}$. These small oligomers are usually too light for most high performance fluids application. They are usually separated from the higher oligomers with carbon number of greater than $C_{20}$, for example $C_{24}$ and higher which may be useful as high performance fluids.

In an embodiment, the separated $C_{10}$ to $C_{20}$ oligomers or the corresponding paraffins after hydrogenation can be used in specialty applications, such as drilling fluids, solvents, paint thinner, etc. with excellent biodegradability, toxicity, viscosities, etc. The high performance fluid fraction in the $C_{20}$ or $C_{30}$ and higher fractions typically have lower viscosities making them beneficial for some applications, such as better fuel economy, better biodegradability, better low temperature flow properties, or lower volatility. The higher viscosity products, usually having much higher average degree of polymerization, have very low amounts of $C_{20}$ or $C_{30}$ component. These high viscosity fluids are excellent blend stocks for lube application to improve the viscosity. Because of their usually narrow molecular weight distribution, they have superior shear stability. Because of their unique chemical composition, they have excellent viscometrics and unexpected low traction properties. These higher viscosity PAOs can be used as superior blend stocks. They can be blend stocks with any of the Group I, II, III, IV+, GTL and Group V fluids to give the optimum viscometrics, solvency, high and low temperature lubricity, etc. When further blended with additives, including antioxidants, antiwear additives, friction modifiers, dispersants, detergents, corrosion inhibitors, defoamants, extreme pressure additives, seal swell additives, and optionally viscosity modifiers, etc. Description of typical additives can be found in "Lubricant Additives" Chemistry and Applications, ed. L. R. Rudnick, Marcel Dekker, Inc., New York, 2003.

In an embodiment, the PAOs according to the instant disclosure, including those of low viscosity (such as those with a KV100 of 10 cSt or less), are suitable for high performance automotive engine oil formulations either by themselves or by blending with other fluids, such as Group II, Group 11+, Group III, Group 111+ or lube base stocks derived from hydroisomerization of wax fractions from Fisher-Tropsch hydrocarbon synthesis from syn gas, or other Group IV or Group V base stocks. PAOs having KV100s from 3 cSt to 8 cSt are also preferred grades for high performance automotive engine oil or industrial oil formulations. The PAOs of 40 to 1000 cSt according to the instant disclosure may be used as blend stock with Group I, II, III, III+ or GTL derived lube base stocks for use in industrial and automotive engine or gear oil, or high KV100 grades of 3 to 1000 cSt which are desirable for use as blend stock with Gr I, II, III, III+ or GTL derived lube base stocks for use in industrial and automotive engine or gear oil. They are also suitable for use in personal care applications, such as blends with soaps, detergents, other emollients, for use in personal care creams, lotions, sticks, shampoos, detergents, etc.

In an embodiment according to the invention, the PAO may have the composition, characteristics and properties similar or equivalent to those of the high viscosity index PAOs disclosed in U.S. Patent Publication No. US 2010/0292424, which is hereby incorporated herein by reference for all jurisdictions where permitted.

In an embodiment any polyalpha olefin described herein may have a viscosity index (VI) of 100 or more, or 120 or more, or 130 or more, alternately, from 120 to 450, alternately the viscosity index is at least about 165, alternately at least about 187, alternately at least about 200, alternately at least about 252. For many lower viscosity fluids made from 1-decene or 1-decene equivalent feeds (KV100 of 3 to 10 cSt), the preferred VI range is from 100 to 180. Viscosity index is determined according to ASTM Method D 2270-93 [1998].

In an embodiment any polyalpha olefin produced herein may have a vinylene content of at least 50%, based upon total unsaturation, or at least 60%, or at least 70%, or at least 80%, or at least 85%, or at least 90%, or at least 94%, or at least 98%, as determined by $^1$H NMR.

Unless otherwise indicated Mw, Mn, MWD are determined by GC, GPC and $^1$H NMR as described above.

In an embodiment, the amount of allyl chain ends, vinylene content, and the like may be determined using $^1$H NMR at 120° C. using deuterated tetrachloroethane as the solvent on a 500 MHz machine and in selected cases confirmed by $^{13}$C NMR. Literature values have been reported for proton and carbon assignments where neat perdeuterated tetrachloroethane is used for proton spectra and a 50:50 mixture of normal and perdeuterated tetrachloroethane is used for carbon spectra; all spectra are recorded at 100° C. on a BRUKER AM 300 spectrometer operating at 300 MHz for proton and 75.43 MHz for carbon, for vinyl terminated propylene oligomers, as in *J. American Chemical Soc.*, 114, 1992, pp. 1025-1032.

The term "allyl chain end" (also referred to as "allylic vinyl group" or "allylic vinyl end group") is defined to be a polymer having at least one terminus represented by ($CH_2$=CH—$CH_2$-polymer) according to the following formula:

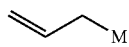

where M represents the polymer chain. "Allylic vinyl group," "allyl chain end," "vinyl chain end," "vinyl termination," "allylic vinyl group," and "vinyl terminated" are used interchangeably in the following description. The number of allyl chain ends, vinylidene chain ends, vinylene chain ends, and other unsaturated chain ends is determined using $^1$H NMR at 120° C. using deuterated tetrachloroethane as the solvent on an at least 250 MHz NMR spectrometer, and in selected cases, confirmed by $^{13}$C NMR. Resconi has reported proton and carbon assignments (neat perdeuterated tetrachloroethane used for proton spectra, while a 50:50 mixture of normal and perdeuterated tetrachloroethane was used for carbon spectra; all spectra were recorded at 100° C. on a BRUKER spectrometer operating at 500 MHz for proton and 125 MHz for carbon) for vinyl terminated oligomers in *J. American Chemical Soc.*, 114, 1992, pp. 1025-1032 that are useful herein. Allyl chain ends are reported as a molar percentage of the total number of moles of unsaturated groups (that is, the sum of allyl chain ends, vinylidene chain ends, vinylene chain ends, and the like).

A vinylidene chain end is represented by the formula:

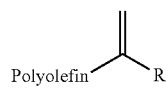

where R can be H, alkyl, aryl aralkyl, or alkaryl.

The term "vinylene chain end" is defined to be a polymer having at least one terminus represented by ($CH_3$—C=$CH_2$—$CH_2$-polymer).

Vinyl terminated polymers typically also have a saturated chain end, also referred to as a methyl end. In polymerizations comprising $C_4$ or greater monomers (or "higher olefin"

monomers), the saturated chain end may be a $C_4$ or greater (or "higher olefin") chain end, as shown in the formula below:

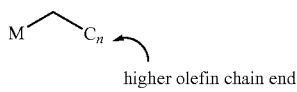

higher olefin chain end where M represents the polymer chain and n is an integer selected from 4 to 40. This is especially true when there is substantially no ethylene or propylene in the polymerization. In an ethylene/($C_4$ or greater monomer) copolymerization, the polymer chain may initiate growth in an ethylene monomer, thereby generating a saturated chain end which is an ethyl chain end. In polymerizations where propylene is present, the polymer chain may initiate growth in a propylene monomer, thereby generating an isobutyl chain end. An "isobutyl chain end" is defined to be an end or terminus of a polymer, represented as shown in the formula below:

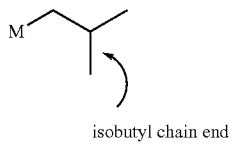

isobutyl chain end where M represents the polymer chain. Isobutyl chain ends are determined according to the procedure set out in WO 2009/155471.

Mn ($^1$H NMR) is determined according to the following NMR method. $^1$H NMR data are collected at either room temperature or 120° C. (for purposes of the claims, 120° C. shall be used) in a 5 mm probe using a Varian spectrometer with a $^1$H frequency of 250 MHz, 400 MHz, or 500 MHz (for the purpose of the claims, a proton frequency of 400 MHz is used). Data are recorded using a maximum pulse width of 45° C., 8 seconds between pulses and signal averaging 120 transients. Spectral signals are integrated and the number of unsaturation types per 1000 carbons are calculated by multiplying the different groups by 1000 and dividing the result by the total number of carbons. Mn is calculated by dividing the total number of unsaturated species into 14,000, and has units of g/mol. The chemical shift regions for the olefin types are defined to be between the following spectral regions.

| Unsaturation Type | Region (ppm) | Number of hydrogens per structure |
|---|---|---|
| Vinyl | 4.95-5.10 | 2 |
| Vinylidene | 4.70-4.84 | 2 |
| Vinylene | 5.31-5.55 | 2 |
| Trisubstituted | 5.11-5.30 | 1 |

Differential Scanning calorimetry (DSC)

Crystallization temperature ($T_c$), melting temperature (or melting point, $T_m$), glass transition temperature ($T_g$) and heat of fusion ($H_f$) are measured using Differential Scanning calorimetry (DSC) on a commercially available instrument (e.g., TA Instruments 2920 DSC). Typically, 6 to 10 mg of molded polymer or plasticized polymer are sealed in an aluminum pan and loaded into the instrument at room temperature. Data are acquired by heating the sample to at least 30° C. above its melting temperature, typically 220° C. for polypropylene, at a heating rate of 10° C./min. The sample is held for at least 5 minutes at this temperature to destroy its thermal history.

Then the sample is cooled from the melt to at least 50° C. below the crystallization temperature, typically −100° C. for polypropylene, at a cooling rate of 20° C./min. The sample is held at this temperature for at least 5 minutes, and finally heated at 10° C./min to acquire additional melting data (second heat). The endothermic melting transition (first and second heat) and exothermic crystallization transition are analyzed according to standard procedures. The melting temperatures (Tm) reported are the peak melting temperatures from the second heat unless otherwise specified. For polymers displaying multiple peaks, the melting temperature is defined to be the peak melting temperature from the melting trace associated with the largest endothermic calorimetric response (as opposed to the peak occurring at the highest temperature). Likewise, the crystallization temperature is defined to be the peak crystallization temperature from the crystallization trace associated with the largest exothermic calorimetric response (as opposed to the peak occurring at the highest temperature).

Areas under the DSC curve are used to determine the heat of transition (heat of fusion, $H_f$, upon melting or heat of crystallization, $H_c$, upon crystallization), which can be used to calculate the degree of crystallinity (also called the percent crystallinity). The percent crystallinity (X %) is calculated using the formula: [area under the curve (in J/g)/H° (in J/g)] *100, where H° is the ideal heat of fusion for a perfect crystal of the homopolymer of the major monomer component. These values for H° are to be obtained from the *Polymer Handbook, Fourth Edition*, published by John Wiley and Sons, New York 1999, except that a value of 290 J/g is used for H° (polyethylene), a value of 140 J/g is used for H° (polybutene), and a value of 207 J/g is used for H° (polypropylene).

Heat of melting (Hm) is determined using the DSC procedure above except that the sample is cooled to −100° C., held for 5 minutes then heated at 10° C./min to 200° C. Hm is measured on the first melt, no the second melt. The Hm sample must have been aged at least 48 hours at room temperature and should not be heated to destroy thermal history.

Ethylene and other monomer content may be determined by ASTM D 5017-96, except that the minimum signal-to-noise should be 10,000:1. Propylene content in propylene copolymers is determined by following the approach of Method 1 in Di Martino and Kelchermans, *J. Appl. Polym. Sci.* 56, 1781 (1995), and using peak assignments from Zhang, *Polymer* 45, 2651 (2004) for higher olefin comonomers.

Mn, Mw, and Mz may also be measured by using a Gel Permeation Chromatography (GPC) method using a High Temperature Size Exclusion Chromatograph (SEC, either from Waters Corporation or Polymer Laboratories), equipped with a differential refractive index detector (DRI). Experimental details, are described in: T. Sun, P. Brant, R. R. Chance, and W. W. Graessley, *Macromolecules*, Volume 34, Number 19, pp. 6812-6820, (2001) and references therein. Three Polymer Laboratories PLgel 10 mm Mixed-B columns are used. The nominal flow rate is 0.5 cm$^3$/min and the nominal injection volume is 300 μL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of Aldrich reagent grade 1,2,4 trichlorobenzene (TCB). The TCB mixture is then filtered through a 0.7 μm glass pre-filter and subsequently through a 0.1 μM Teflon filter. The TCB is then degassed with an online degasser before entering the SEC. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/mL at room temperature and 1.324 g/mL at 135° C. The injection concentration is from 1.0 to 2.0 mg/mL, with lower concentrations being used for higher molecular weight samples. Prior to running each sample the DRI detector and the injector are purged. Flow rate in the apparatus is then increased to 0.5 mL/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 135° C. and λ=690 nm. For purposes of this invention and the claims thereto (dn/dc)=0.104 for propylene polymers and ethylene polymers, and 0.1 otherwise. Units of parameters used throughout this description of the SEC method are: concentration is expressed in g/cm³, molecular weight is expressed in g/mol, and intrinsic viscosity is expressed in dL/g.

Blends

In another embodiment, the PAO produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In an embodiment, the PAO is present in the above blends, at from 10 to 99 wt %, based upon the weight of the polymers in the blend, preferably 0.5 to 95 wt %, or at least 1 to 90 wt %, or at least 2 to 80 wt %, or at least 5 to 70 wt %, or at least 10 to 60 wt %, or at least 20 to 50 wt %.

The blends described above may be produced by mixing the PAOs with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX 1010 or IRGANOX 1076 available from Ciba-Geigy); phosphites (e.g., IRGAFOS 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

The compositions described herein (preferably PAO compositions) may also be used in the preparation of molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art. The PAO compositions described above may also be used in the preparation of nonwoven fabrics and fibers.

Embodiments

Accordingly, the instant disclosure relates to the following embodiments:

A. A process comprising:

contacting one or more olefins with a catalyst system at a temperature, a pressure, and for a period of time sufficient to produce a polyalphaolefin comprising at least 50 mol % $C_5$ to $C_{24}$ olefin;

the catalyst system comprising an activator and a catalyst compound according to Formula I, Formula II, Formula III, or a combination thereof:

Formula I being represented by:

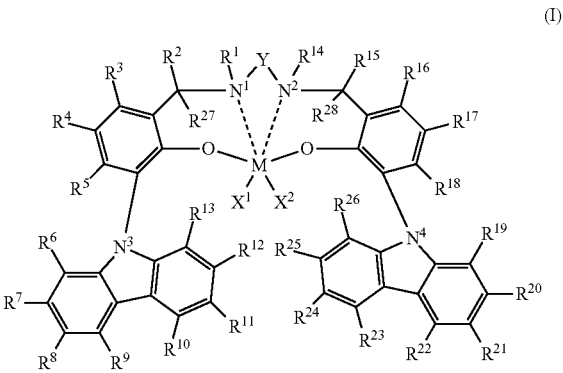

where M is a Group 3, 4, 5 or 6 transition metal;

each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is, independently, a hydrogen, a $C_1$-$C_{40}$ hydrocarbyl radical, a functional group comprising elements from Groups 13-17 of the periodic table of the elements, or two or more of $R^1$ to $R^{28}$ may independently join together to form a $C_4$ to $C_{62}$ cyclic or polycyclic ring structure, or a combination thereof, or a combination thereof; and Y is a divalent $C_1$ to $C_{20}$ hydrocarbyl;

Formula II being represented by:

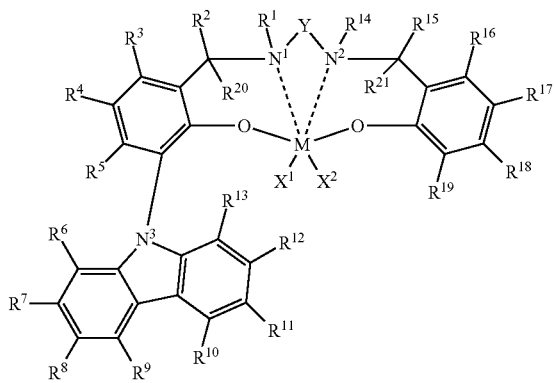

(II)

where M is a Group 3, 4, 5 or 6 transition metal;
each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is, independently, a hydrogen, a $C_1$-$C_{40}$ hydrocarbyl radical, a functional group comprising elements from Group 13-17 of the periodic table of the elements, or two or more of $R^1$ to $R^{21}$ may independently join together to form a $C_4$ to $C_{62}$ cyclic or polycyclic ring structure, or a combination thereof; subject to the proviso that $R^{19}$ is not a carbazole or a substituted carbazole radical, and
Y is a divalent $C_1$ to $C_{20}$ hydrocarbyl radical;
Formula III being represented by:

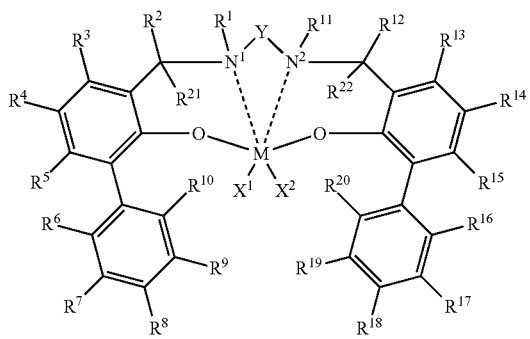

(III)

where M is a Group 3, 4, 5 or 6 transition metal;
each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ is, independently, a hydrogen, a $C_1$-$C_{40}$ hydrocarbyl radical, a functional group comprising elements from Group 13-17 of the periodic table of the elements, or two or more of $R^1$ to $R^{22}$ may independently join together to form a $C_4$ to $C_{62}$ cyclic or polycyclic ring structure, or a combination thereof;
at least one of $R^6$, $R^7$, $R^8$, $R^9$, $R^{10}$, $R^{16}$, $R^{17}$, $R^{18}$, $R^{19}$, or $R^{20}$ comprise fluorine; and
Y is a divalent $C_1$ to $C_{20}$ hydrocarbyl radical.

B. The process of Embodiment A, wherein two or more of $R^1$ to $R^{28}$ of Formula I, $R^1$ to $R^{21}$ of Formula II, $R^1$ to $R^{22}$ of Formula III, or a combination thereof, independently join together to form a $C_4$ to $C_{62}$ cyclic or polycyclic ring structure.

C. The process of any one of Embodiments A-B, wherein M of Formula I, Formula II, Formula III, or a combination thereof is Hf, Ti, or Zr.

D. The process of any one of Embodiments A-C, wherein each X of Formula I, Formula II, Formula III, or a combination thereof is, independently, a halogen or a $C_1$ to $C_7$ hydrocarbyl radical.

E. The process of any one of Embodiments A-D, wherein each X of Formula I, Formula II, Formula III, or a combination thereof is a benzyl radical.

F. The process of any one of Embodiments A-E, wherein each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$ $R^{24}$, $R^{25}$, $R^{26}$, $R^{27}$ and $R^{28}$ of Formula (I), each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$ and $R^{21}$ of Formula (II), $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ of Formula (III), or a combination thereof are, independently, hydrogen, a halogen, or a $C_1$ to $C_{30}$ hydrocarbyl radical.

G. The process of any one of Embodiments A-F, wherein each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$ $R^{24}$, $R^{25}$, $R^{26}$, $R^{27}$ and $R^{28}$ of Formula (I), each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ of Formula (II), $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ of Formula (III), or a combination thereof are, independently, hydrogen, a halogen, or a $C_1$ to $C_{10}$ hydrocarbyl radical.

H. The process of any one of Embodiments A-G, wherein one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$ $R^{24}$, $R^{25}$, $R^{26}$, $R^{27}$, and $R^{28}$ of Formula I is a methyl radical, a fluoride, or a combination thereof.

I. The process of any one of Embodiments A-H, wherein the catalyst compound is according to Formula I wherein,
M is Zr;
$X^1$ and $X^2$ are benzyl radicals;
$R^1$ and $R^{14}$ are methyl radicals;
$R^2$ through $R^{13}$ and $R^{15}$ through $R^{28}$ are hydrogen; and
Y is —$CH_2CH_2$—.

J. The process of any one of Embodiments A-I, wherein the catalyst compound is according to Formula I wherein,
M is Zr;
$X^1$ and $X^2$ are benzyl radicals;
$R^1$, $R^4$, $R^{14}$ and $R^{17}$ are methyl radicals;
$R^2$, $R^3$, $R^5$ through $R^{13}$, $R^{15}$, $R^{16}$, $R^{18}$ through $R^{28}$ are hydrogen; and
Y is —$CH_2CH_2$—.

K. The process of any one of Embodiments A-J, wherein the catalyst compound is according to Formula I wherein,
M is Zr;
$X^1$ and $X^2$ are benzyl radicals;
$R^1$ and $R^{14}$ are methyl radicals;
$R^4$ and $R^{17}$ are fluoro groups;

R$^2$, R$^3$, R$^5$ through R$^{13}$, R$^{15}$, R$^{16}$, R$^{18}$ through R$^{28}$ are hydrogen; and Y is —CH$_2$CH$_2$—.

L. The process of any one of Embodiments A-K, wherein the catalyst compound is according to Formula I wherein, M is Zr;

X$^1$ and X$^2$ are benzyl radicals;

R$^1$, R$^4$, R$^{14}$ and R$^{17}$ are methyl radicals;

R$^8$, R$^{11}$, R$^{21}$ and R$^{24}$ are tert-butyl radicals;

R$^2$, R$^3$, R$^5$, R$^6$, R$^7$, R$^9$, R$^{10}$, R$^{12}$, R$^{13}$, R$^{15}$, R$^{16}$, R$^{18}$, R$^{19}$, R$^{20}$, R$^{22}$, R$^{23}$, R$^{25}$ and R$^{26}$ through R$^{28}$ are hydrogen; and Y is —CH$_2$CH$_2$—.

M. The process of any one of Embodiments A-L, wherein the catalyst compound is according to Formula I wherein, M is Zr;

X$^1$ and X$^2$ are benzyl radicals;

R$^1$, R$^4$, R$^{14}$ and R$^{17}$ are methyl radicals;

R$^8$, R$^{11}$, R$^{21}$ and R$^{24}$ are mesityl radicals;

R$^2$, R$^3$, R$^5$, R$^6$, R$^7$, R$^9$, R$^{10}$, R$^{12}$, R$^{13}$, R$^{15}$, R$^{16}$, R$^{18}$, R$^{19}$, R$^{20}$, R$^{22}$, R$^{23}$, R$^{25}$ and R$^{26}$ through R$^{28}$ are hydrogen; and Y is —CH$_2$CH$_2$—.

N. The process of any one of Embodiments A-M, wherein the catalyst compound is according to Formula II wherein one or more of R$^1$, R$^2$, R$^3$, R$^4$, R$^5$, R$^6$, R$^7$, R$^8$, R$^9$, R$^{10}$, R$^{11}$, R$^{12}$, R$^{13}$, R$^{14}$, R$^{15}$, R$^{16}$, R$^{17}$, R$^{18}$, R$^{19}$, R$^{20}$, and R$^{21}$ is a methyl radical, a bromide, an adamantyl radical, or a combination thereof O. The process of any one of Embodiments A-N, wherein the catalyst compound is according to Formula II wherein, M is Zr;

X$^1$ and X$^2$ are benzyl radicals;

R$^1$ and R$^{14}$ are methyl radicals;

R$^2$ through R$^{13}$, R$^{15}$, R$^{16}$, R$^{18}$, R$^{20}$ and R$^{21}$ are hydrogen;

R$^{17}$ and R$^{19}$ are bromine; and

Y is —CH$_2$CH$_2$—.

P. The process of any one of Embodiments A-O, wherein the catalyst compound is according to Formula II wherein, M is Zr;

X$^1$ and X$^2$ are benzyl radicals;

R$^1$, R$^{14}$ and R$^{17}$ are methyl radicals;

R$^2$ through R$^{13}$, R$^{15}$, R$^{16}$, R$^{18}$, R$^{20}$, and R$^{21}$ are hydrogen;

R$^{19}$ is a 1-adamantyl radical; and

Y is —CH$_2$CH$_2$—.

Q. The process of any one of Embodiments A-P, wherein the catalyst compound is according to Formula II wherein, M is Hf;

X$^1$ and X$^2$ are benzyl radicals;

R$^1$ and R$^{14}$ and R$^{17}$ are methyl radicals;

R$^2$ through R$^{13}$, R$^{15}$, R$^{16}$, R$^{18}$, R$^{20}$ and R$^{21}$ are hydrogen;

R$^{19}$ is a 1-adamantyl radical; and

Y is —CH$_2$CH$_2$—.

R. The process of any one of Embodiments A-Q, wherein the catalyst compound is according to Formula III wherein one or more of R$^1$, R$^2$, R$^3$, R$^4$, R$^5$, R$^6$, R$^7$, R$^8$, R$^9$, R$^{10}$, R$^{11}$, R$^{12}$, R$^{13}$, R$^{14}$, R$^{15}$, R$^{16}$, R$^{17}$, R$^{18}$, R$^{19}$, R$^{20}$, R$^{21}$, and R$^{22}$ is a methyl radical, a fluoride, or a combination thereof.

S. The process of any one of Embodiments A-R, wherein the catalyst compound is according to Formula III wherein, M is Ti;

X$^1$ and X$^2$ are benzyl radicals;

R$^1$ and R$^{11}$ are methyl radicals;

R$^2$, R$^3$, R$^5$, R$^{12}$, R$^{13}$, R$^{15}$, R$^{21}$ and R$^{22}$ are hydrogen;

R$^4$, R$^6$, R$^7$, R$^8$, R$^9$, R$^{10}$, R$^{14}$, R$^{16}$, R$^{17}$, R$^{18}$, R$^{19}$, and R$^{20}$ are fluorine; and Y is —CH$_2$CH$_2$—.

T. The process of any one of Embodiments A-S, wherein the catalyst compound is according to Formula III wherein, M is Ti;

X$^1$ and X$^2$ are benzyl radicals;

R$^1$, R$^4$, R$^{11}$ and R$^{14}$ are methyl radicals;

R$^2$, R$^3$, R$^5$, R$^{12}$, R$^{13}$, R$^{15}$, R$^{21}$ and R$^{22}$ are hydrogen;

R$^6$, R$^7$, R$^8$, R$^9$, R$^{10}$, R$^{16}$, R$^{17}$, R$^{18}$, R$^{19}$, and R$^{20}$ are fluorine; and Y is —CH$_2$CH$_2$—.

U. The process of any one of Embodiments A-T, wherein the catalyst compound is according to Formula III wherein, M is Zr;

X$^1$ and X$^2$ are benzyl radicals;

R$^1$ and R$^{11}$ are methyl radicals;

R$^2$, R$^3$, R$^5$, R$^{12}$, R$^{13}$, R$^{15}$, R$^{21}$ and R$^{22}$ are hydrogen;

R$^4$, R$^6$, R$^7$, R$^8$, R$^9$, R$^{10}$, R$^{14}$, R$^{16}$, R$^{17}$, R$^{18}$, R$^{19}$, and R$^{20}$ are fluorine; and Y is —CH$_2$CH$_2$—.

V. The process of any one of Embodiments A-U, wherein the catalyst compound is according to Formula III wherein, M is Zr;

X$^1$ and X$^2$ are benzyl radicals;

R$^1$, R$^4$, R$^{11}$ and R$^{14}$ are methyl radicals;

R$^2$, R$^3$, R$^5$, R$^{12}$, R$^{13}$, R$^{15}$, R$^{21}$ and R$^{22}$ are hydrogen;

R$^6$, R$^7$, R$^8$, R$^9$, R$^{10}$, R$^{16}$, R$^{17}$, R$^{18}$, R$^{19}$, and R$^{20}$ are fluorine; and Y is —CH$_2$CH$_2$—.

W. The process of any one of Embodiments A-V, wherein Y of Formula I, Formula II, Formula III, or a combination thereof is —CH$_2$CH$_2$— or 1,2-cyclohexylene.

X. The process of any one of Embodiments A-W, wherein Y of Formula I, Formula II, Formula III, or a combination thereof is —CH$_2$CH$_2$CH$_2$—.

Y. The process of any one of Embodiments A-X, wherein Y of Formula I, Formula II, Formula III, or a combination thereof is a C$_1$-C$_{40}$ divalent hydrocarbyl radical comprising a linker backbone comprising from 1 to 18 carbon atoms bridging between nitrogen atoms N$^1$ and N$^2$.

Z. The process of any one of Embodiments A-Y, wherein Y of Formula I, Formula II, Formula III, or a combination thereof is a C$_1$-C$_{40}$ divalent hydrocarbyl radical comprising O, S, S(O), S(O)$_2$, Si(R')$_2$, P(R'), N, N(R'), or a combination thereof, wherein each R' is independently a C$_1$-C$_{18}$ hydrocarbyl radical.

A1. The process of any one of Embodiments A-Z, wherein the activator comprises alumoxane, a non-coordinating anion activator, or a combination thereof.

B1. The process of any one of Embodiments A-A1, wherein the activator comprises alumoxane and the alumoxane is present at a ratio of 1 mole aluminum or more to mole of catalyst compound.

C1. The process of any one of Embodiments A-B1, wherein the activator is represented by the formula:

$$(Z)_d^+ (A^{d-})$$

wherein Z is (L-H), or a reducible Lewis Acid, wherein L is a neutral Lewis base;

H is hydrogen;

(L-H)$^+$ is a Bronsted acid;

A$^{d-}$ is a non-coordinating anion having the charge d−; and d is an integer from 1 to 3.

D1. The process of any one of Embodiments A-C1, wherein the activator is represented by the formula:

$$(Z)_d^+ (A^{d-})$$

wherein A$^{d-}$ is a non-coordinating anion having the charge d−;

d is an integer from 1 to 3, and

Z is a reducible Lewis acid represented by the formula: $(Ar_3C^+)$, where Ar is aryl radical, an aryl radical substituted with a heteroatom, an aryl radical substituted with one or more $C_1$ to $C_{40}$ hydrocarbyl radicals, an aryl radical substituted with one or more functional groups comprising elements from Groups 13-17 of the periodic table of the elements, or a combination thereof.

E1. The process of any one of Embodiments A-D1, wherein the activator is selected from the group consisting of:
N,N-dimethylanilinium tetrakis(pentafluorophenyl)borate,
triphenylcarbenium tetrakis(pentafluorophenyl)borate,
trimethylammonium tetrakis(perfluoronaphthyl)borate,
triethylammonium tetrakis(perfluoronaphthyl)borate,
tripropylammonium tetrakis(perfluoronaphthyl)borate,
tri(n-butyl)ammonium tetrakis(perfluoronaphthyl)borate,
tri(tert-butyl)ammonium tetrakis(perfluoronaphthyl)borate,
N,N-dimethylanilinium tetrakis(perfluoronaphthyl)borate,
N,N-diethylanilinium tetrakis(perfluoronaphthyl)borate,
N,N-dimethyl-(2,4,6-trimethylanilinium)tetrakis(perfluoronaphthyl)borate,
tropillium tetrakis(perfluoronaphthyl)borate,
triphenylcarbenium tetrakis(perfluoronaphthyl)borate,
triphenylphosphonium tetrakis(perfluoronaphthyl)borate,
triethylsilylium tetrakis(perfluoronaphthyl)borate,
benzene(diazonium)tetrakis(perfluoronaphthyl)borate,
trimethylammonium tetrakis(perfluorobiphenyl)borate,
triethylammonium tetrakis(perfluorobiphenyl)borate,
tripropylammonium tetrakis(perfluorobiphenyl)borate,
tri(n-butyl)ammonium tetrakis(perfluorobiphenyl)borate,
tri(tert-butyl)ammonium tetrakis(perfluorobiphenyl)borate,
N,N-dimethylanilinium tetrakis(perfluorobiphenyl)borate,
N,N-diethylanilinium tetrakis(perfluorobiphenyl)borate,
N,N-dimethyl-(2,4,6-trimethylanilinium)tetrakis(perfluorobiphenyl)borate,
tropillium tetrakis(perfluorobiphenyl)borate,
triphenylcarbenium tetrakis(perfluorobiphenyl)borate,
triphenylphosphonium tetrakis(perfluorobiphenyl)borate,
triethylsilylium tetrakis(perfluorobiphenyl)borate,
benzene(diazonium)tetrakis(perfluorobiphenyl)borate,
[4-tert-butyl-PhNMe$_2$H][(C$_6$F$_3$(C$_6$F$_5$)$_2$)$_4$B],
trimethylammonium tetraphenylborate,
triethylammonium tetraphenylborate,
tripropylammonium tetraphenylborate,
tri(n-butyl)ammonium tetraphenylborate,
tri(tert-butyl)ammonium tetraphenylborate,
N,N-dimethylanilinium tetraphenylborate,
N,N-diethylanilinium tetraphenylborate,
N,N-dimethyl-(2,4,6-trimethylanilinium)tetraphenylborate,
tropillium tetraphenylborate,
triphenylcarbenium tetraphenylborate,
triphenylphosphonium tetraphenylborate,
triethylsilylium tetraphenylborate,
benzene(diazonium)tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl-(2,4,6-trimethylanilinium)tetrakis(pentafluorophenyl)borate,
tropillium tetrakis(pentafluorophenyl)borate,
triphenylcarbenium tetrakis(pentafluorophenyl)borate,
triphenylphosphonium tetrakis(pentafluorophenyl)borate,
triethylsilylium tetrakis(pentafluorophenyl)borate,
benzene(diazonium)tetrakis(pentafluorophenyl)borate,
trimethylammonium tetrakis-(2,3,4,6-tetrafluorophenyl)borate,
triethylammonium tetrakis-(2,3,4,6-tetrafluorophenyl)borate,
tripropylammonium tetrakis-(2,3,4,6-tetrafluorophenyl)borate,
tri(n-butyl)ammonium tetrakis-(2,3,4,6-tetrafluoro-phenyl)borate,
dimethyl(tert-butyl)ammonium tetrakis-(2,3,4,6-tetrafluorophenyl)borate,
N,N-dimethylanilinium tetrakis-(2,3,4,6-tetrafluorophenyl)borate,
N,N-diethylanilinium tetrakis-(2,3,4,6-tetrafluorophenyl)borate,
N,N-dimethyl-(2,4,6-trimethylanilinium)tetrakis-(2,3,4,6-tetrafluorophenyl)borate,
tropillium tetrakis-(2,3,4,6-tetrafluorophenyl)borate,
triphenylcarbenium tetrakis-(2,3,4,6-tetrafluorophenyl)borate,
triphenylphosphonium tetrakis-(2,3,4,6-tetrafluorophenyl)borate,
triethylsilylium tetrakis-(2,3,4,6-tetrafluorophenyl)borate,
benzene(diazonium)tetrakis-(2,3,4,6-tetrafluorophenyl)borate,
trimethylammonium tetrakis(3,5-bis(trifluoromethyl)phenyl)borate,
triethylammonium tetrakis(3,5-bis(trifluoromethyl)phenyl)borate,
tripropylammonium tetrakis(3,5-bis(trifluoromethyl)phenyl)borate,
tri(n-butyl)ammonium tetrakis(3,5-bis(trifluoromethyl)phenyl)borate,
tri(tert-butyl)ammonium tetrakis(3,5-bis(trifluoromethyl)phenyl)borate,
N,N-dimethylanilinium tetrakis(3,5-bis(trifluoromethyl)phenyl)borate,
N,N-diethylanilinium tetrakis(3,5-bis(trifluoromethyl)phenyl)borate,
N,N-dimethyl-(2,4,6-trimethylanilinium)tetrakis(3,5-bis(trifluoromethyl)phenyl)borate,
tropillium tetrakis(3,5-bis(trifluoromethyl)phenyl)borate,
triphenylcarbenium tetrakis(3,5-bis(trifluoromethyl)phenyl)borate,
triphenylphosphonium tetrakis(3,5-bis(trifluoromethyl)phenyl)borate,
triethylsilylium tetrakis(3,5-bis(trifluoromethyl)phenyl)borate,
benzene(diazonium)tetrakis(3,5-bis(trifluoromethyl)phenyl)borate,
di-(i-propyl)ammonium tetrakis(pentafluorophenyl)borate,
dicyclohexylammonium tetrakis(pentafluorophenyl)borate,
tri(o-tolyl)phosphonium tetrakis(pentafluorophenyl)borate,
tri(2,6-dimethylphenyl)phosphonium tetrakis(pentafluorophenyl)borate,
triphenylcarbenium tetrakis(perfluorophenyl)borate,
1-(4-(tris(pentafluorophenyl)borate)-2,3,5,6-tetrafluorophenyl)pyrrolidinium,
tetrakis(pentafluorophenyl)borate,
4-(tris(pentafluorophenyl)borate)-2,3,5,6-tetrafluoropyridine,
triphenylcarbenium tetrakis(3,5-bis(trifluoromethyl)phenyl)borate), and combinations thereof.

F1. The process of any one of Embodiments A-E1, wherein the temperature is from about 0° C. to about 300° C., the pressure is from about 0.35 MPa to about 10 MPa, the time is from about 0.1 minutes to about 24 hours, or a combination thereof.

G1. The process of any one of Embodiments A-F1, wherein the temperature is from about 50° C. to about 150° C.

H1. The process of any one of Embodiments A-G1, wherein the polyalphaolefin comprises at least 50 mole % decene.

I1. The process of any one of Embodiments A-H1, wherein the polyalphaolefin comprises at least 75 mole % $C_8$ to $C_{24}$ olefin.

J1. The process of any one of Embodiments A-I1, wherein the polyalphaolefin comprises:
  a) less than 300 ppm of the Group 3, 4, 5, or 6 metal, as determined by ASTM 5185;
  b) less than 100 ppm of a Group 13 metal, as determined by ASTM 5185;
  c) an Mw of 100,000 g/mol or less;
  d) an Mn of 50,000 g/mol or less;
  e) an Mw/Mn of greater than 1 and less than 5;
  f) a pour point of less than 0° C., as determined according to ASTM D97;
  g) a kinematic viscosity at 40° C. from about 4 to about 50,000 cSt, as determined according to ASTM D445;
  h) a kinematic viscosity at 100° C. from about 1.5 to about 5,000 cSt, as determined according to ASTM D445;
  i) a flash point of 150° C. or more, as determined according to ASTM D56;
  j) a dielectric constant of 2.5 or less (1 kHz at 23° C.), as determined according to ASTM 924;
  k) a specific gravity of 0.75 to 0.96 g/cm$^3$, as determined according to ASTM D4052;
  l) a viscosity index (VI) of 100 or more, as determined according to ASTM D2270-93[1998];
  m) a vinylene content of at least 50%, based upon total unsaturation, as determined by $^1$H NMR;
or a combination thereof.

K1. A polyalphaolefin comprising:
  at least 50 mol % $C_5$ to $C_{24}$ olefin, the polymer produced by a process comprising:
    contacting one or more olefins with a catalyst system at a temperature, a pressure, and for a period of time sufficient to produce a polyalphaolefin, the catalyst system comprising an activator and a catalyst compound according to Formula I, Formula II, Formula III, or a combination thereof:
Formula I being represented by:

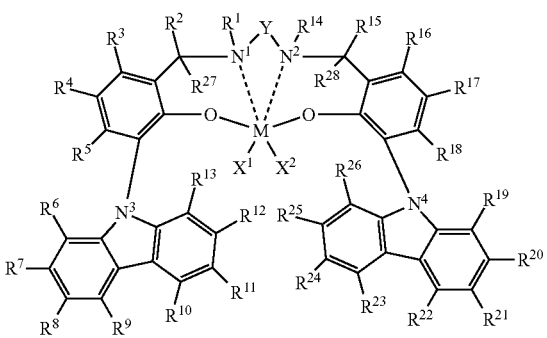

(I)

where M is a Group 3, 4, 5 or 6 transition metal;
each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is, independently, a hydrogen, a $C_1$-$C_{40}$ hydrocarbyl radical, a functional group comprising elements from Groups 13-17 of the periodic table of the elements, or two or more of $R^1$ to $R^{28}$ may independently join together to form a $C_4$ to $C_{62}$ cyclic or polycyclic ring structure, or a combination thereof, or a combination thereof; and
Y is a divalent $C_1$ to $C_{20}$ hydrocarbyl;
Formula II being represented by:

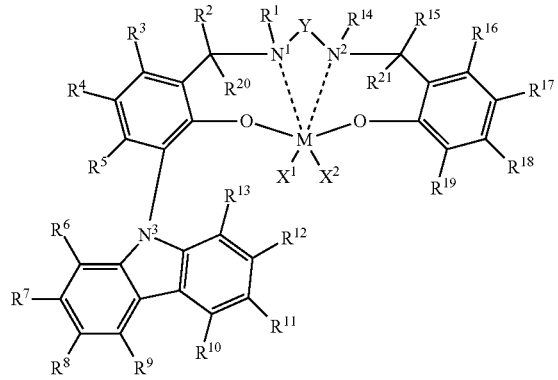

(II)

M is a Group 3, 4, 5 or 6 transition metal;
each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is, independently, a hydrogen, a $C_1$-$C_{40}$ hydrocarbyl radical, a functional group comprising elements from Group 13-17 of the periodic table of the elements, or two or more of $R^1$ to $R^{21}$ may independently join together to form a $C_4$ to $C_{62}$ cyclic or polycyclic ring structure, or a combination thereof; subject to the proviso that $R^{19}$ is not a carbazole or a substituted carbazole radical, and
Y is a divalent $C_1$ to $C_{20}$ hydrocarbyl radical;
Formula III being represented by:

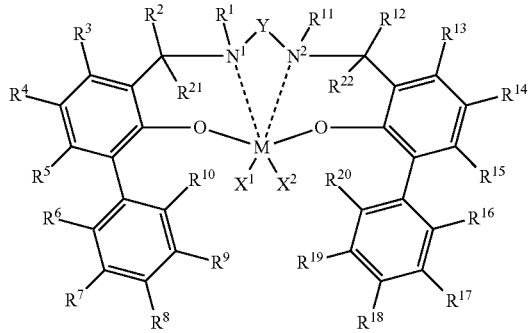

(III)

where M is a Group 3, 4, 5 or 6 transition metal;

each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ is, independently, a hydrogen, a $C_1$-$C_{40}$ hydrocarbyl radical, a functional group comprising elements from Group 13-17 of the periodic table of the elements, or two or more of $R^1$ to $R^{22}$ may independently join together to form a $C_4$ to $C_{62}$ cyclic or polycyclic ring structure, or a combination thereof;

at least one of $R^6$, $R^7$, $R^8$, $R^9$, $R^{10}$, $R^{16}$, $R^{17}$, $R^{18}$, $R^{19}$, or $R^{20}$ comprise fluorine; and Y is a divalent $C_1$ to $C_{20}$ hydrocarbyl radical; or a polyalphaolefin produced according to the process of any one of Embodiments A-J1 above and P1-X2 below.

L1. The polyalphaolefin according to Embodiment K1, comprising at least 50 mole % decene.

M1. The polyalphaolefin according to any one of Embodiments K1-L1, wherein the polyalphaolefin comprises at least 75 mole % $C_8$ to $C_{24}$ olefin.

N1. The polyalphaolefin according to any one of Embodiments K1-M1, wherein the polyalphaolefin comprises:
  a) less than 300 ppm of the Group 3, 4, 5, or 6 metal, as determined by ASTM 5185;
  b) less than 100 ppm of a Group 13 metal, as determined by ASTM 5185;
  c) an Mw of 100,000 g/mol or less;
  d) an Mn of 50,000 g/mol or less;
  e) an Mw/Mn of greater than 1 and less than 5;
  f) a pour point of less than 0° C., as determined according to ASTM D97;
  g) a kinematic viscosity at 40° C. from about 4 to about 50,000 cSt, as determined according to ASTM D445;
  h) a kinematic viscosity at 100° C. from about 1.5 to about 5,000 cSt, as determined according to ASTM D445;
  i) a flash point of 150° C. or more, as determined according to ASTM D56;
  j) a dielectric constant of 2.5 or less (1 kHz at 23° C.), as determined according to ASTM 924;
  k) a specific gravity of 0.75 to 0.96 g/cm³, as determined according to ASTM D4052;
  l) a viscosity index (VI) of 100 or more, as determined according to ASTM D2270-93[1998];
  m) a vinylene content of at least 50%, based upon total unsaturation, as determined by $^1$H NMR;
or a combination thereof.

O1. The polyalphaolefin of according to any one of Embodiments K1-N1, wherein the polyalphaolefin comprises:
  a) a total of at least 75 mole % of two or more $C_8$ to $C_{24}$ olefins;
  b) a kinematic viscosity at 40° C. less than 1,000 cSt, as determined according to ASTM D445;
  c) a kinematic viscosity at 100° C. of 60 cSt or more, as determined according to ASTM D445;
  d) a viscosity index (VI) of 160 or more, as determined according to ASTM D2270-93[1998];
  e) a pour point of less than −30° C., as determined according to ASTM D97;
  f) a specific gravity of 0.75 to 0.85 g/cm³, as determined according to ASTM D4052; and
  g) a flash point of 250° C. or more, as determined according to ASTM D56.

P1. The process according to any one of Embodiments A-J1, wherein the one or more olefins comprise at least two different alpha-olefin monomers selected from $C_3$ to $C_{30}$ alpha-olefins and the polyalphaolefin comprises an essentially random liquid polymer comprising the at least two different alpha-olefins.

Q1. The process according to embodiment P1 wherein the one or more olefins are present in a feed having an average carbon number of at least 4.1, with the proviso that any one of ethylene and propylene, if present in said feed, is present in the amount of less than 50 wt % individually, preferably in the amount of less than 50 wt % combined, based on the combined weight of alpha-olefins in said feed.

R1. The process according to Embodiment Q1, wherein said at least two different alpha-olefin monomers are selected from the group consisting of linear alpha-olefins, alpha-olefins characterized by alkyl or aryl substitution at least two carbons away from the double bond, and mixtures thereof S1. The process according to Embodiment Q1 or Embodiment R1, wherein said at least two different alpha-olefins are selected from the group consisting of $C_4$-$C_8$ linear alpha-olefins, $C_{12}$-$C_{24}$ linear alpha-olefins, 4-methyl-1-pentene, 5-methyl-1-hexene, 4-ethyl-1-hexene, 4-phenyl-1-pentene, and 5-phenyl-1-pentene.

T1. The process according to any one of Embodiments Q1 to S1, wherein said at least two different alpha-olefins are provided directly, without separation of individual alpha-olefins, from an alpha-olefin-producing process selected from an ethylene growth process, an olefin metathesis process, a wax-cracking process, a syn gas synthesis process, and mixtures thereof.

U1. The process according to any one of Embodiments Q1 to T1, wherein said random liquid polymer is characterized by a χ value (degree of randomness) ranging from 0.7 to 1.4, preferably 0.75 to 1.3, more preferably 0.8 to 1.2, most preferably 0.9 to 1.1.

V1. The process according to any one of Embodiments Q1 to U1, wherein the composition of said random liquid polymer is characterized by an incorporation of each alpha-olefin monomer within said product of within at least 20 wt % of the distribution of said alpha-olefin monomer within said feed.

W1. The process according to any one of Embodiments Q1 to V1, wherein the composition of the random liquid polymer is characterized by the ratio of the incorporated monomer mole % to the feed monomer mole % ranging from 0.5 to 5, preferably from 0.5 to 3.

X1. The process according to any one of Embodiments Q1 to W1, wherein said random liquid polymer is characterized by a stereo-arrangement of each monomer that is isotactic, atactic or syndiotactic.

Y1. The process according to any one of Embodiments Q1 to X1, wherein said random liquid polymer is characterized by a bromine number of greater than 2 and said process further comprises contacting said product with hydrogen to obtain a second polymer product characterized by a bromine number of less than 2.

Z1. The process according to any one of Embodiments Q1 to Y1, wherein said feed comprises at least two alpha-olefins selected from $C_3$ to $C_{24}$ alpha-olefins.

A2. The process according to any one of Embodiments Q1 to Z1, wherein said feed comprises at least two different alpha-olefins selected from $C_4$ to $C_{18}$ alpha-olefins.

B2. The process according to any one of Embodiments Q1 to A2, wherein said feed comprises at least three different alpha-olefins.

C2. The process according to any one of Embodiments Q1 to B2, wherein said feed comprises at least four different alpha-olefins.

D2. The process according to any one of Embodiments Q1 to C2, wherein said feed comprises less than 80 wt % of alpha-olefins selected from $C_8$ to $C_{12}$ alpha-olefins, based on the combined weight of alpha-olefins in said feed.

E2. The process according to any one of Embodiments Q1 to D2, wherein no alpha-olefin is present in said feed in an amount greater than 33 wt %, based on the combined weight of alpha-olefins in said feed.

F2. The process according to any one of Embodiments Q1 to E2, wherein the feed is selected from at least one alpha-olefin selected from 1-butene and 1-hexene and at least one alpha-olefin selected from $C_{12}$-$C_{18}$ alpha-olefins, and wherein the combined amount of 1-decene and 1-octene is less than 40 wt %.

G2. The process according to any one of Embodiments Q1 to F2, wherein said feed is characterized by an average carbon number of between 4.1 and about 14.

H2. The process according to any one of Embodiments Q1 to G2, wherein said feed is characterized by an average carbon number of greater than about 5.5 to about less than 11 and further characterized by the presence of $C_8$ to $C_{12}$ alpha-olefins in the combined amount of at least 50 wt %, based on the combined weight of alpha-olefins in said feed.

I2. The process according to any one of Embodiments Q1 to H2, wherein said feed is characterized by an average carbon number of greater than about 5.5 to about less than 11 and further characterized by the presence of $C_8$ to $C_{12}$ alpha-olefins in the combined amount of less than 10 wt %, based on the combined weight of alpha-olefins in said feed.

J2. The process according to any one of Embodiments Q1 to I2, wherein said feed is obtained and used for said contacting without separation or isolation of alpha-olefins from an ethylene growth process.

K2. The process of any one of Embodiments Q1 to J2, wherein said product is further characterized by at least one of the parameters selected from: (a) $M_n$=200-50,000; (b) $M_w$=200-80,000; (c) MWD=1 to 5; (d) Pour Point less than 10° C.; (e) KV at 40° C. of about 4 to about 80,000 cSt; (f) KV at 100° C. of about 1.5 to 5,000 cSt; (g) a Viscosity Index (VI) greater than or equal to 100.

L2. The process according to any one of Embodiments Q1 to K2, wherein said product is further characterized by a Viscosity Index (VI) of at least about 120.

M2. The process according to any one of Embodiments Q1 to L2, wherein said feed comprises from about 1 wt % to about 95 wt % $C_4$ to $C_8$ alpha-olefins, based on the combined weight of alpha-olefins in said feed.

N2. The process according to any one of Embodiments Q1 to M2, wherein said feed comprises from about 5 wt % to about 85 wt % $C_4$ to $C_8$ alpha-olefins, based on the combined weight of alpha-olefins in said feed.

O2. The process according to any one of Embodiments Q1 to N2, wherein said feed comprises from about 5 wt % to about 85 wt % $C_4$ to $C_8$ alpha-olefins, 15 wt % to about 95 wt % $C_{12}$-$C_{18}$ alpha-olefins, and less than 80 wt % $C_{10}$ alpha-olefins, based on the combined weight of alpha-olefins in said feed.

P2. The process according to any one of Embodiments Q1 to O2, wherein said feed comprises from about 5 wt % to about 85 wt % 1-octene, based on the combined weight of alpha-olefins in said feed.

Q2. The process according to any one of Embodiments Q1 to P2, wherein said feed comprises from about 5 wt % to about 85 wt % 1-octene, and less than 80 wt % of 1-dodecene, based on the combined weight of alpha-olefins in said feed.

R2. The process according to any one of Embodiments Q1 to Q2, wherein said feed comprises from about 5 wt % to about 85 wt % 1-octene and less than 55 wt % of 1-dodecene, based on the combined weight of alpha-olefins in said feed.

S2. The process according to any one of Embodiments Q1 to R2, wherein said feed comprises from about 5 wt % to about 85 wt % 1-octene, and less than 25 wt % of 1-dodecene, based on the combined weight of alpha-olefins in said feed.

T2. The process according to any one of Embodiments Q1 to S2, wherein said feed comprises from about 60 wt % to about 95 wt % of alpha-olefins selected from 1-hexene, 1-heptene and/or 1-octene and mixtures thereof and about 5 wt % to about 40 wt % of alpha-olefins selected from 1-dodecene, 1-tetradecene, and mixture thereof, based on the combined weight of alpha-olefins in said feed, and said product is characterized by a viscosity index of from about 140 to about 375, a KV at 100° C. of from about 10 to about 1000 cSt, and a pour point of less than −10° C.

U2. The process according to any one of Embodiments Q1 to T2, wherein:
the activator comprises a non-coordinating anion activator; and
the contact is in the absence of a scavenger or the scavenger is present at a molar ratio of scavenger to transition metal of less than 100:1, or less than 50:1, or less than 15:1, or less than 10:1.

V2. The process according to any one of Embodiments Q1 to U2, wherein the at least two different alpha-olefins comprise 1-octene and 1-dodecene.

W2. The process according to any one of Embodiments Q1 to V2, further comprising hydrogenating the liquid polymer to a Bromine number less than 1.

X2. The process according to any one of Embodiments Q1 to W2, wherein the liquid polymer comprises:
a) a kinematic viscosity at 40° C. less than 1,000 cSt, as determined according to ASTM D445;
b) a kinematic viscosity at 100° C. of 60 cSt or more, as determined according to ASTM D445;
c) a viscosity index (VI) of 160 or more, as determined according to ASTM D2270-93[1998];
d) a pour point of less than −30° C., as determined according to ASTM D97;
e) a specific gravity of 0.75 to 0.85 g/cm³, as determined according to ASTM D4052;
f) a flash point of 250° C. or more, as determined according to ASTM D56;
or a combination thereof.

Y2. The polyalphaolefin of according to any one of Embodiments K1-N1, wherein the polyalphaolefin comprises:
a) a total of at least 75 mole % of two or more $C_6$ to $C_{24}$ olefins;
b) a kinematic viscosity at 40° C. less than 1,500 cSt, as determined according to ASTM D445;
c) a kinematic viscosity at 100° C. of 4 cSt or more, as determined according to ASTM D445;
d) a viscosity index (VI) of 120 or more, as determined according to ASTM D2270-93[1998];
e) a pour point of less than −30° C., as determined according to ASTM D97;
f) a specific gravity of 0.80 to 0.86 g/cm³, as determined according to ASTM D4052; and g) a flash point of 210° C. or more, as determined according to ASTM D56.

Z2. The polyalphaolefin of according to any one of Embodiments K1-N1, wherein the polyalphaolefin comprises:
   a) a total of at least 75 mole % of two or more $C_6$ to $C_{24}$ olefins;
   b) a kinematic viscosity at 40° C. less than 100 cSt, as determined according to ASTM D445;
   c) a kinematic viscosity at 100° C. of 4 cSt or more, as determined according to ASTM D445;
   d) a viscosity index (VI) of 120 or more, as determined according to ASTM D2270-93[1998];
   e) a pour point of less than −40° C., as determined according to ASTM D97;
   f) a specific gravity of 0.80 to 0.85 g/cm$^3$, as determined according to ASTM D4052; and
   g) a flash point of 210° C. or more, as determined according to ASTM D56.

A3. The polyalphaolefin of according to any one of Embodiments K1-N1, wherein the polyalphaolefin comprises:
   a) a total of at least 75 mole % of two or more $C_6$ to $C_{24}$ olefins;
   b) a kinematic viscosity at 40° C. less than 1,500 cSt, as determined according to ASTM D445;
   c) a kinematic viscosity at 100° C. of 60 cSt or more, as determined according to ASTM D445;
   d) a viscosity index (VI) of 130 or more, as determined according to ASTM D2270-93[1998];
   e) a pour point of less than −30° C., as determined according to ASTM D97;
   f) a specific gravity of 0.83 to 0.86 g/cm$^3$, as determined according to ASTM D4052; and
   g) a flash point of 250° C. or more, as determined according to ASTM D56.

B3. The process according to any one of Embodiments Q1 to W2, wherein the liquid polymer comprises:
   a) a total of at least 75 mole % of two or more $C_6$ to $C_{24}$ olefins;
   b) a kinematic viscosity at 40° C. less than 1,500 cSt, as determined according to ASTM D445;
   c) a kinematic viscosity at 100° C. of 4 cSt or more, as determined according to ASTM D445;
   d) a viscosity index (VI) of 120 or more, as determined according to ASTM D2270-93[1998];
   e) a pour point of less than −30° C., as determined according to ASTM D97;
   f) a specific gravity of 0.80 to 0.86 g/cm$^3$, as determined according to ASTM D4052; and
   g) a flash point of 210° C. or more, as determined according to ASTM D56.

C3. The process according to any one of Embodiments Q1 to W2, wherein the liquid polymer comprises:
   a) a total of at least 75 mole % of two or more $C_6$ to $C_{24}$ olefins;
   b) a kinematic viscosity at 40° C. less than 100 cSt, as determined according to ASTM D445;
   c) a kinematic viscosity at 100° C. of 4 cSt or more, as determined according to ASTM D445;
   d) a viscosity index (VI) of 120 or more, as determined according to ASTM D2270-93[1998];
   e) a pour point of less than −40° C., as determined according to ASTM D97;
   f) a specific gravity of 0.80 to 0.85 g/cm$^3$, as determined according to ASTM D4052; and
   g) a flash point of 210° C. or more, as determined according to ASTM D56.

D3. The process according to any one of Embodiments Q1 to W2, wherein the liquid polymer comprises:
   a) a total of at least 75 mole % of two or more $C_6$ to $C_{24}$ olefins;
   b) a kinematic viscosity at 40° C. less than 1,500 cSt, as determined according to ASTM D445;
   c) a kinematic viscosity at 100° C. of 60 cSt or more, as determined according to ASTM D445;
   d) a viscosity index (VI) of 130 or more, as determined according to ASTM D2270-93[1998];
   e) a pour point of less than −30° C., as determined according to ASTM D97;
   f) a specific gravity of 0.83 to 0.86 g/cm$^3$, as determined according to ASTM D4052; and
   g) a flash point of 250° C. or more, as determined according to ASTM D56.

E3. The process according to any one of Embodiments P1 to X2 and B3 to D3, further comprising distillation to remove low molecular weight material having up to 16 carbon atoms or up to 24 carbon atoms from the liquid polymer.

F3. The process according to any one of Embodiments A to J1, further comprising distillation to remove low molecular weight material having up to 16 carbon atoms or up to 24 carbon atoms from the polyalphaolefin.

G3. The polyalphaolefin according to any one of Embodiments K1 to O1 and Y2 to A3, wherein the polyalphaolefin is essentially free of (or contains less than 0.1 percent by weight of) low molecular weight material having up to 16 carbon atoms or up to 24 carbon atoms.

EXAMPLES

The foregoing discussion can be further described with reference to the following non-limiting examples. Two illustrative catalyst compounds (A and B), each according to one or more embodiments described, were synthesized and some were used to polymerize olefins. Another illustrative catalyst compound (C) was used to prepare polyalpha-olefins (PAOs) and high viscosity index PAOs (HVI-PAOs). All reactions were carried out under a purified nitrogen atmosphere using standard glovebox, high vacuum or Schlenk techniques, unless otherwise noted. All solvents used were anhydrous, de-oxygenated and purified according to known procedures. All starting materials were either purchased from Aldrich and purified prior to use or prepared according to procedures known to those skilled in the art.

Synthesis of Compounds A-B:

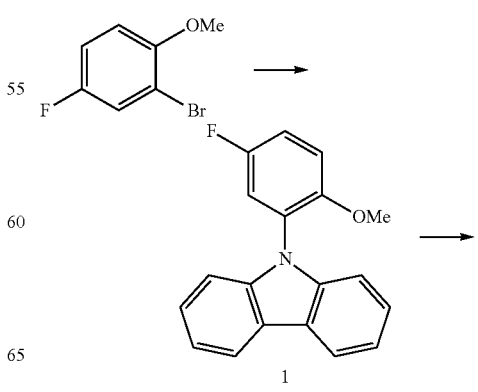

1

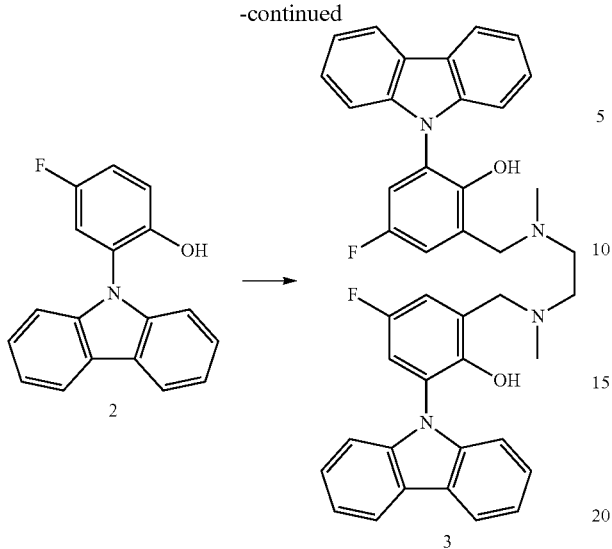

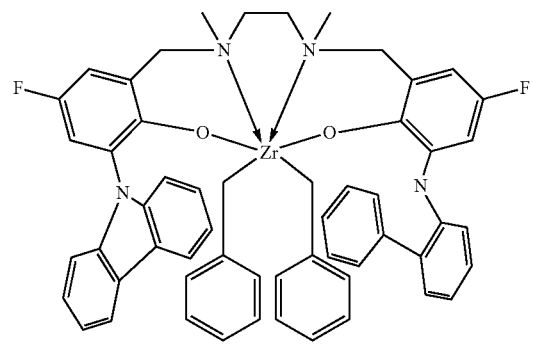

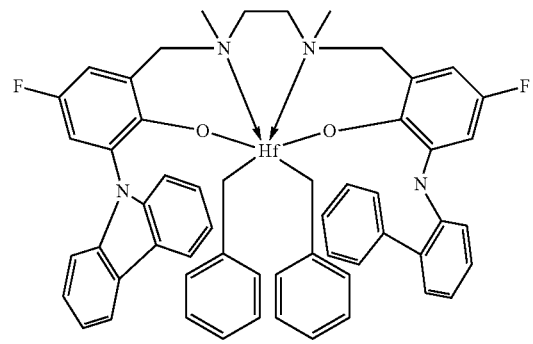

9-(5-Fluoro-2-methoxyphenyl)-9H-carbazole (1): 2-Bromo-4-fluoroanisole (20 g, 10 mmol, 1 equiv) and carbazole (18.4 g, 11 mmol, 1.1 equiv) were dissolved in 1,4-dioxane (200 mL). Potassium phosphate tribasic hydrate (46 g, 20 mmol, 2 equiv), copper(I) iodide (1 g, 0.5 mmol, 0.05 equiv) and 1,2-diaminopropane (1 mL, 1.3 mmol, 0.13 equiv) were added and the reaction was refluxed for 18 hours. The reaction was cooled to room temperature and filtered through celite. The filtrate was concentrated under reduced pressure and the residue was purified over silica gel (250 g), eluting with gradient of 0 to 10% ethyl acetate in heptanes to give compound 1 (7.6 g, 26% yield) as an off white solid that was contaminated with carbazole. This material was used subsequently.

2-(9H-Carbazol-9-yl)-4-fluorophenol (2): A 1.0 M boron tribromide solution in dichloro-methane (60 mL, 60 mmol, 3 equiv) was added dropwise over 30 minutes at −78° C. to a solution of compound 1 (5.8 g, 20 mmol, 1 equiv) in dichloromethane (60 mL). The reaction was stirred at −78° C. for 4 hours, when $^1$H-NMR indicated that the reaction was complete. The reaction was poured into saturated sodium bicarbonate (100 mL) and the pH adjusted to 8 with 10% sodium hydroxide. The layers were separated and the aqueous phase was extracted with dichloro-methane (3×20 mL). The combined organic layers were dried over sodium sulfate, filtered, and concentrated under reduced pressure. The residue was purified over silica gel (100 g), eluting with a gradient of 60 to 100% dichloromethane in heptanes. The product containing fractions were combined, concentrated under reduced pressure and triturated with 20% methyl test-butyl ether in heptanes (10 mL) to give compound 2 (4.3 g, 78% yield) as a white solid.

6,6'-((Ethane-1,2-diylbis(methylazanediyl))bis(methylene))bis(2-(9H-carbazol-9-yl)-4-fluorophenol) (3): A mixture of compound 2 (1.5 g, 5.4 mmol, 2 equiv), paraformaldehyde (716 mg, 5.4 mmol, 2 equiv), N,N'-dimethylethylenediamine (300 μL, 2.7 mmol, 1 equiv) and anhydrous ethanol (20 mL) was refluxed for 18 hours (reaction was ~60% complete after 2 hours). The reaction was cooled to room temperature, then concentrated under reduced pressure. The residue was purified over silica gel (50 g), eluting with a gradient of 60 to 100% dichloromethane in heptanes to give compound 3 (640 mg, 34% yield) as a white solid.

6,6'-((Ethane-1,2-diylbis(methylazanediyl))bis(methylene))bis(2-(9H-carbazol-9-yl)-4-fluorophenol)]zirconium (IV)dibenzyl (A): Under a nitrogen atmosphere, a toluene solution (5 mL) of 3 (107 mg, 0.17 mmol) was added to a yellow toluene solution (5 mL) of ZrBn$_4$ (77 mg, 0.17 mmol), forming a deep yellow solution. After stirring at room temperature for 15 minutes, the solvent was removed to give a yellow sticky solid. The product was washed with pentane and dried under vacuum to give compound A as a yellow solid (yield 135 mg, 88%). Compound B was made in a similar manner compound 3 and hafnium tetrabenzyl.

Polymerization Process: All reactions were performed under an inert nitrogen atmosphere. Solvents were anhydrous grade from Sigma Aldrich which were sparged with nitrogen and stored over alumina beads (activated at 300° C.) before use. Deuterated solvents were obtained from Cambridge Isotope Laboratories (Andover, Mass.) and dried over 3 Å molecular sieves. All other reagents were obtained from Sigma Aldrich (St. Louis, Mo.) and used as received, unless otherwise noted. All $^1$H NMR data was collected on a Bruker AVANCE III 400 MHz spectrometer running Topspin™ 3.0 software at room temperature (approx 23° C.). Tetrachloroethane-d$_2$ was used as a solvent (chemical shift of 5.98 ppm was used as a reference) for all materials.

Polymerization 1

Catalyst A (11.3 mg) and $(C_6H_5)_3C^| B(C_6F_5)_4^-$ (11.4 mg) were combined in ~2 mL of toluene in a 20 mL vial. In a 100 mL round bottom flask 50 μL of tri-n-octylaluminum was combined with 15.3 grams of 1-hexene (NaK dried). The catalyst solution was added and the reaction was placed in an oil bath at 45° C. and left overnight. 14.3 grams of polyhexene was isolated after drying under vacuum.

Polymerization 2

Catalyst A (5.8 mg) and $(C_6H_5)_3C^+B(C_6F_5)_4^-$ (5.8 mg) were combined in ~2 mL of toluene in a 20 mL vial. In a 100 mL round bottom flask 20 μL of tri-n-octylaluminum was combined with 6.86 grams of 1-hexene (NaK dried). The catalyst solution was added and the reaction was placed in an oil bath at 80° C. for 3 hours. 6.11 grams of polyhexene was isolated after drying under vacuum.

Polymerization 3

Catalyst A (5.3 mg) and $(C_6H_5)_3C^+ B(C_6F_5)_4^-$ (5.3 mg) were combined in ~2 mL of toluene in a 20 mL vial. In a 100 mL round bottom flask 20 μL of tri-n-octylaluminum was combined with 6.78 grams of 1-hexene (NaK dried). The catalyst solution was added and the reaction was placed in an oil bath at 45° C. and left overnight. 6.2 grams of polyhexene was isolated after drying under vacuum.

TABLE 1

Polymerization Results for Compound A with 1-hexene.

| | Polymerization | | |
|---|---|---|---|
| | 1 | 2 | 3 |
| Temperature (° C.) | 45 | 80 | 100 |
| Reaction Time (hr) | 16 | 3 | 3 |
| Yield (g) | 14.3 | 6.11 | 6.21 |
| Conversion (%) | 92.8 | 89.1 | 91.5 |
| Mn (g/mol) | 4000 | 4600 | 4500 |
| Vinylene (%) | 95.2 | 98.8 | 95.1 |
| Vinylidene (%) | 4.7 | 1.2 | 4.7 |

Polymerization 4

Compound B (10 μmol) was dissolved in 1 mL of 1-hexene and added to a stirred solution of MAO (500 equiv) in 4 mL 1-hexene at room temperature. The resulting mixture was stirred until the resulting polymer solution had become viscous. The polymer was treated with acidified methanol solution (5% HCl solution) and extracted with chloroform.

Polymerization 5

Figure 2:
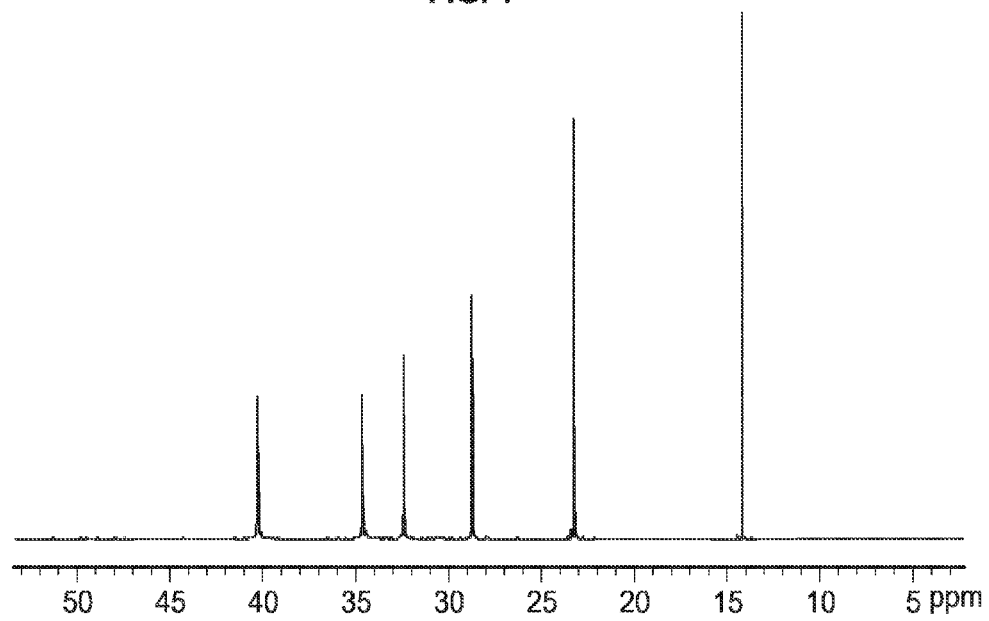
FIG. 2 is a $^{13}$C NMR image for poly-(1-hexene) made with Compound B/B($C_6F_5$)$_3$ according to an embodiment of the invention.

Compound B (10 μmol) was dissolved in 1 mL of 1-hexene and added to a stirred solution of $B(C_6F_5)_3$ (1.5 equiv) in 4 mL 1-hexene. The resulting mixture was stirred at room temperature until the resulting polymer solution had become viscous. The polymer was dried from monomer in vacuum. The $^{13}C$ NMR for the poly-(1-hexene) made with Compound B/B$(C_6F_5)_3$ is shown in FIG. 2.

Polymerization 6

Compound B (10 μmol) was dissolved in 0.5 mL of toluene and added to a stirred solution of MAO (500 equiv), 1 g vinylcyclohexane in 5 mL toluene were added. The resulting mixture was stirred for 1 hour. The poly-vinylcyclohexane (poly-VCH) was treated with acidified methanol solution (5% HCl solution), filtered and dried in air. The $^{13}C$ NMR for the poly-(1-hexene) made with Compound B/MAO is shown in FIG. 1.

TABLE 2

Polymerization Results for Compound B with 1-hexene and vinylcyclohexane.

| Monomer | Activator | Catalyst Amt (mg) | Time (hr) | Polymer Amt (g) | Activity (g/mmol/hr) | Tacticity [mmmm] |
|---|---|---|---|---|---|---|
| 1-hexene | MAO | 10 | 1 | 3.36 | 336 | 62.7 |
| 1-hexene | $B(C_6F_5)_3$ | 10 | 1 | 2.94 | 294 | 94.1 |
| VCH | MAO | 10 | 1 | 1.00 | 100 | ND |

Note:
ND = Not determined

As the data for the foregoing examples show, the catalyst compounds, catalyst systems, and polymerization processes disclosed herein provide novel and improved catalyst and systems for the polymerization of olefins, which in an embodiment produce polymers having improved properties, such as high polymer melting point, high polymer molecular weights, an increased conversion and/or comonomer incorporation, which may further include a significant amount of long chain branching and/or a significant amount of vinyl termination.

The catalysts in an embodiment provide improvement in catalyst activity, produce polymers with improved properties or both. In an embodiment crystallographic techniques indicate that the appended ring system or systems (e.g., the carbazole ring systems) are oriented transversely, e.g., perpendicular, to the phenol rings. In an embodiment these catalysts have a structure to provide a broad corridor for the polymeryl moiety to reside and for the monomer to insert during the polymerization process. As such, catalysts according to one embodiment of the instant disclosure provide for an ability to control one or more characteristics of polymerization, tacticity, comonomer insertion, and the like.

Preparation of HVI-PAOs:

An octene/dodecene HVI-PAO was similarly prepared using catalyst C ([6,6'-((Ethane-1,2-diylbis(methylazanediyl))bis(methylene))bis(2-(9H-carbazol-9-yl)-4-methylphenol)]zirconium(IV)dibenzyl):

Catalyst C

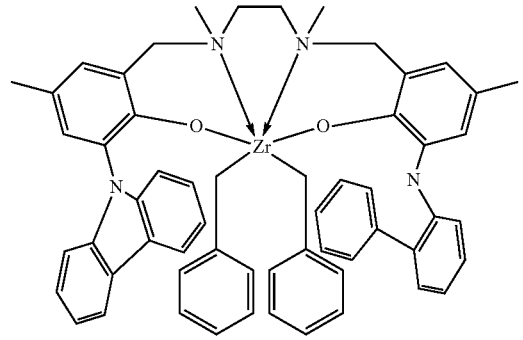

The activator in the following examples was a non-coordinating anion from N,N-dimethylanilinium tetraphenylborate.

Polymerization 7

An olefin mixture containing 80% 1-octene and 20% 1-dodecene was fed for two hours at 1040 g/h along with a scavenger mixture containing 12.5% tri-n-octyl aluminum (TNOA, molar ratio TNOA:Zr 13.4), 37.5% hexanes, and 50% toluene at 2.08 g/h to a cleaned, dried, oxygen-free, 3.785-L continuous stirred tank reactor (CSTR) maintaining 0.172 MPa (25 psig) nitrogen pressure. The reactor was operated in semi-batch mode and held at constant temperature of 80° C. Simultaneously, a catalyst solution containing 0.4 g Catalyst C and 0.36 g N,N-dimethylanilinium tetraphenylborate in 324.4 g toluene was feed at 0.77 mL/min. independently to the same reactor.

After two hours the flows were discontinued and the reactor contents were allowed to continue mixing for an additional two hours. Samples were taken every 0.5 h. The composition of every other sample was measured by gas chromatography to determine monomer conversion. After four hours the reactor contents were quenched in wet hexane. The contents were distilled to remove the remaining monomers, dimers and trimers with up to 24 carbons (C24), and the bottoms product recovered as the product after distillation (PAD-C24). The PAD-C24 product yield was 90.4% and had a KV100 of 66.6 cSt, a KV40 of 591 cSt and a Viscosity Index (VI) of 188. The PAD-C24 product was hydrogenated using a nickel slurry catalyst, filtered and stabilized with 150 ppm IRGANOX L57 aminic antioxidant. The hydrogenated PAD-C24 product had a pour point of −45° C., specific gravity of 0.843 and a Bromine number of 0.

Polymerization 8

This example was similar to Polymerization 7, except 1.5 g TNOA (molar ratio TNOA:Zr 9.51) was added to the catalyst solution as scavenger and the reactor temperature was maintained at 100° C. In this example the PAD-C24 product yield was 67.8% and had a KV100 of 32.9 cSt, a KV40 of 257 cSt and a Viscosity Index (VI) of 173. The hydrogenated PAD-C24 product had a pour point of −51° C., specific gravity of 0.839 and a Bromine number of 0.1.

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

What is claimed is:

1. A process comprising:
   contacting one or more olefins with a catalyst system at a temperature, a pressure, and for a period of time sufficient to produce a polyalphaolefin comprising at least 50 mol % $C_5$ to $C_{24}$ olefin;
   the catalyst system comprising an activator and a catalyst compound according to Formula I, Formula II, Formula III, or a combination thereof:
   Formula I being represented by:

(I)

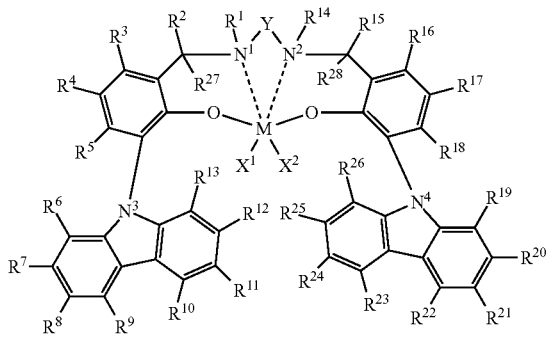

M is a Group 3, 4, 5 or 6 transition metal;
each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$ and $R^{28}$ is, independently, a hydrogen, a $C_1$-$C_{40}$ hydrocarbyl radical, a functional group comprising elements from Groups 13-17 of the periodic table of the elements, or two or more of $R^1$ to $R^{28}$ may independently join together to form a $C_4$ to $C_{62}$ cyclic or polycyclic ring structure, or a combination thereof, or a combination thereof; and
Y is a divalent $C_1$ to $C_{20}$ hydrocarbyl;
Formula II being represented by:

(II)

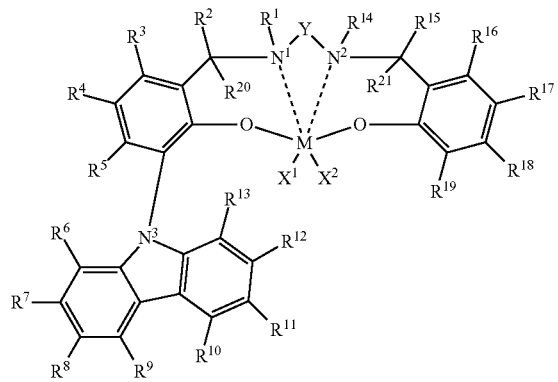

where M is a Group 3, 4, 5 or 6 transition metal;
each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is, independently, a hydrogen, a $C_1$-$C_{40}$ hydrocarbyl radical, a functional group comprising elements from Group 13-17 of the periodic table of the elements, or two or more of $R^1$ to $R^{21}$ may independently join together to form a $C_4$ to $C_{62}$ cyclic or polycyclic ring structure, or a combination thereof; subject to the proviso that $R^{19}$ is not a carbazole or a substituted carbazole radical, and
Y is a divalent $C_1$ to $C_{20}$ hydrocarbyl radical;
Formula III being represented by:

(III)

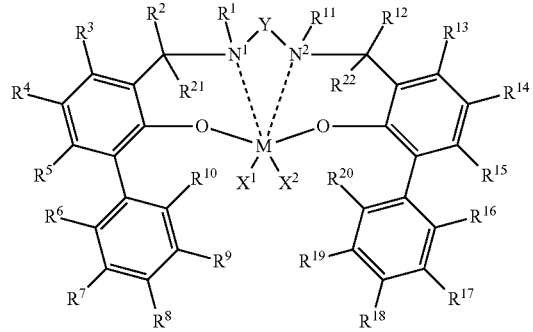

M is a Group 3, 4, 5 or 6 transition metal;
each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;

$R^1$ and $R^{11}$ are $C_1$-$C_{10}$ hydrocarbyl radicals;

$R^4$ and $R^{14}$ are $C_1$-$C_{10}$ hydrocarbyl radicals or fluorine;

$R^6$, $R^7$, $R^8$, $R^9$, $R^{10}$, $R^{16}$, $R^{17}$, $R^{18}$, $R^{19}$, and $R^{20}$ are fluorine;

each $R^2$, $R^3$, $R^5$, $R^{12}$, $R^{13}$, $R^{15}$, $R^{21}$, and $R^{22}$ is, independently, a hydrogen, a $C_1$-$C_{40}$ hydrocarbyl radical, a functional group comprising elements from Group 13-17 of the periodic table of the elements, or two or more of $R^2$, $R^3$, $R^5$, $R^{12}$, $R^{13}$, $R^{15}$, $R^{21}$, and $R^{22}$ may independently join together to form a $C_4$ to $C_{62}$ cyclic or polycyclic ring structure, or a combination thereof; and Y is a divalent $C_1$ to $C_{20}$ hydrocarbyl radical.

2. The process of claim 1, wherein each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$ $R^{24}$, $R^{25}$, $R^{26}$, $R^{27}$ and $R^{28}$ of Formula (I), each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ of Formula (II), each $R^2$, $R^3$, $R^5$, $R^{12}$, $R^{13}$, $R^{15}$, $R^{21}$, and $R^{22}$ of Formula (III), or a combination thereof are, independently, hydrogen, a halogen, or a $C_1$ to $C_{10}$ hydrocarbyl radical.

3. The process of claim 1, wherein Y of Formula I, Formula II, Formula III, or a combination thereof is —CH$_2$ CH$_2$— or 1,2-cyclohexylene.

4. The process of claim 1, wherein Y of Formula I, Formula II, Formula III, or a combination thereof is —CH$_2$ CH$_2$ CH$_2$—.

5. The process of claim 1, wherein Y of Formula I, Formula II, Formula III, or a combination thereof is a $C_1$ to $C_{20}$ divalent hydrocarbyl radical comprising a linker backbone comprising from 1 to 18 carbon atoms bridging between nitrogen atoms $N^1$ and $N^2$.

6. The process of claim 1, wherein Y of Formula I, Formula II, Formula III, or a combination thereof is a $C_1$ to $C_{20}$ divalent hydrocarbyl radical comprising O, S, S(O), S(O)$_2$, Si(R')$_2$, P(R'), N(H), N(R'), or a combination thereof, wherein each R' is independently a $C_1$-$C_{18}$ hydrocarbyl radical.

7. The process of claim 1, wherein the activator comprises alumoxane, a non-coordinating anion activator, or a combination thereof.

8. The process of claim 1, wherein the one or more olefins comprise at least two different alpha-olefin monomers selected from $C_3$ to $C_{30}$ alpha-olefins and the polyalphaolefin comprises an essentially random liquid polymer comprising the at least two different alpha-olefins.

9. The process of claim 8, wherein:

two or more of $R^1$ to $R^{28}$ of Formula I, $R^1$ to $R^{21}$ of Formula II, $R^2$, $R^3$, $R^5$, $R^{12}$, $R^{13}$, $R^{15}$, $R^{21}$, and $R^{22}$ of Formula III, or a combination thereof, independently join together to form a $C_4$ to $C_{62}$ cyclic or polycyclic ring structure;

M of Formula I, Formula II, Formula III, or a combination thereof is Hf, Ti, or Zr;

each X of Formula I, Formula II, Formula III, or a combination thereof is, independently, a halogen or a $C_1$ to $C_7$ hydrocarbyl radical;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$ $R^{24}$, $R^{25}$, $R^{26}$, $R^{27}$ and $R^{28}$ of Formula (I), each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ of Formula (II), each $R^2$, $R^3$, $R^5$, $R^{12}$, $R^{13}$, $R^{15}$, $R^{21}$, and $R^{22}$ of Formula (III), or a combination thereof are, independently, hydrogen, a halogen, or a $C_1$ to $C_{30}$ hydrocarbyl radical; or a combination thereof.

10. The process of claim 8, wherein the catalyst compound is according to Formula I where one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$ $R^{24}$, $R^{25}$, $R^{26}$, $R^{27}$, and $R^{28}$ is a methyl radical, a fluoride, or a combination thereof.

11. The process of claim 10, where M is Zr; $X^1$ and $X^2$ are benzyl radicals; and Y is —CH$_2$CH$_2$—; and further where:

(A) $R^1$ and $R^{14}$ are methyl radicals; and $R^2$ through $R^{13}$ and $R^{15}$ through $R^{28}$ are hydrogen; or (B) $R^1$, $R^4$, $R^{14}$ and $R^{17}$ are methyl radicals; and $R^2$, $R^3$, $R^5$ through $R^{13}$, $R^{15}$, $R^{16}$, $R^{18}$ through $R^{28}$ are hydrogen; or (C) $R^1$ and $R^{14}$ are methyl radicals; $R^4$ and $R^{17}$ are fluoro groups; and $R^2$, $R^3$, $R^5$ through $R^{13}$, $R^{15}$, $R^{16}$, $R^{18}$ through $R^{28}$ are hydrogen; or (D) $R^1$, $R^4$, $R^{14}$ and $R^{17}$ are methyl radicals; $R^8$, $R^{11}$, $R^{21}$ and $R^{24}$ are tert-butyl radicals; and $R^2$, $R^3$, $R^5$, $R^6$, $R^7$, $R^9$, $R^{10}$, $R^{12}$, $R^{13}$, $R^{15}$, $R^{16}$, $R^{18}$, $R^{19}$, $R^{20}$, $R^{22}$, $R^{23}$, $R^{25}$ and $R^{26}$ through $R^{28}$ are hydrogen; or (E) $R^1$, $R^4$, $R^{14}$ and $R^{17}$ are methyl radicals; $R^8$, $R^{11}$, $R^{21}$ and $R^{24}$ are mesityl radicals; and $R^2$, $R^3$, $R^5$, $R^6$, $R^7$, $R^9$, $R^{10}$, $R^{12}$, $R^{13}$, $R^{15}$, $R^{16}$, $R^{18}$, $R^{19}$, $R^{20}$, $R^{22}$, $R^{23}$, $R^{25}$ and $R^{26}$ through $R^{28}$ are hydrogen; or a combination thereof.

12. The process of claim 8, wherein the catalyst compound is according to Formula II where one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is a methyl radical, a bromide, an adamantyl radical, or a combination thereof.

13. The process of claim 12, wherein: $X^1$ and $X^2$ are benzyl radicals; Y is —CH$_2$CH$_2$—; and further where:

(A) M is Zr; $R^1$ and $R^{14}$ are methyl radicals; $R^2$ through $R^{13}$, $R^{15}$, $R^{16}$, $R^{18}$, $R^{20}$ and $R^{21}$ are hydrogen; $R^{17}$ and $R^{19}$ are bromine; or (B) M is Zr; $R^1$, $R^{14}$ and $R^{17}$ are methyl radicals; $R^2$ through $R^{13}$, $R^{15}$, $R^{16}$, $R^{18}$, $R^{20}$, and $R^{21}$ are hydrogen; $R^{19}$ is a 1-adamantyl radical; or (C) M is Hf; $R^1$ and $R^{14}$ and $R^{17}$ are methyl radicals; $R^2$ through $R^{13}$, $R^{15}$, $R^{16}$, $R^{18}$, $R^{20}$ and $R^{21}$ are hydrogen; and $R^{19}$ is a 1-adamantyl radical; or a combination thereof.

14. The process of claim 8, wherein the catalyst compound is according to Formula III where one or more of $R^2$, $R^3$, $R^4$, $R^5$, $R^{12}$, $R^{13}$, $R^{14}$, $R^{15}$, $R^{21}$, and $R^{22}$ is a methyl radical, a fluoride, or a combination thereof.

15. The process of claim 14, wherein: $X^1$ and $X^2$ are benzyl radicals; and Y is —CH$_2$ CH$_2$—; and further wherein:

(A) M is Ti; $R^1$ and $R^{11}$ are methyl radicals; $R^2$, $R^3$, $R^5$, $R^{12}$, $R^{13}$, $R^{15}$, $R^{21}$ and $R^{22}$ are hydrogen; and $R^4$ and $R^{14}$ are fluorine; or (B) M is Ti; $R^1$, $R^4$, $R^{11}$ and $R^{14}$ are methyl radicals; and $R^2$, $R^3$, $R^5$, $R^{12}$, $R^{13}$, $R^{15}$, $R^{21}$ and $R^{22}$ are hydrogen; or (C) M is Zr; $R^1$ and $R^{11}$ are methyl radicals; $R^2$, $R^3$, $R^5$, $R^{12}$, $R^{13}$, $R^{15}$, $R^{21}$ and $R^{22}$ are hydrogen; and $R^4$ and $R^{14}$ are fluorine; or (D) M is Zr; $R^1$, $R^4$, $R^{11}$ and $R^{14}$ are methyl radicals; and $R^2$, $R^3$, $R^5$, $R^{12}$, $R^{13}$, $R^{15}$, $R^{21}$ and $R^{22}$ are hydrogen; or a combination thereof.

16. The process of claim 8, wherein:

the activator comprises a non-coordinating anion activator; and the contact is in the absence of a scavenger or the scavenger is present at a molar ratio of scavenger to transition metal of less than 100:1.

17. The process of claim 8, wherein the at least two different alpha-olefins comprise 1-octene and 1-dodecene.

18. The process of claim 8, further comprising distillation to remove low molecular weight material having up to 24 carbon atoms from the polyalphaolefin.

19. The process of claim 8, further comprising hydrogenating the liquid polymer to a bromine number less than 1.

20. The process of claim 8, wherein the liquid polymer comprises:
   a) a kinematic viscosity at 40° C. less than 1,000 cSt, as determined according to ASTM D445;
   b) a kinematic viscosity at 100° C. of 60 cSt or more, as determined according to ASTM D445;
   c) a viscosity index (VI) of 160 or more, as determined according to ASTM D2270-93[1998];
   d) a pour point of less than −30° C., as determined according to ASTM D97;
   e) a specific gravity of 0.75 to 0.85 g/cm$^3$, as determined according to ASTM 20 D4052;
   f) a flash point of 250° C. or more, as determined according to ASTM D56; or
   g) a combination thereof.

21. A polyalphaolefin, comprising:
   an essentially random liquid polymer comprising at least two different alpha-olefin comonomers selected from $C_3$ to $C_{30}$ alpha-olefins; and
   a disubstituted vinylene content of at least 60%, based upon total unsaturation, as determined by $^1$H NMR, the polyalphaolefin produced by a process comprising:
   contacting one or more olefins with a catalyst system at a temperature, a pressure, and for a period of time sufficient to produce a polyalphaolefin comprising at least 50 mol % $C_5$ to $C_{24}$ olefin;
   the catalyst system comprising an activator and a catalyst compound according to Formula I, Formula II, Formula III, or a combination thereof:
   Formula I being represented by:

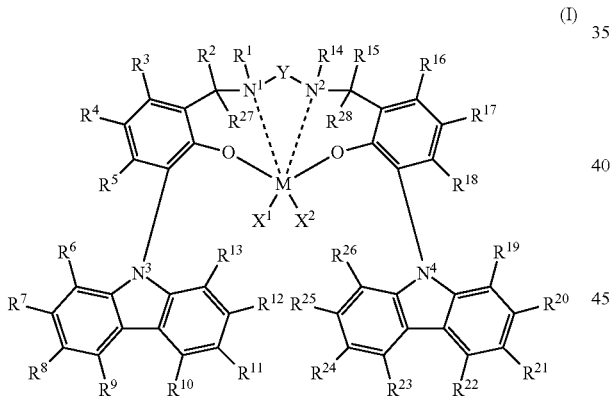

(I)

M is a Group 3, 4, 5 or 6 transition metal;
each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}R^{21}$, $R^{22}$, $R^{22}$, $R^{23}$, $R^{24}$, $R^{25}$, $R^{26}$, $R^{27}$, and $R^{28}$ is, independently, a hydrogen, a $C_1$-$C_{40}$ hydrocarbyl radical, a functional group comprising elements from Groups 13-17 of the periodic table of the elements, or two or more of $R^1$ to $R^{28}$ may independently join together to form a $C_4$ to $C_{62}$ cyclic or polycyclic ring structure, or a combination thereof; and
Y is a divalent $C_1$ to $C_{20}$ hydrocarbyl;

Formula II being represented by:

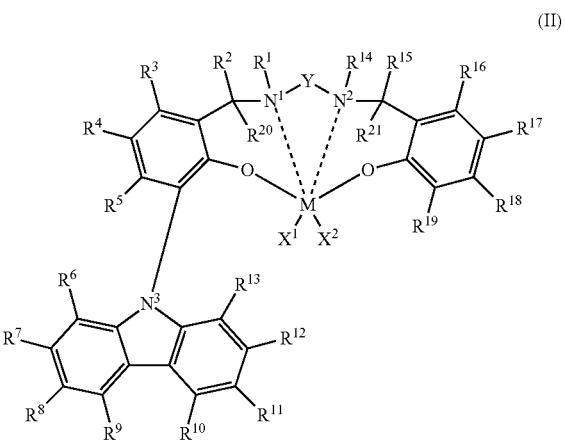

(II)

where M is a Group 3, 4, 5 or 6 transition metal;
each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;
each $R^1$, $R^2$, $R^3$, $R^4$, $R^5$, $R^6$, $R^7$, $R^8R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$ and $R^{21}$ is, independently, a hydrogen, a $C_1$-$C_{40}$ hydrocarbyl radical, a functional group comprising elements from Group 13-17 of the periodic table of the elements, or two or more of $R^1$ to $R^{21}$ may independently join together to form a $C_4$ to $C_{62}$ cyclic or polycyclic ring structure, or a combination thereof; subject to the proviso that $R^{19}$ is not a carbazole or a substituted carbazole radical, and
Y is a divalent $C_1$ to $C_{20}$ hydrocarbyl radical;

Formula III being represented by:

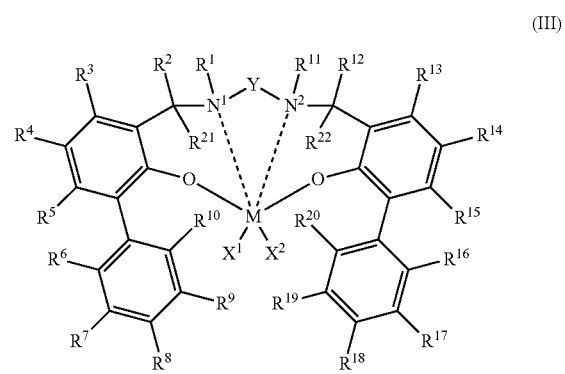

(III)

M is a Group 3, 4, 5 or 6 transition metal;
each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;
$R^1$ and $R^{11}$ are $C_1$-$C_{10}$ hydrocarbyl radicals;
$R^4$ and $R^{14}$ are $C_1$-$C_{10}$ hydrocarbyl radicals or fluorine;
$R^6$, $R^7$, $R^8$, $R^9$, $R^{10}$, $R^{16}$, $R^{17}$, $R^{18}$, $R^{19}$, and $R^{20}$ are fluorine;

each $R^2$, $R^3$, $R^5$, $R^{12}$, $R^{13}$, $R^{15}$, $R^{21}$, and $R^{22}$ is, independently, a hydrogen, a $C_1$-$C_{40}$ hydrocarbyl radical, a functional group comprising elements from Group 13-17 of the periodic table of the elements, or two or more of $R^2$, $R^3$, $R^5$, $R^{12}$, $R^{13}$, $R^{15}$, $R^{21}$, and $R^{22}$ may independently join together to form a $C_4$ to $C_{62}$ cyclic or polycyclic ring structure, or a combination thereof; and Y is a divalent $C_1$ to $C_{20}$ hydrocarbyl radical.

22. The polyalphaolefin of claim 21, comprising at least 50 mole % decene.

23. The polyalphaolefin of claim 21, wherein the polyalphaolefin comprises at least 75 mole % $C_8$ to $C_{24}$ olefin.

24. A polyalphaolefin, comprising:
an essentially random liquid polymer comprising at least two different alpha-olefin comonomers selected from $C_3$ to $C_{30}$ alpha-olefins and comprising a total of at least 75 mole % of two or more $C_8$ to $C_{24}$ olefins;
wherein the polyalphaolefin is produced by a process comprising;
(i) contacting the alpha-olefin comonomers with a catalyst system at a temperature, a pressure, and for a period of time sufficient to produce a polymer product comprising the liquid polymer and a disubstituted vinylene content of at least 60%, based upon total unsaturation, as determined by $^1$H NMR; and
(ii) optionally hydrogenating the polymer product to a bromine number less than 1;
the catalyst system comprising an activator and a catalyst compound according to Formula I, Formula II, Formula III, or a combination thereof:

Formula I being represented by:

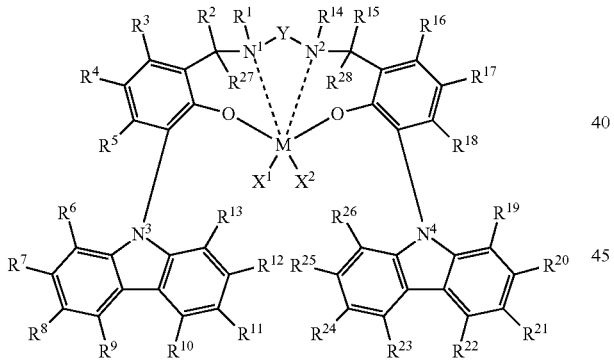

(I)

M is a Group 3, 4, 5 or 6 transition metal;
each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$ $R^{21}$, $R^{22}$, $R^{23}$, $R^{24}$, $R^{25}$, $R^{26}$, $R^{27}$, and $R^{28}$ is, independently, a hydrogen, a $C_1$-$C_{40}$ hydrocarbyl radical, a functional group comprising elements from Groups 13-17 of the periodic table of the elements, or two or more of $R^1$ to $R^{28}$ may independently join together to form a $C_4$ to $C_{62}$ cyclic or polycyclic ring structure, or a combination thereof, or a combination thereof; and
Y is a divalent $C_1$ to $C_{20}$ hydrocarbyl;

Formula II being represented by:

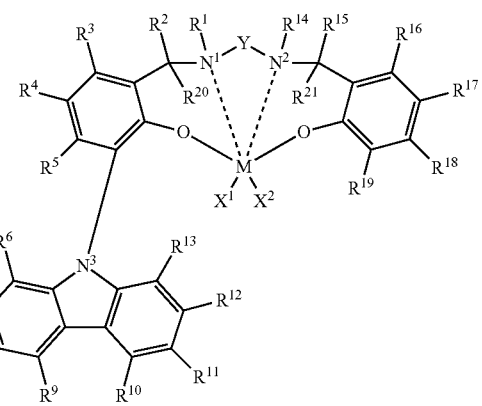

(II)

where M is a Group 3, 4, 5 or 6 transition metal;
each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is, independently, a hydrogen, a $C_1$-$C_{40}$ hydrocarbyl radical, a functional group comprising elements from Group 13-17 of the periodic table of the elements, or two or more of $R^1$ to $R^{21}$ may independently join together to form a $C_4$ to $C_{62}$ cyclic or polycyclic ring structure, or a combination thereof; subject to the proviso that $R^{19}$ is not a carbazole or a substituted carbazole radical, and
Y is a divalent $C_1$ to $C_{20}$ hydrocarbyl radical;

Formula III being represented by:

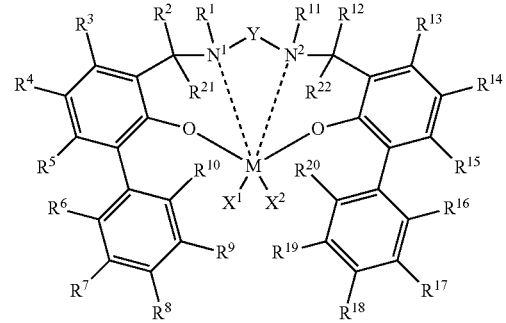

(III)

M is a Group 3, 4, 5 or 6 transition metal;
each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;
$R^1$ and $R^{11}$ are $C_1$-$C_{10}$ hydrocarbyl radicals;
$R^4$ and $R^{14}$ are $C_1$-$C_{10}$ hydrocarbyl radicals or fluorine;
$R^6$, $R^7$, $R^8$, $R^9$, $R^{10}$, $R^{16}$, $R^{17}$, $R^{18}$, $R^{19}$, and $R^{20}$ are fluorine;
each $R^2$, $R^3$, $R^5$, $R^{12}$, $R^{13}$, $R^{15}$, $^{21}$, and $R^{22}$ is, independently, a hydrogen, a $C_1$-$C_{40}$ hydrocarbyl radical, a functional group comprising elements from Group 13-17 of the periodic table of the elements, or two or more of $R^2$, $R^3$, $R^3$, $R^5$, $R^{12}$, $R^{13}$, $R^{15}$, $R^{21}$, and $R^{22}$ may independently join together to form a $C_4$ to $C_{62}$ cyclic or polycyclic ring structure, or a combination thereof; and Y is a divalent $C_1$ to $C_{20}$ hydrocarbyl radical.

25. The polyalphaolefin of claim 21, wherein the polyalphaolefin comprises a disubstituted vinylene content of at least 70%, based upon total unsaturation, as determined by $^1$H NMR.

26. The polyalphaolefin of claim 21, wherein the polyalphaolefin comprises a disubstituted vinylene content of at least 90%, based upon total unsaturation, as determined by $^1$H NMR.

27. The polyalphaolefin of claim 21, wherein the polyalphaolefin comprises a disubstituted vinylene content of at least 94%, based upon total unsaturation, as determined by $^1$H NMR.

28. The polyalphaolefin of claim 21, wherein the polyalphaolefin comprises a disubstituted vinylene content of at least 98%, based upon total unsaturation, as determined by $^1$H NMR.

29. The polyalphaolefin of claim 24, wherein the polyalphaolefin comprises:
   a) less than 300 ppm of the Group 3, 4, 5, or 6 transition metal, as determined by ASTM 5185;
   b) less than 100 ppm of a Group 13 metal, as determined by ASTM 5185;
   c) an Mw of 100,000 g/mol or less;
   d) an Mn of 50,000 g/mol or less;
   e) an Mw/Mn of greater than 1 and less than 5;
   f) a pour point of less than 0° C., as determined according to ASTM D97;
   g) a kinematic viscosity at 40° C. from about 4 to about 50,000 cSt, as determined according to ASTM D445;
   h) a kinematic viscosity at 100° C. from about 1.5 to about 5,000 cSt, as determined according to ASTM D445;
   i) a flash point of 150° C. or more, as determined according to ASTM D56;
   j) a dielectric constant of 2.5 or less (1 kHz at 23° C.), as determined according to ASTM 924;
   k) a specific gravity of 0.75 to 0.96 g/cm³, as determined according to ASTM D4052;
   l) a viscosity index (VI) of 100 or more, as determined according to ASTM D2270-93[1998];
   m) a vinylene content of at least 70%, based upon total unsaturation, as determined by $^1$H NMR; or
   a combination thereof.

30. A polyalphaolefin, comprising:
   a) a total of at least 75 mole % of two or more $C_8$ to $C_{24}$ olefins;
   b) a kinematic viscosity at 40° C. of less than 1,000 cSt, as determined according to ASTM D445;
   c) a kinematic viscosity at 100° C. of 60 cSt or more, as determined according to ASTM D445;
   d) a viscosity index (VI) of 160 or more, as determined according to ASTM D2270-93[1998];
   e) a pour point of less than −30° C., as determined according to ASTM D97;
   f) a specific gravity of 0.75 to 0.85 g/cm³, as determined according to ASTM D4052; and
   g) a flash point of 250° C. or more, as determined according to ASTM D56;
   wherein the polyalphaolefin is produced by a process comprising contacting one or more olefins with a catalyst system at a temperature, a pressure, and for a period of time sufficient to produce a polyalphaolefin comprising at least 50 mol % $C_5$ to $C_{24}$ olefin, and optionally hydrogenating the liquid polymer to a bromine number less than 1;

the catalyst system comprising an activator and a catalyst compound according to Formula I, Formula II, Formula III, or a combination thereof:

Formula I being represented by:

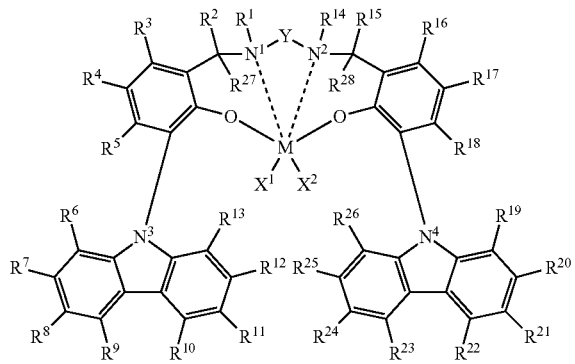

(I)

M is a Group 3, 4, 5 or 6 transition metal;

each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is, independently, a hydrogen, a $C_1$-$C_{40}$ hydrocarbyl radical, a functional group comprising elements from Groups 13-17 of the periodic table of the elements, or two or more of $R^1$ to $R^{28}$ may independently join together to form a $C_4$ to $C_{62}$ cyclic or polycyclic ring structure, or a combination thereof, or a combination thereof; and Y is a divalent $C_1$ to $C_{20}$ hydrocarbyl;

Formula II being represented by:

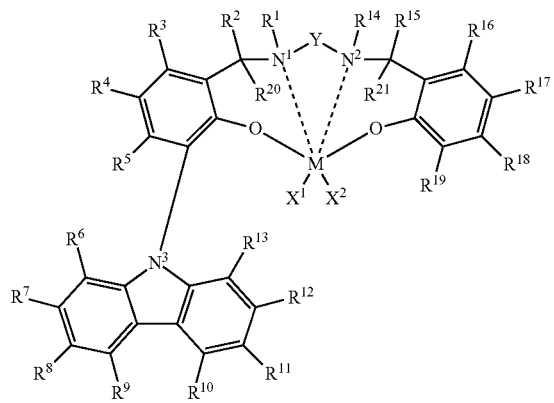

(II)

where M is a Group 3, 4, 5 or 6 transition metal;

each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is, independently, a hydrogen, a $C_1$-$C_{40}$ hydrocarbyl radical, a functional group comprising elements from Group 13-17 of the periodic table of the elements, or two or more of $R^1$ to $R^{21}$ may independently join together to form a $C_4$ to $C_{62}$ cyclic or polycyclic ring structure, or a combination thereof; subject to the proviso that $R^{19}$ is not a carbazole or a substituted carbazole radical, and Y is a divalent $C_1$ to $C_{20}$ hydrocarbyl radical;

Formula III being represented by:

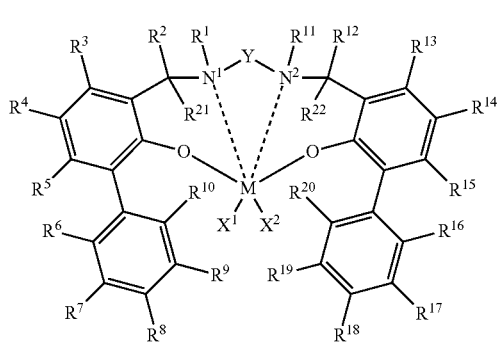

(III)

M is a Group 3, 4, 5 or 6 transition metal;

each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;

$R^1$ and $R^{11}$ are $C_1$-$C_{10}$ hydrocarbyl radicals;

$R^4$ and $R^{14}$ are $C_1$-$C_{10}$ hydrocarbyl radicals or fluorine;

$R^6, R^7, R^8, R^9, R^{10}, R^{16}, R^{17}, R^{18}, R^{19}$, and $R^{20}$ are fluorine;

each $R^2, R^3, R^5, R^{12}, R^{13}, R^{15}, R^{21}$, and $R^{22}$ is, independently, a hydrogen, a $C_1$-$C_{40}$ hydrocarbyl radical, a functional group comprising elements from Group 13-17 of the periodic table of the elements, or two or more of $R^2, R^3, R^5, R^{12}, R^{13}, R^{15}, R^{21}$, and $R^{22}$ may independently join together to form a $C_4$ to $C_{62}$ cyclic or polycyclic ring structure, or a combination thereof; and Y is a divalent $C_1$ to $C_{20}$ hydrocarbyl radical.

* * * * *